United States Patent [19]

Bates, Jr.

[11] Patent Number: 4,559,602

[45] Date of Patent: Dec. 17, 1985

[54] SIGNAL PROCESSING AND SYNTHESIZING METHOD AND APPARATUS

[76] Inventor: John K. Bates, Jr., 240 Ridgefield Rd., Endicott, N.Y. 13760

[21] Appl. No.: 461,548

[22] Filed: Jan. 27, 1983

[51] Int. Cl.$^4$ .................. G06F 15/31; G01R 23/02
[52] U.S. Cl. .................................... 364/487; 364/513; 381/36; 381/46
[58] Field of Search ............... 364/487, 417, 413, 513, 364/722, 513.5; 381/29-49

[56] References Cited

U.S. PATENT DOCUMENTS

| 3,280,266 | 10/1966 | Flanagan | 381/29 |
|---|---|---|---|
| 3,603,738 | 9/1971 | Focht | 381/49 |
| 3,828,132 | 8/1974 | Flanagan et al. | 381/39 |
| 4,020,286 | 4/1977 | Ceci | 364/513.5 |
| 4,166,980 | 9/1979 | Apostolos et al. | 324/77 R |
| 4,354,057 | 10/1982 | Atal | 364/513.5 |
| 4,415,767 | 11/1983 | Gill et al. | 364/513.5 |
| 4,429,367 | 1/1984 | Ikeda | 364/513 |
| 4,441,200 | 4/1984 | Fette et al. | 364/513.5 |

FOREIGN PATENT DOCUMENTS 0074235  3/1983  European Pat. Off. ............ 364/487

OTHER PUBLICATIONS

IBM Tech. Disclosure, Mar. 1982 (vol. 24, No. 10), "Minimum and Maximum Detector", P. S. Yosim, pp. 5041-5043.

IBM Tech. Disclosure, Sep. 1970 (vol. 13, No. 4), "Speech Recognition System", R. Bakis, pp. 828-831.

EDN, Nov. 20, 1979, "Voice Input & Output", E. R. Teja.

Primary Examiner—Errol A. Krass
Assistant Examiner—Kevin J. Teska
Attorney, Agent, or Firm—Thomas L. Adams

[57] ABSTRACT

System for analyzing a signal waveform includes a periodicity analyzer for detecting the time of occurrence of individual repetitions of a predetermined type within a periodic event in the signal waveform. The periodicity analyzer can provide, in response to this event being periodic, a periodicity signal corresponding to the period of the predetermined periodic event. Also included is a residue analyzer for providing upon the occurrence of a predetermined feature of the signal waveform, a normalized signal bearing a predetermined relation to the signal waveform. The apparatus also includes a utilization subsystem coupled to the periodicity analyzer and residue analyzer for providing an output signal based upon the contemporaneous values of the normalized signal and the periodicity signal.

42 Claims, 40 Drawing Figures

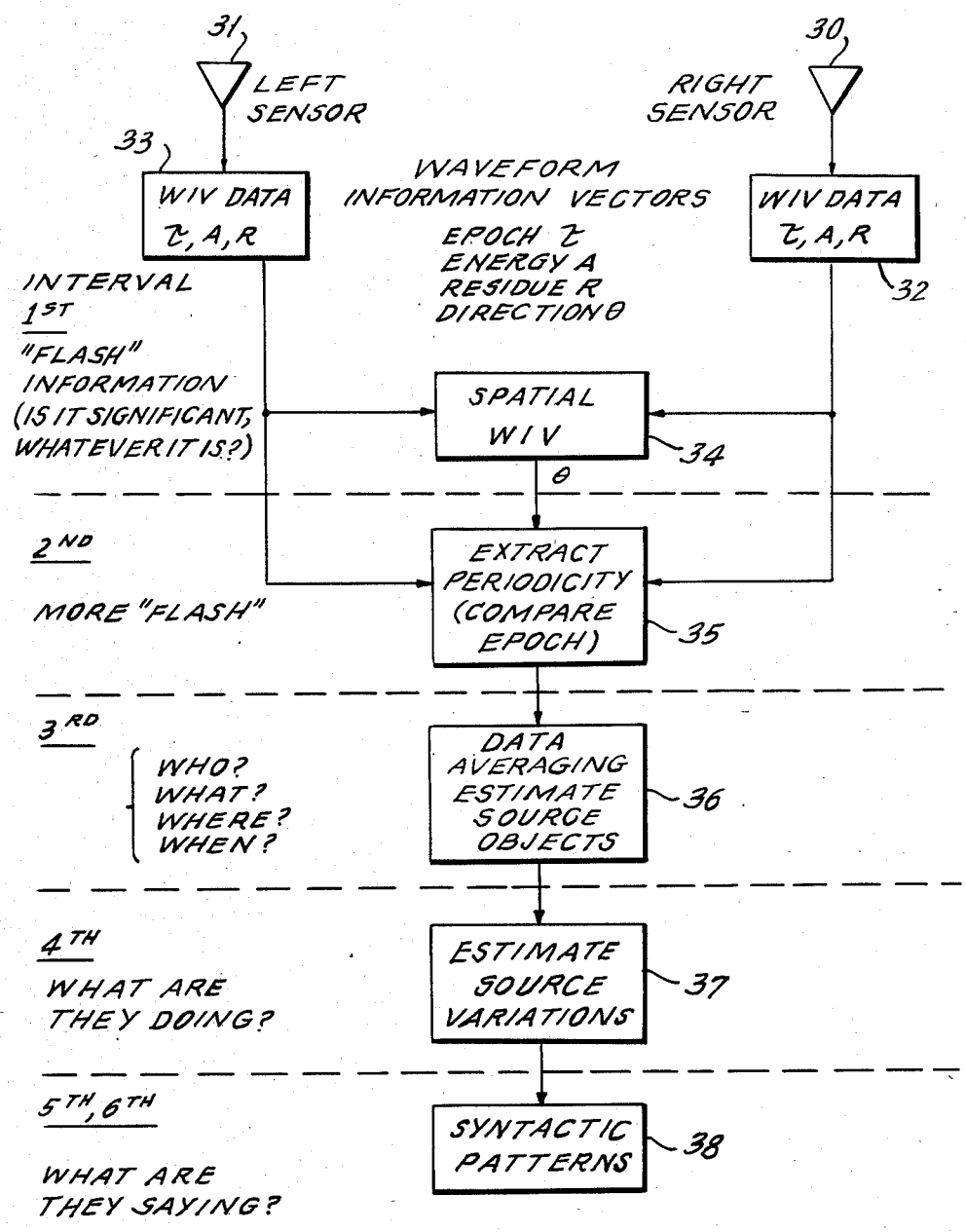

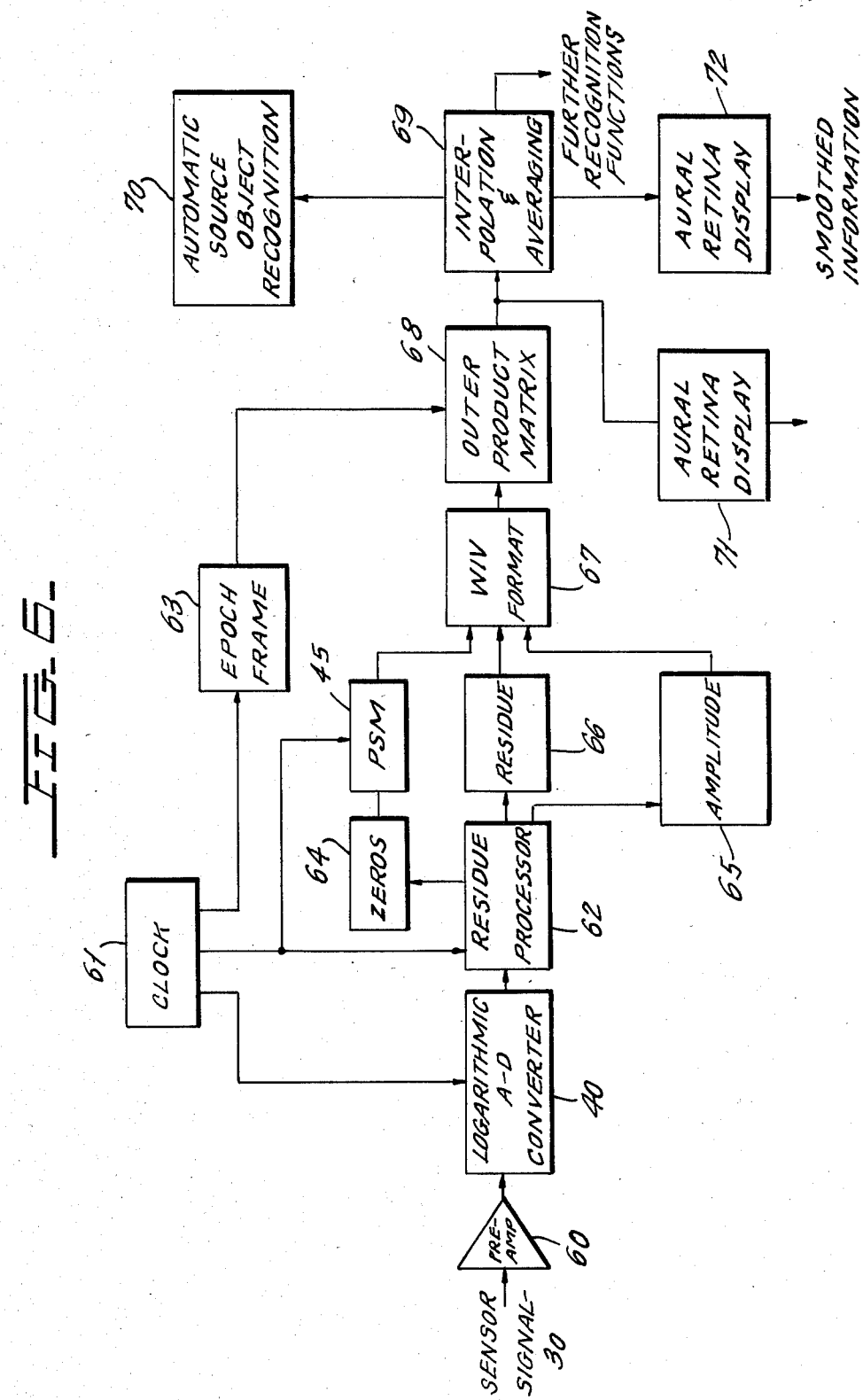

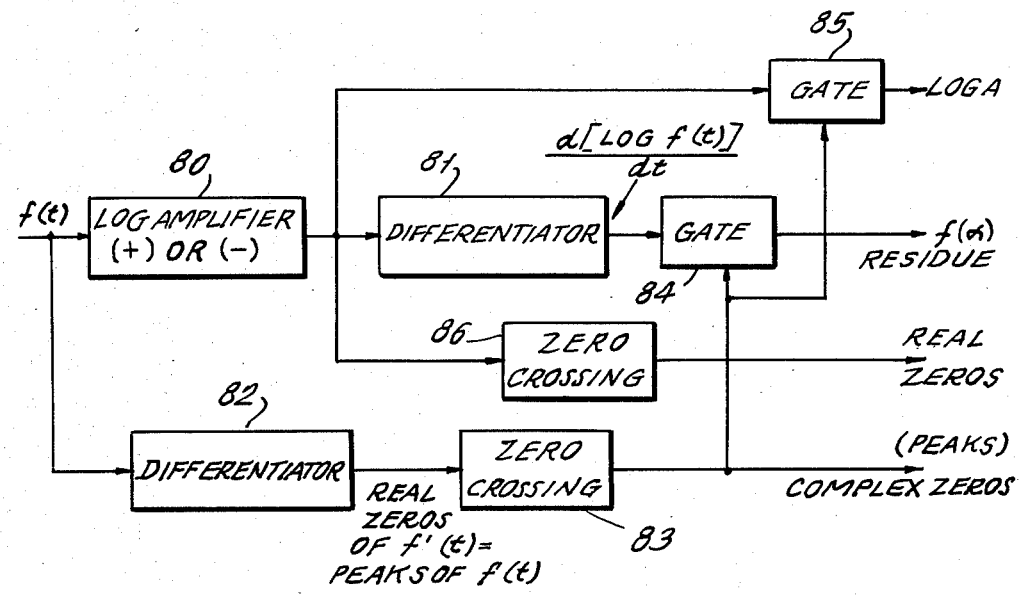
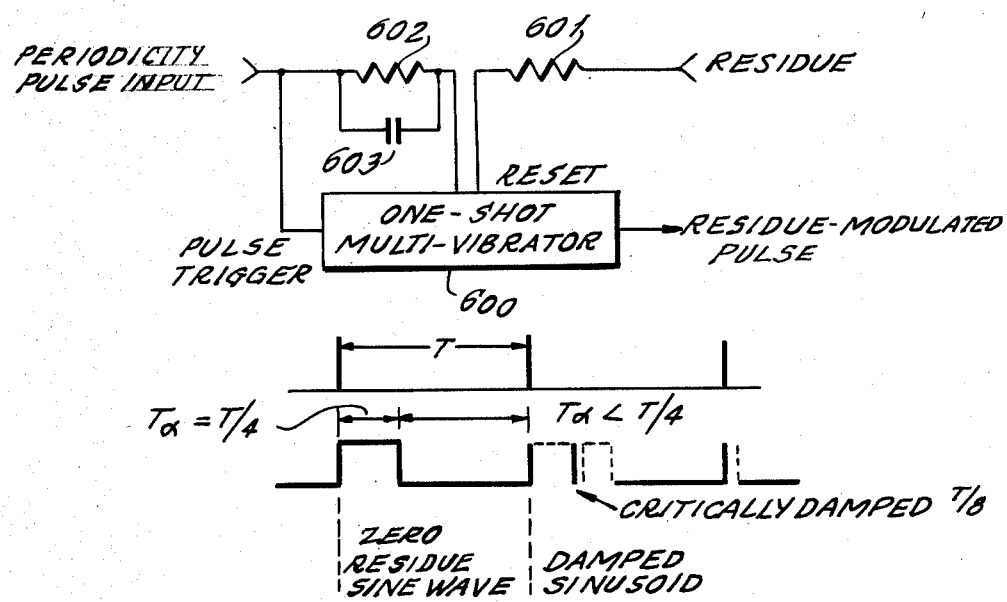

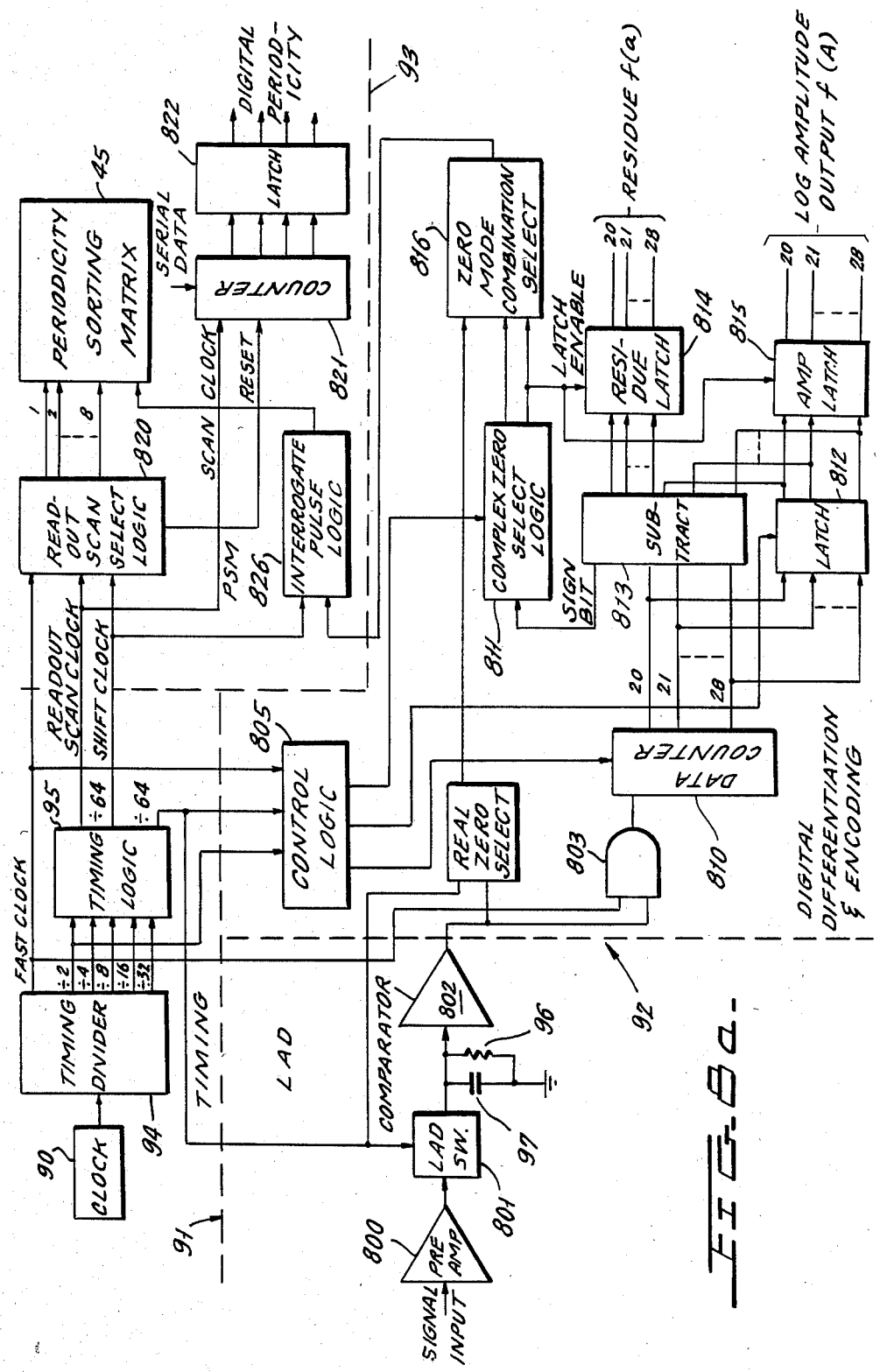

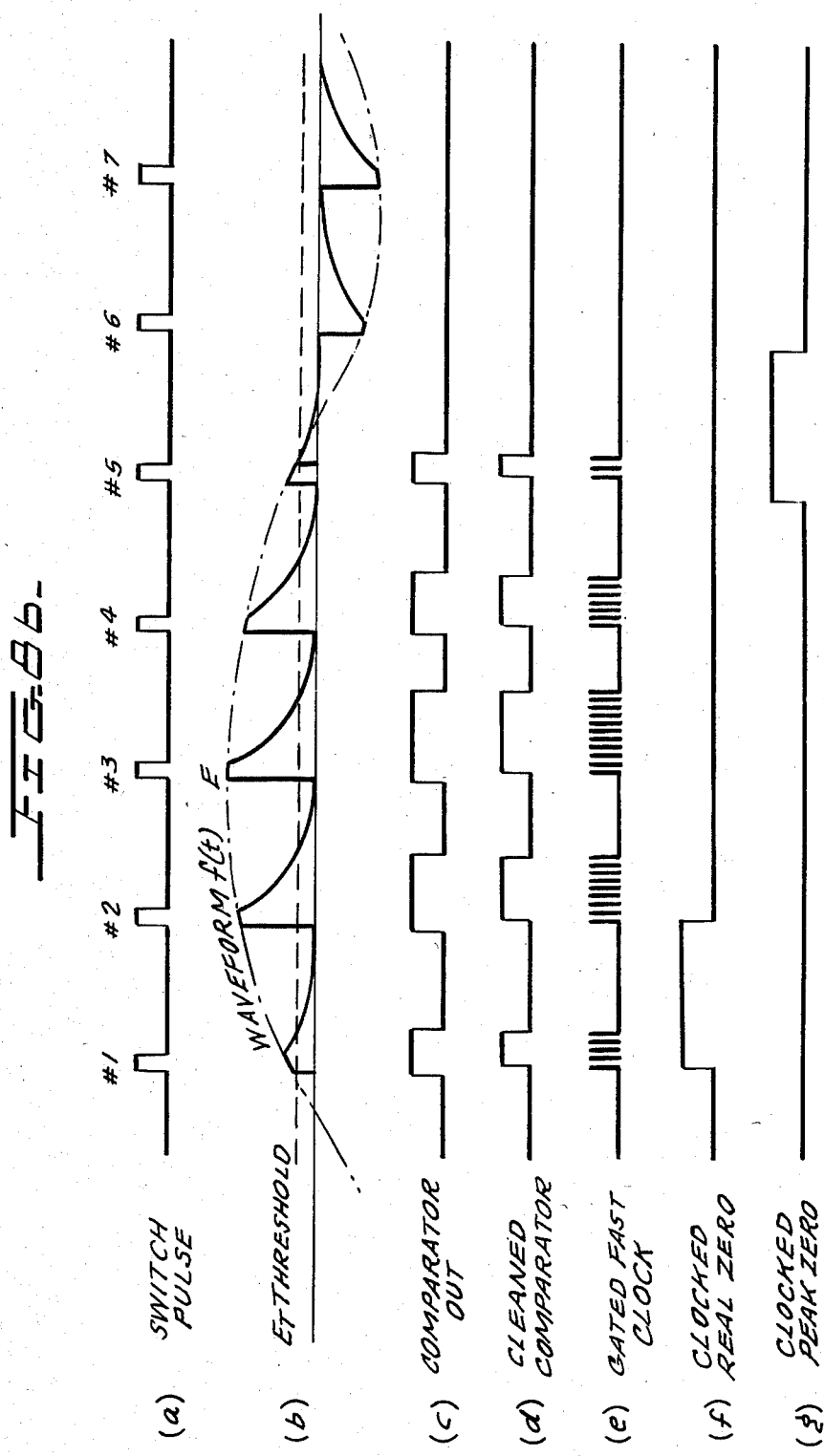

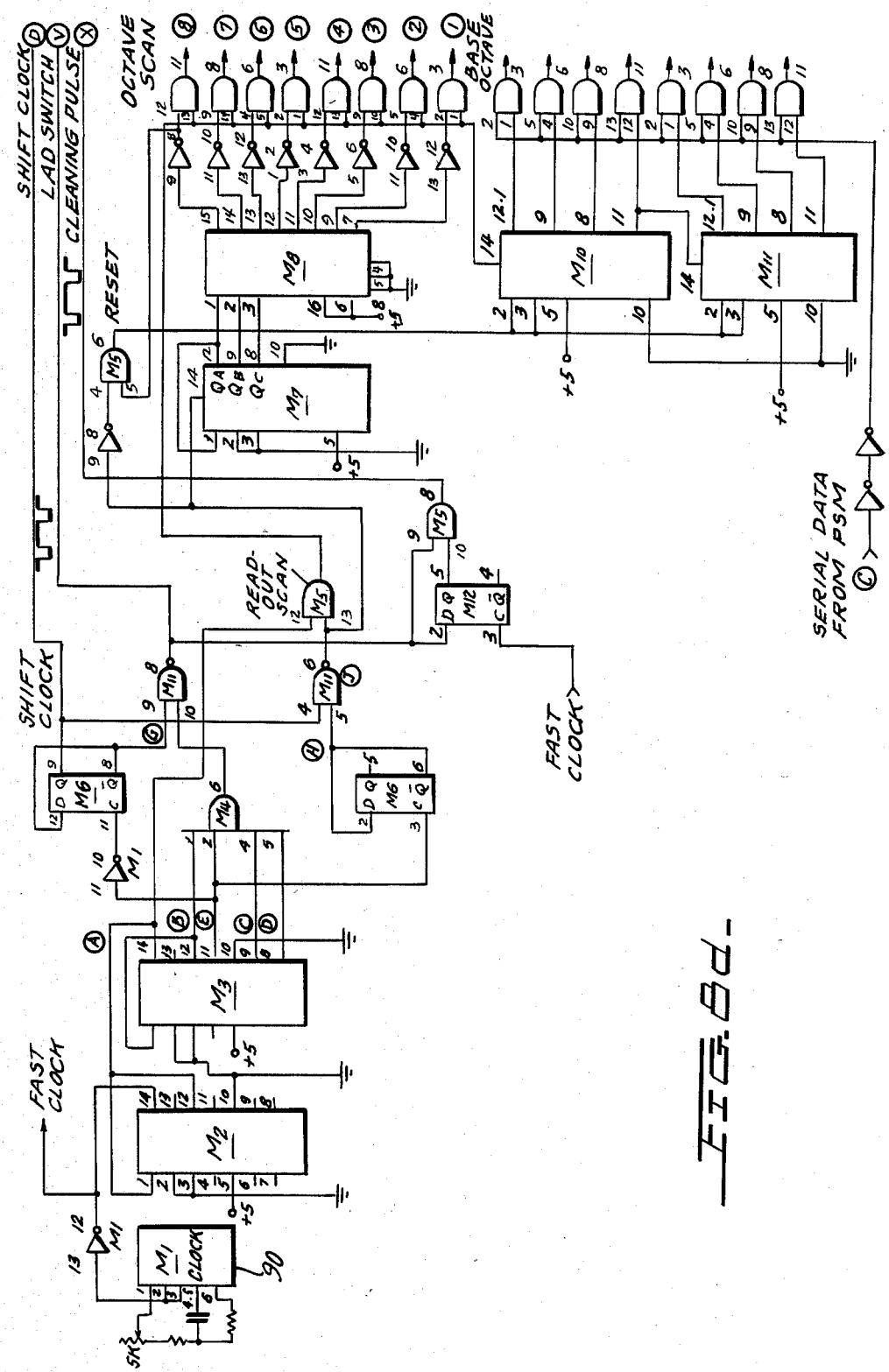

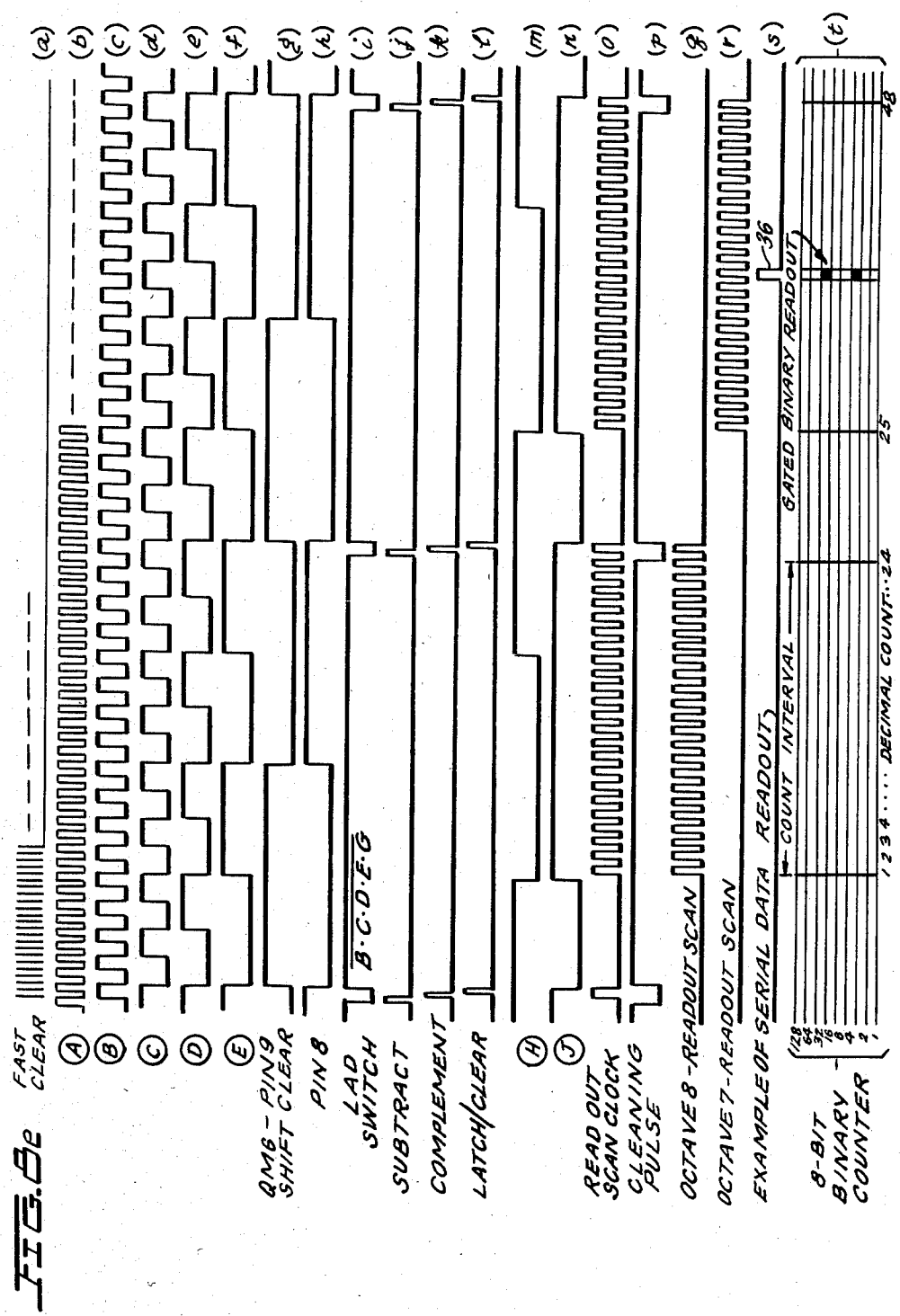

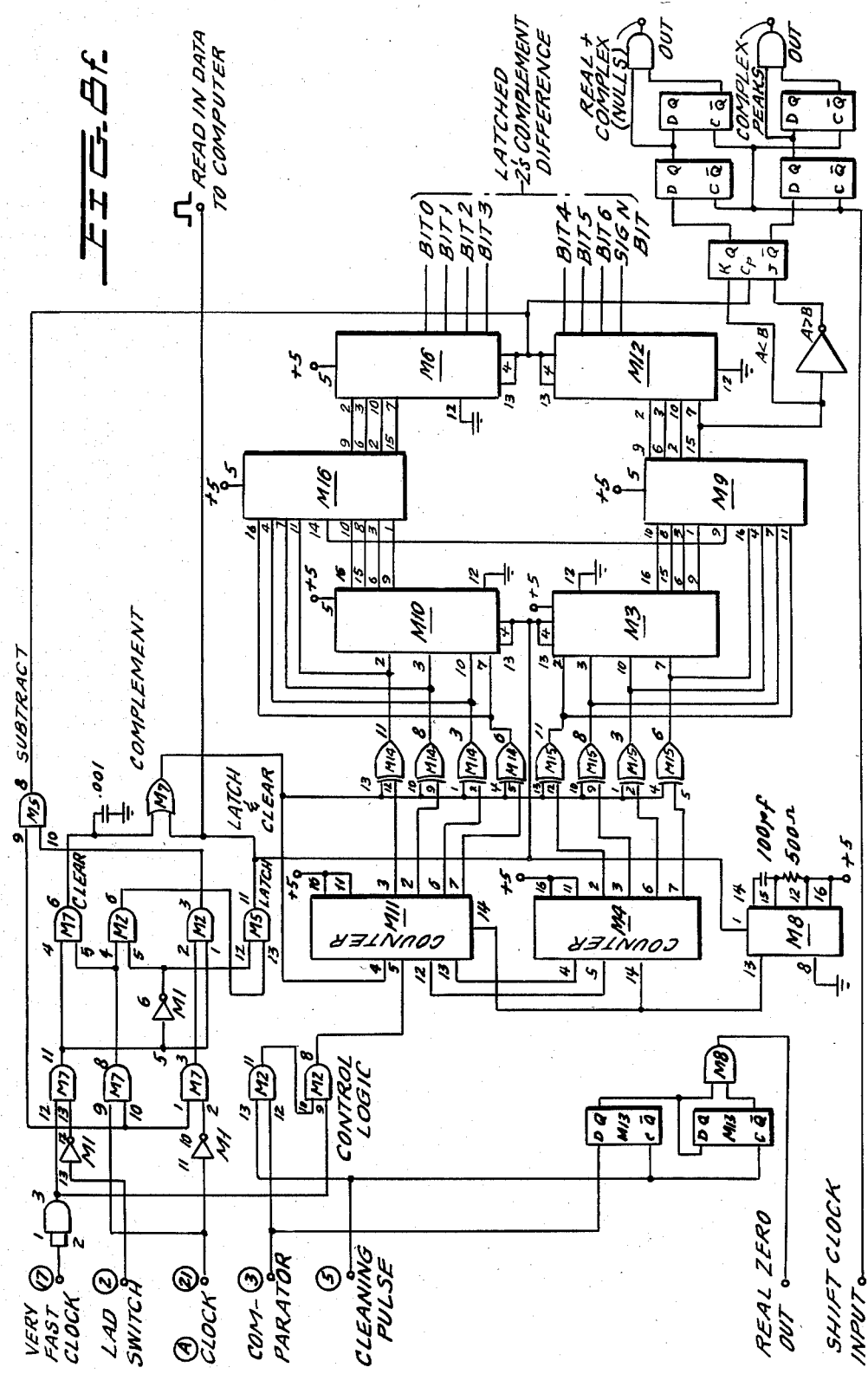

FIG. 9A.
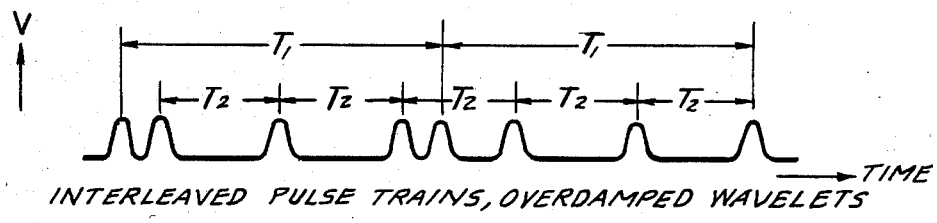
INTERLEAVED PULSE TRAINS, OVERDAMPED WAVELETS
FIG. 9B.
PERIODIC EXCITATION, UNDERDAMPED RESPONSE FUNCTION
FIG. 10A INPUT SIGNAL
FIG. 10B. CLOCKED SIGNAL
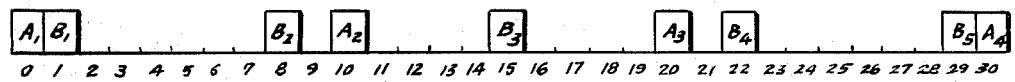
FIG. 11A.
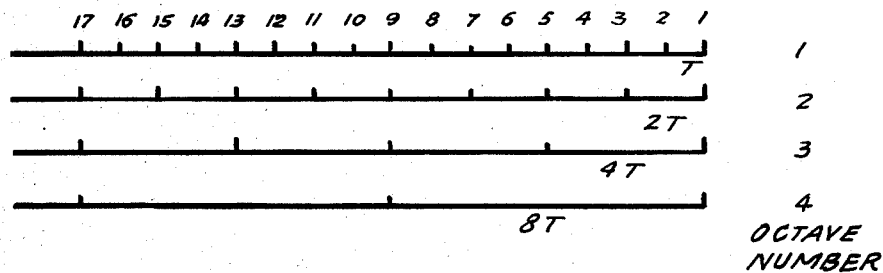
OCTAVE #1 RECOGNIZES 3$^{RD}$ PULSE TO 17$^{TH}$
2 RECOGNIZES 5$^{TH}$ PULSE TO 17$^{TH}$
3 RECOGNIZES 9$^{TH}$ PULSE TO 17$^{TH}$
4 RECOGNIZES ONLY THE 17$^{TH}$
FALSE RECOGNITIONS IN OCTAVES 2, 3, AND 4

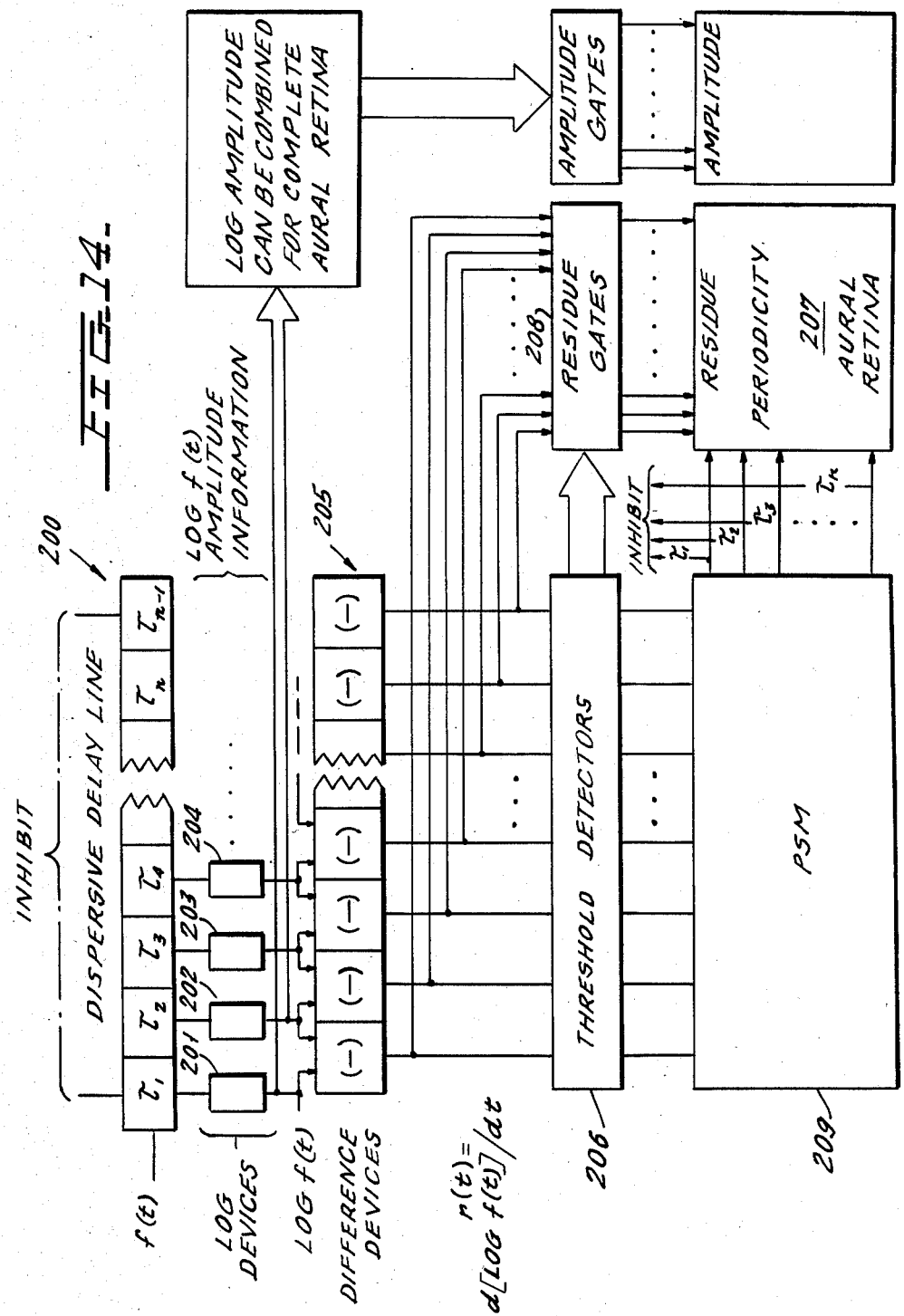

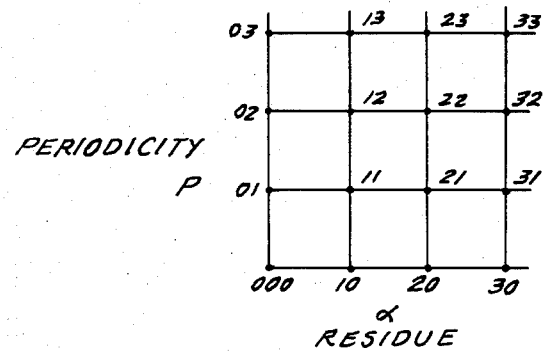
_FIG_16_
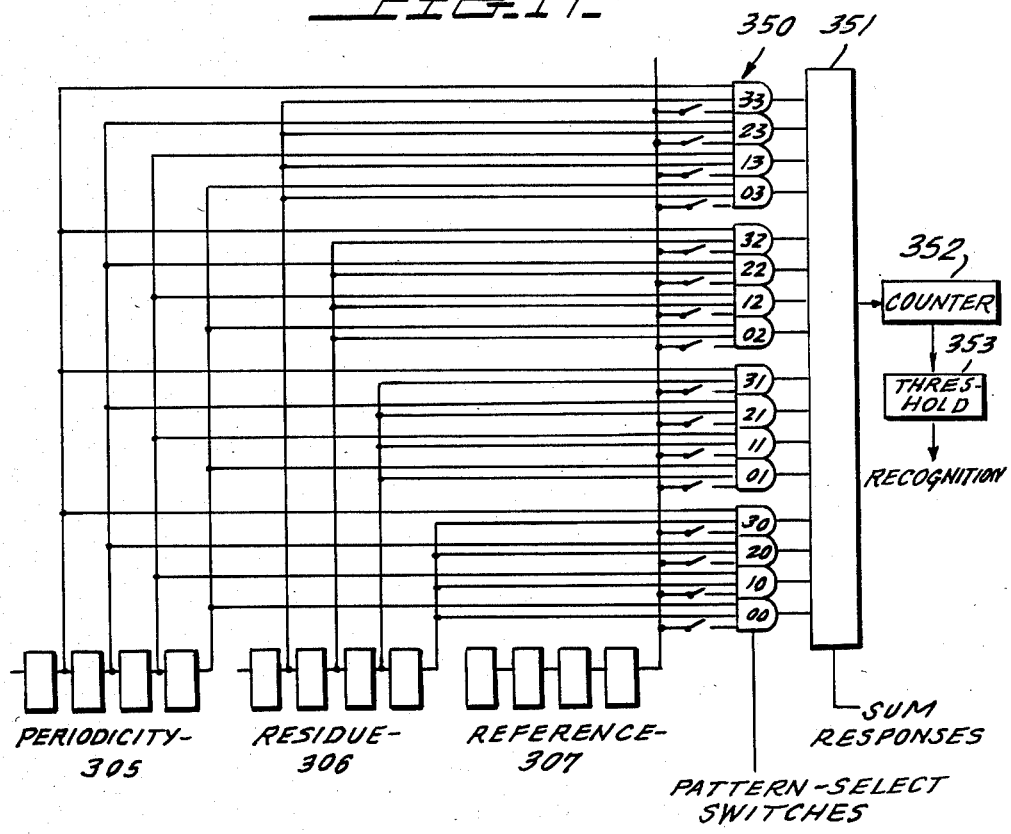
_FIG_17_

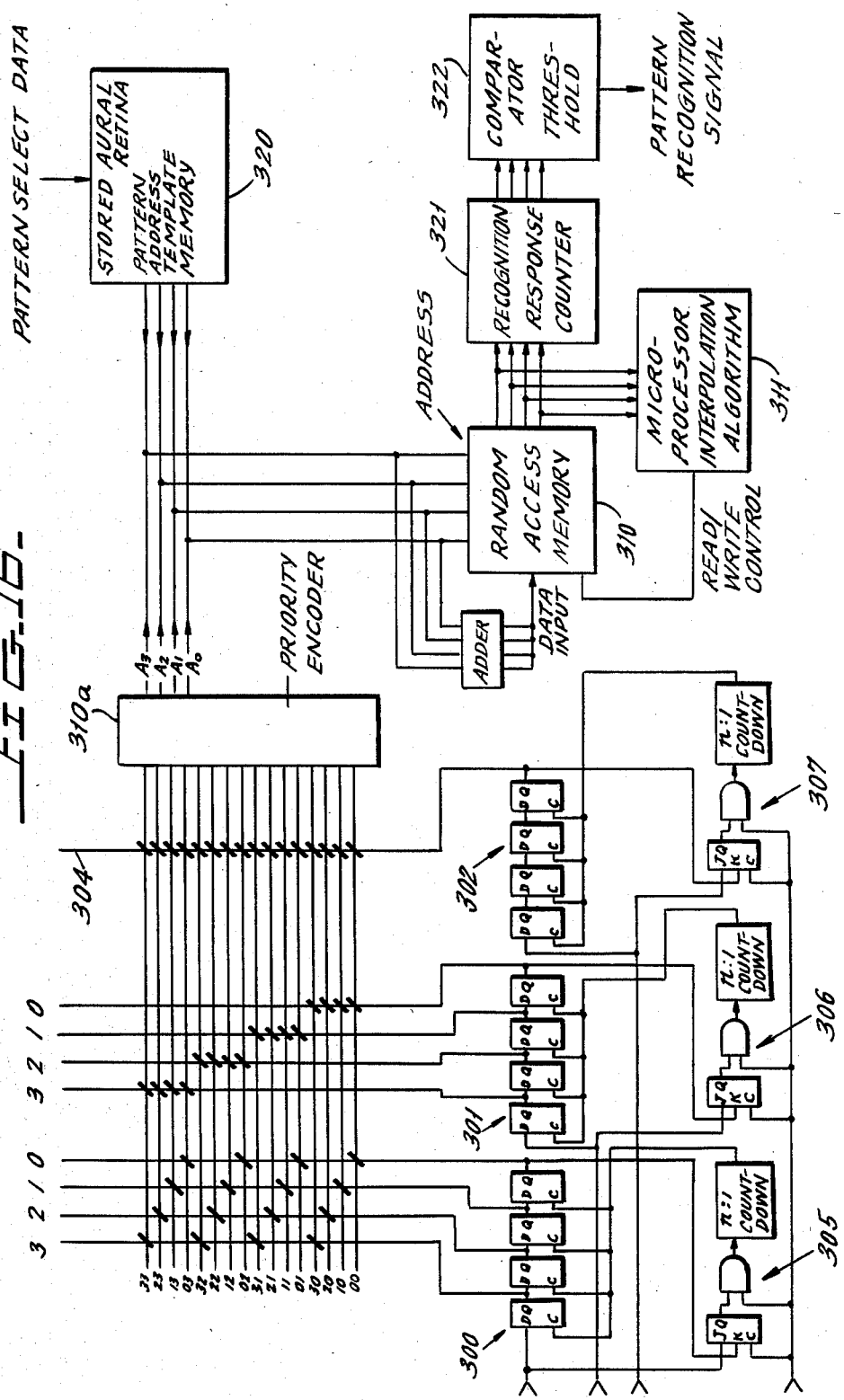

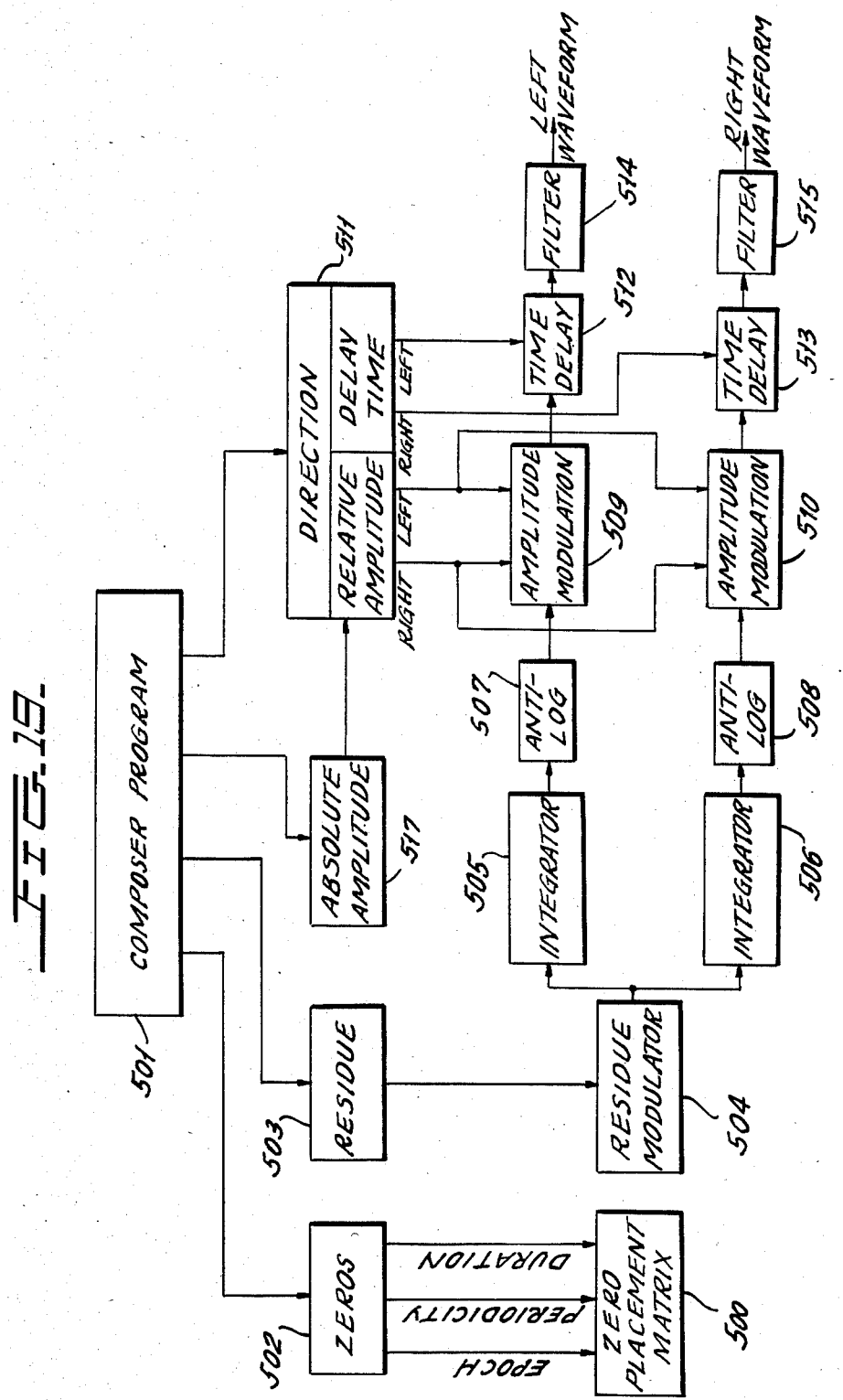

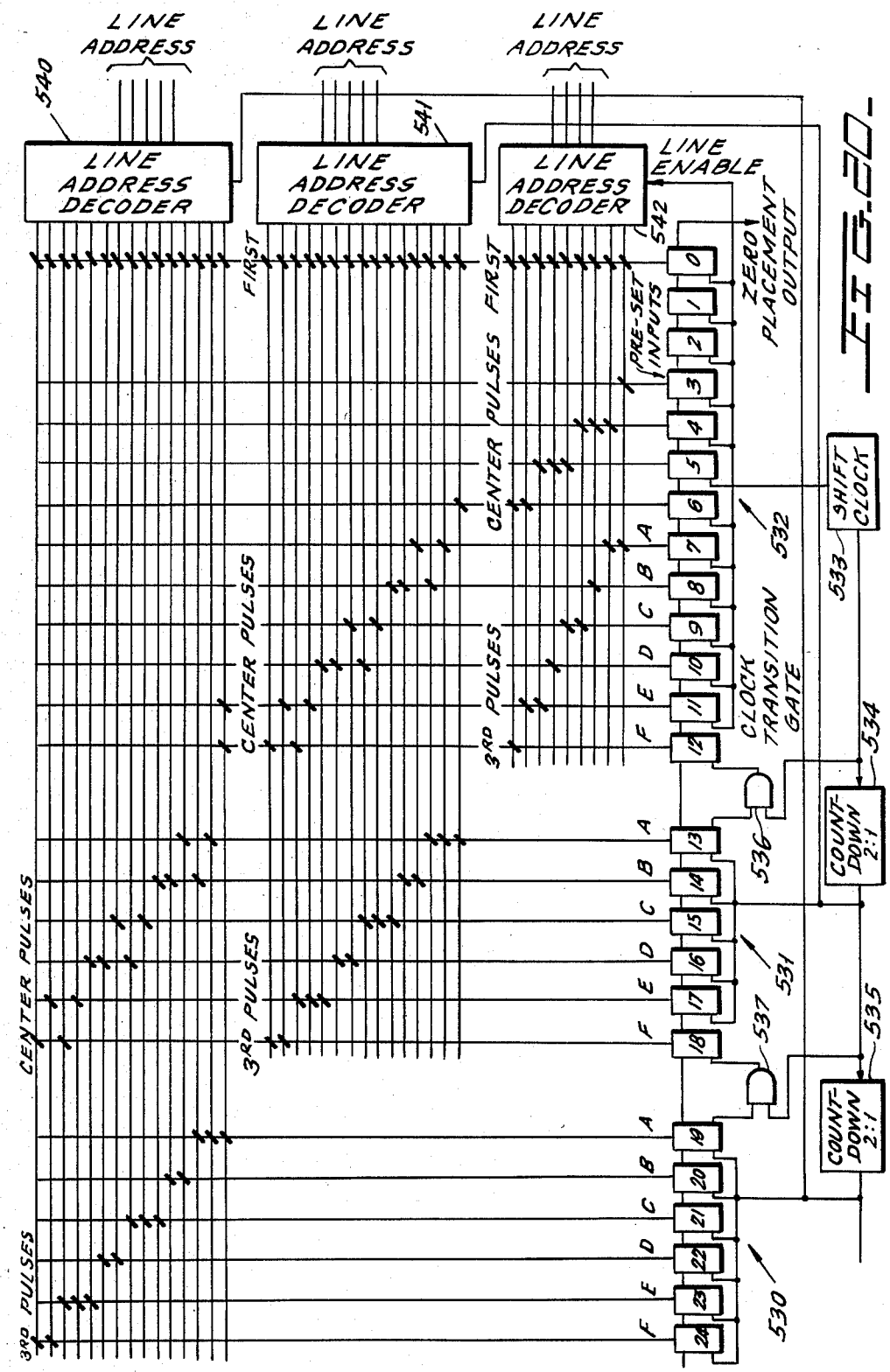

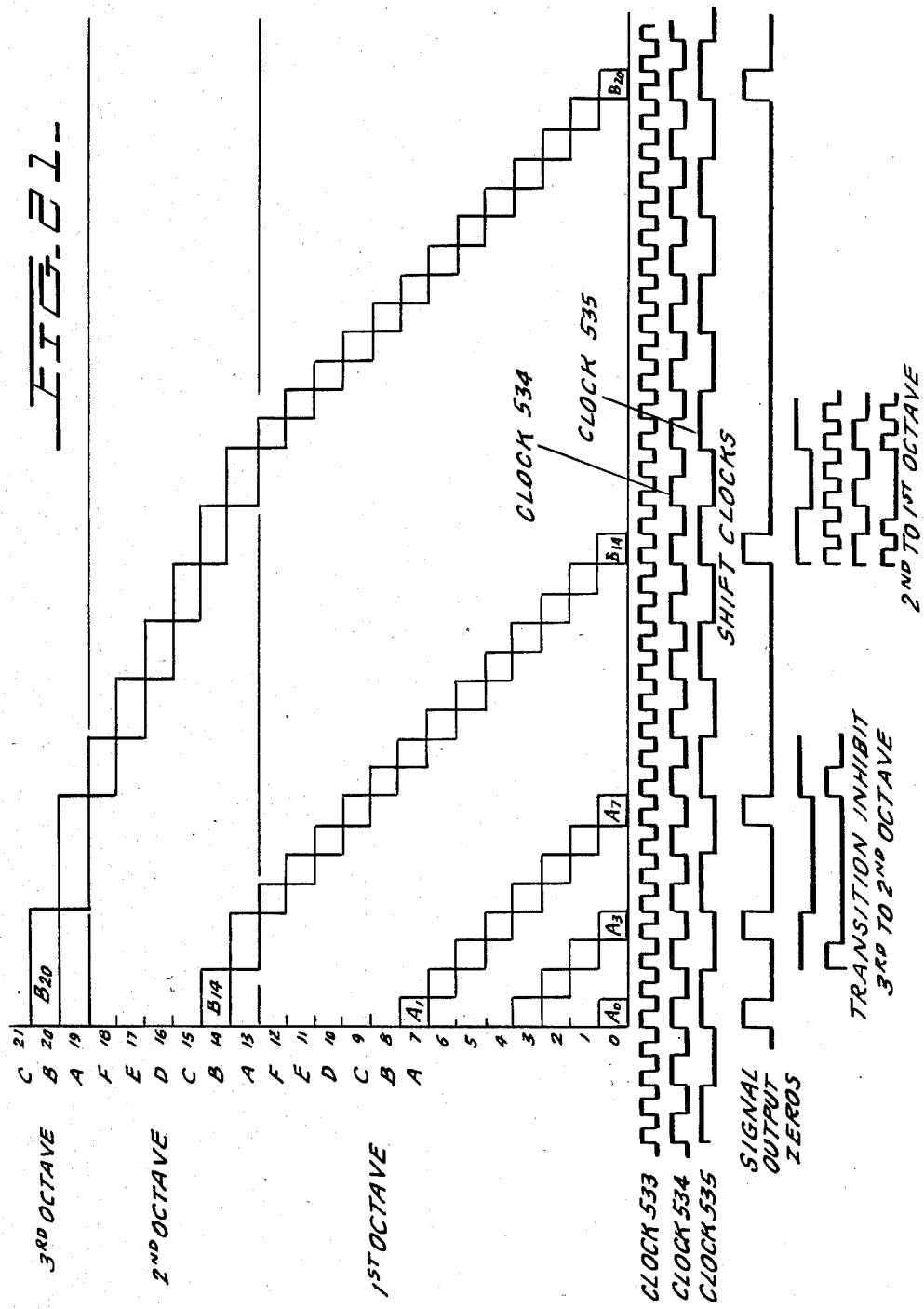

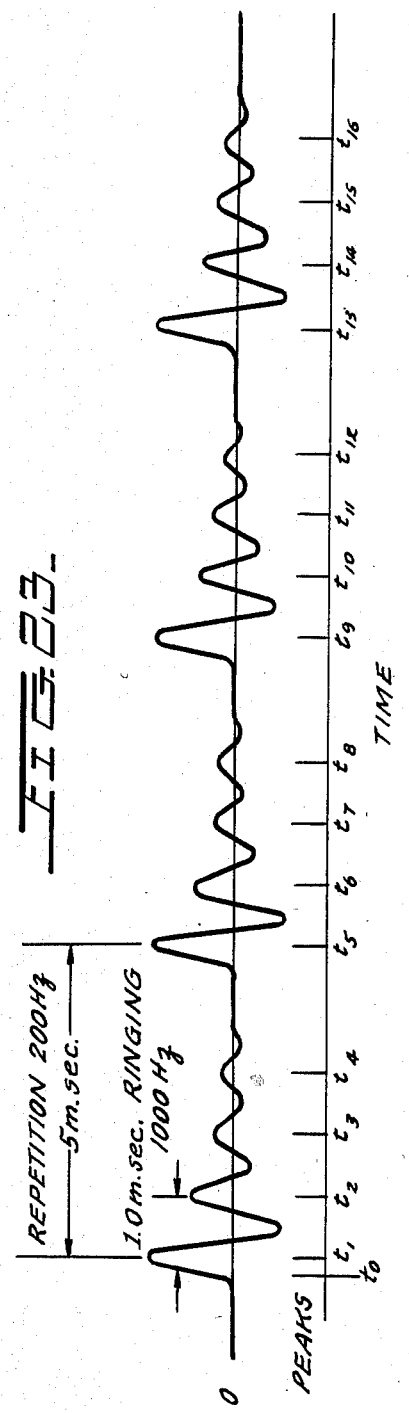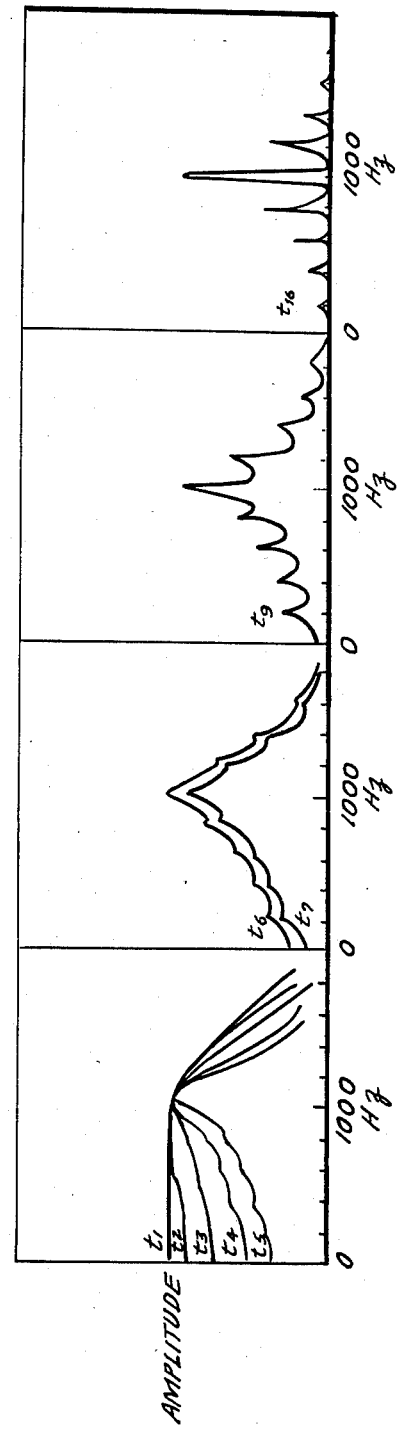

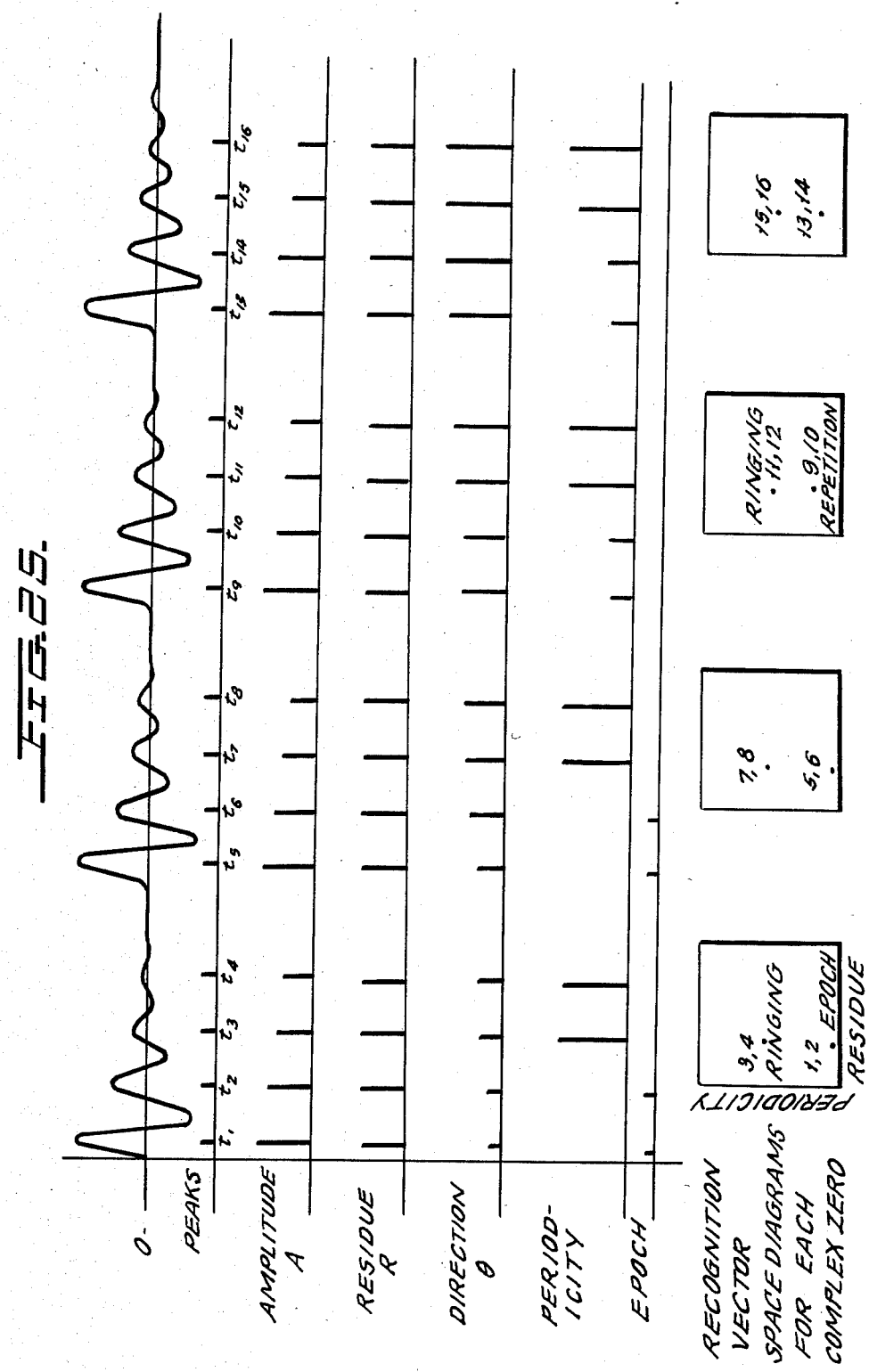

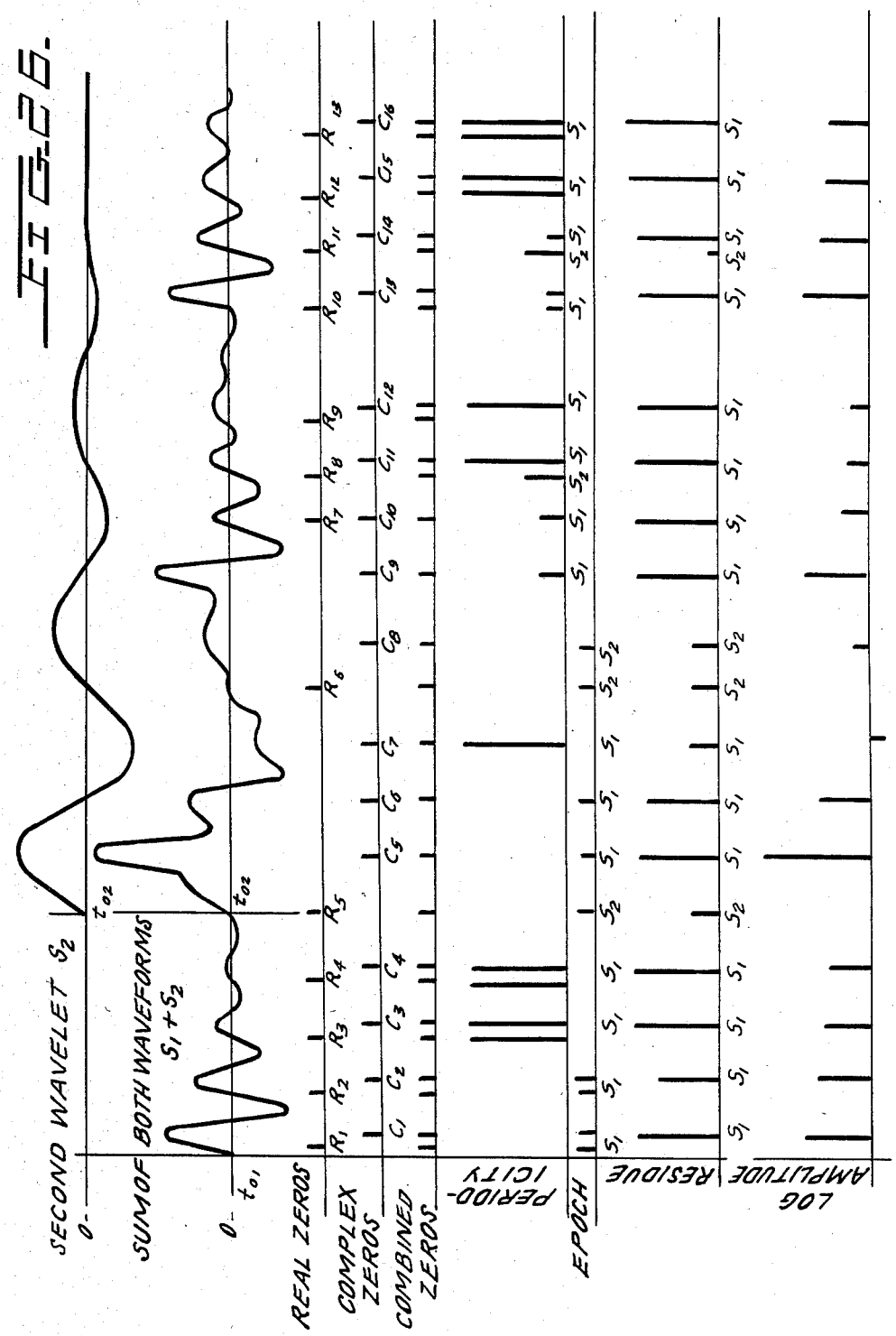

IMPULSE

SIGNAL PROCESSING AND SYNTHESIZING METHOD AND APPARATUS

BACKGROUND OF THE INVENTION

This invention relates to the processing and synthesizing of complex signals, and more specifically relates to a novel method and apparatus for processing and identifying the components of a complex signal and for synthesizing complex signals in which signal components are identified in terms of discrete locations in a one or more dimensional representation, derived from the measurement and/or generation of at least the epoch and damping of the signal components which make up the complex waveform which is being processed or produced.

The analysis and synthesizing of complex waveforms is a well developed art and has application to a large number of fields. For example, the analysis of acoustical signals having complex waveforms produced by one or more spaced sources is well known. Similarly, analysis of signal waveforms of electrical signals, seismic signals and other signals is well known with application in speech processing, environmental sensing, biomedical signal analysis, and the like. Equivalent systems are known for the generation of complex waveforms as may be encountered in fields such as music synthesizing, the production of artificial speech, and the like.

In presently known acoustical systems, it is possible to obtain desired information from only simple waveforms and from single source objects, such as a single speaker against a low background noise. The effect of factors such as amplitude, dynamic range, enunciation and sex of the speaker will cause complexity and unacceptable performance in speech analysis equipment. Similar problems exist in waveform analysis of signals produced by sources other than the human voice. Those systems which do exist are relatively costly and use substantial input power for their operation due to complex structure and complex processing algorithms.

Virtually all existing complex signal analysis systems are based on some form of Fourier or spectral analysis or, more generally, on the use of least-squares estimation of polynomial functions. Such methods have a common deficiency in that during the processing sequence, important information is lost due to the need for a relatively long measurement interval required to estimate the polynomial coefficients of a Fourier series. Since the measuring interval must be relatively long, the measurement process loses information related to "epoch" which relates to the time at which a new individual signal within the waveform has begun. Because of this restriction, Fourier type analysis technique cannot identify multiple source objects which occur simultaneously within the interval of observation or measurement of a complex waveform produced by the multiple objects.

If, in a spectral analysis system, the interval for estimation of the polynomial coefficients is reduced in order to improve epoch accuracy, then the accuracy of the mean square estimate of the source function is reduced. Consequently, in the case of Fourier analysis, the spectrum becomes more and more blurred as the sampling window is reduced in time.

The difficulties of present systems for analysis of stochastic signals are summarized by a known time-frequency uncertainty which specifies that accuracy in a frequency domain requires low resolution in the time domain and vice-versa. This is described, for example, in the article by D. Gabor entitled "Theory of Communication", Journal of IEEE, Volume 39, Part III, No. 26, November, 1946. The above problem is also described by S. M. Kay and S. L. Marple, "Spectrum Analysis - A Modern Perspective", IEEE Proceedings, Volume 69, November, 1981, pp. 1380-1419 and by H. Bremerman, "Pattern Recognition, Functions and Entropy", IEEE, Transactions on Biomedical Engineering, Volume BME-15, No. 3, July, 1968.

It is interesting to note that the human ear has solved the waveform analysis problem, although the operation of the ear in this analysis function is not understood. In older theoretical analyses of the operation of the ear, it was assumed that the hearing process employs spectral processing. Thus, an early theoretical model of hearing was made by Von Helmholtz in 1863. The Von Helmholtz model was based on a Fourier or frequency domain signal analysis. Both Von Helmholtz and his successors concentrated on studying well-defined and relatively simple signal conditions, especially with only one signal at a time. These simplifications have provided a reasonable basis for a theoretical study, but disregard how the ear deals with frequency discrimination over a wide, logarithmic range, how it responds to transients and its ability to detect and identify sounds over a wide amplitude and dynamic range with near optimum detection sensitivity and how it can discriminate multiple sources spatially and temporally even when they are interleaved with wide ranges in amplitude. Acoustic sources can also be identified by the ear in spite of background noise and extreme distortion of amplitude and phase. This is the well known "cocktail party effect" in which the human ear can pick out the voice of an unseen speaker from a background of other voices of equal or greater amplitude. The use of Fourier analysis type techniques fails to explain many of the functions of the human ear, including those described above, in terms of a consistent signal processing theory.

Signal processing methods and apparatus which are presently available are extremely complex and expensive, even though their functions do not come close to the efficiency and wide range application of the human ear. The present invention provides signal processing which more nearly approaches the results obtained by the human ear and which is less complex and costly than presently available equipment.

BRIEF SUMMARY OF THE INVENTION

The present invention provides a novel signal processing method and an equivalent signal generating method for the analysis and generation of complex waveforms which employs a non-spectral analysis approach and can be implemented with reliable and relatively inexpensive processing circuitry.

In accordance with the present invention, the complex waveform is analyzed by making sequential measurements at either or both the real and complex zeros of the waveform. The directly measurable parameters at the real and complex zeros of the waveform are the waveform energy level, the epoch or initiation of new wave fronts and derivatives of the waveform. Direction of arrival can also be measured. These parameters are termed "waveform information vectors" and are sometimes termed hereinafter "WIVs". These WIVs are then processed by relatively simple digital or analog circuitry in order to derive from the measured information which characterizes and locates each signal source object within the ensemble of arriving waveforms. The primary means of identification is in the formation of patterns in the vector space formed by coordinates of periodicity vs. residue vs. amplitude. This vector space is termed the "Aural Retina" because of its analogy with the ear and the process of hearing. It has been shown that human listeners identify sounds in terms of pitch and timbre. Specifically, pitch is an attribute of periodicities in the time domain, and timbre is an attribute of instantaneous harmonic content, or residue, in the frequency domain. This relationship between pitch and periodicity, and timbre and residue allows a specific definition of a pattern space within the ear and the hearing process within which the objects of aural perception are analogous to the objects of visual perception. In other words, objects defined as sets of points in coordinates of periodicity, residue and amplitude of the Aural Retina are analogous to objects perceived in the visual retina in terms of height, width and brightness.

To accomplish this function, the WIVs are extracted at the instant of each peak, null and/or zero of the waveform and compared with a set of prior patterns so as to derive information regarding epoch and wave shape of the individual source objects which have produced the entire waveform. Following each subsequent analysis interval, additional information on the waveform is made available to continuously refine the analysis process.

Thus, with the present invention, acoustic sounds may be described by a pattern in two-dimensional space plotting periodicity (pitch) vs. residue (timbre).

Spatial or directional information between sources which produce a given complex waveshape at a sensor are determined by employing spatially directed channels which measure the wave from a given direction. The Aural Retina measurements which are made in the various directions are then compared and the signals of the multiple sources are separated and individually identified.

In an analogous manner, the novel process and apparatus of the invention can be employed to synthesize complex waveforms so as to synthesize the human voice or the like with relatively simple equipment.

The specific processing circuitry which is employed for a given application depends on the frequency range of the waveform. Thus, for frequency ranges from seismic frequencies up to ultrasonic frequencies, standard LSI and VLSI techniques and components can be used. In this frequency range, the waveform processing can be used in such applications as oil prospecting, underwater submarine detection and tracking, speech instruction and hearing research, automotive engine tuning and other acoustic analysis, evaluation of musical instruments, bioelectric monitoring, speech recognition and the like.

The invention is also applicable to higher frequency waveforms which might be in the far ultrasonic to radio band and up to 200 MHz for use in radio detection in the broadcast band, interference detection and location in the radio band, and the like. The invention also applies to detection in even higher frequency ranges through 1,000 MHz., where the circuits are implemented preferably with surface acoustic wave devices for application to spread-spectrum communication systems and the like.

THEORETICAL BASIS OF THE INVENTION

The theoretical basis for the novel Aural Retina concept of the present invention is now described in connection with the processing of an existing complex waveform in contrast to the production of the complex waveform which will be later described. Any complex waveform which is produced by the superimposed responses of a plurality of objects each of which represent a respective source of information can be described mathematically by:

$$f(t) = \sum_{K=1}^{m} A_k e^{(s_k(t-\tau_k))} \quad (1)$$

where
$A_k = k^{th}$ amplitude coefficient;
$S_k = k^{th}$ complex frequency $(\alpha_k + j\beta_k)$
$\tau_k = $ epoch (start) of $k^{th}$ excitation function
It is presumed in Equation 1 that $t \geq \tau_k$. The function f(t) is 0 when $t < \tau_k$.

As expressed in Equation (1), the composite waveform f(t) is the sum of a sequence of exponential wavelets of various amplitudes, which occur as response functions of excitations occurring at the various epochs (or instants). This process is schematically illustrated in FIG. 1. Thus, FIG. 1 schematically illustrates at the left, n excitation sources 20-23 each of which produce a pulse type excitation at some time $\tau_n$. Sources 20-23 can have any desired relative spatial location and any desired size. When the objects are stimulated by the unit impulse excitation impulse $\delta(\tau_n)$, their response signals can have any desired shape, as shown by the different wave shapes above boxes 24-27 wherein the waves are oscillatory waves or critically damped waves, or the like, illustrated by the values $A_k h(\tau_k)$. The response signals of each of objects 20-23 can be generally represented as $$f_k(t) = A_k h(\tau_k, l_k) e^{[s_k(\tau_k)]} \quad (2)$$

where $l_k$ represents the kth location.

The outputs of boxes 24-27 are summed in a summing device 28 which produces the output f(t) which is the function of Equation 1 above. Note that the complex waveform shown in FIG. 1 contains the epochs $\tau_1$, $\tau_2$, $\tau_3$ and $\tau_n$ of the generators 20-23 respectively.

From the above, the waveform emitted by each object potentially contains information about the spatial and temporal patterns of each object. To analyze the function shown in FIG. 1, the signal analysis system of the invention has the capability to sort, compare and associate the measurements of epoch, amplitude and response function for each of the sources 20-23 with a high degree of analysis fidelity. By analysis fidelity is meant the amount of recoverable information to the available source information. The signal sources which are involved are normally characterized by arbitrary and unpredictable parameters. Thus, waveforms produced by environmental and biological sensors are at best random, stochastic or transient. For example, human speech and various animal sounds will have highly variable periodic components intermixed with random and transient events. In some cases, many signal sources will coexist in time and space.

Because of this randomness and variability, the signal analyzer of the invention must extract information within very small time intervals. Otherwise, the ability to associate the epoch information of objects 20–23 with the corresponding system response of system response blocks 24–27, respectively, is lost. If this information is lost, there is then no way to identify the components of a source. Note that this problem is also related to the ability to detect a signal in a background of noise or other signals.

From the above, it is apparent that a crucial requirement for the analysis system is that the system must identify epoch $\tau_k$ as accurately as possible. The epoch $\tau_k$ in Equation 1 is that impulse which produces the single response function of a wavelet, where the wavelet can range from an overdamped case in which $\alpha \gg 1$ to the oscillatory case where $0 \leq \alpha \leq 1$, where $\alpha$ is the real portion of the complex frequency $\alpha + j\beta$.

In the oscillatory condition, epoch is the onset of a periodic function at the complex frequency, $\alpha_k + j\beta_k$. In a complex signal, the sum of the various wavelets appearing at various epochs will cause the various peaks and nulls in the waveform.

Therefore, each ripple in the waveform of FIG. 1 is a feature which results from either an excitation impulse or an oscillatory response. These features can be represented as real and complex zeros in the time domain as described, for example, in the publication by H. B. Voelcker, "Toward a Uniform Theory of Modulation", Part I: Phase-Envelope Relationships, IEEE Proceedings, Volume 54, March, 1966, pp. 340–353 and Part II, Zero Manipulation, IEEE Proceedings, May, 1966, pp. 735–755. Also see U.S. Pat. No. 3,510,640 to H. B. Voelcker, entitled "Method and Apparatus for Interpolation and Conversion of Signals Specified by Real and Complex Zeros".

The disclosed apparatus can identify and measure the peaks, nulls and zeros in a complex waveform in order to measure both the epoch and the period of the exponential wavelets which make up the complex wave form.

Since any individual zero in the complex waveform might be either the onset of a new wavelet or a response from a previous wavelet, means are provided to measure and store the information at each zero so that it can be related to previous and/or subsequent data. Directly measurable parameters at the zero points are energy level A, epoch, and derivatives. The direction of arrival of the energy is also an instantaneous parameter and is determined by comparing instantaneous energy and epoch of spatially-separated sensors. As previously noted, these parameters which are measured at the zeros, are termed waveform information vectors or "WIVs".

The derivative or rate-of-change vector is useful after being normalized for absolute signal strength. This is done by dividing the derivative $f'(t)$ of Equation (1) by $f(t)$ to produce the amplitude-independent time derivative of the logarithm of $f(t)$. Thus, $$r(t) = \frac{f'(t)}{f(t)} = \frac{d[\ln f(t)]}{dt} \tag{3}$$

In Equation (3), the function $r(t)$ can be interpreted as the instantaneous "residue" of the spectral pattern of the signal $f(t)$. Consequently, the function $r(t)$ is frequently hereafter conveniently designated the "residue function". The function $r(t)$ also represents the residue of the responses of prior and present exponential functions in the signal $f(t)$.

It is instructive to consider the case where $f(t)$ is a single exponential wavelet having the form $$f(t) = Ae^{-\alpha t} \sin \beta t \tag{4}$$

In Equation 4, the term $\alpha$ is the decay time of the exponential wavelet, while the term $\beta$ is the ringing frequency. Note that these are also the real and complex components of the complex frequency $f_k$ of Equation (1). By taking the derivative of $f(t)$ of FIG. 4 and then dividing it by $f(t)$ of Equation (4), the residue function $r(t)$ is produced as follows:

$$r(t) = \frac{Ae^{-\alpha t}(\beta \cos \beta t - \alpha \sin \beta t)}{Ae^{-\alpha t} \sin \beta t} \tag{5}$$

This then reduces simply to:

$$r(t) = \beta \cot \beta t - \alpha \tag{6}$$

The residue function as represented in Equation 6 can be interpreted in several ways. The objective, in accordance with the present invention, is to identify a function which characterizes the exponential coefficient $\alpha$ at selected real or complex zeros $f(t)$ or of $r(t)$. The zeros of $f'(t)$ are the same as those of $r(t)$. The advantage of sampling the function $r(t)$ at its zeros is that the function discontinuities caused by the real zeros in $f(t)$ can be avoided. This process will then lead to extremely simple circuit techniques for extracting the desired information.

A number of methods are possible for obtaining this result and two are described in the following:

In the first method, consider only the real zeros of the function $r(t)$ of Equation (6). It will be seen that when $r(t) = 0$, then:

$$\tan \beta t = \beta \alpha \tag{7}$$

As before, the imaginary frequency $\beta$ defines the ringing frequency of the single exponential wavelet under consideration, while $\alpha$ defines the real axis frequency and specifies the damping or decay time of the exponential. The objective of the electronic system will then be to estimate $\alpha$ and $\beta$ using the information derived from the zeros of $r(t)$. Both $\alpha$ and $\beta$ are first measured as functions of the zeros of $r(t)$ by conventional measurement devices. The residue wave form $r(t)$ is then processed to obtain either positive or negative half cycles, and the period of time of the ringing (assuming that $\alpha$ is less than $\beta$) is then measured. This period is termed $T_\beta$.

A convenient way to obtain the quantity $\alpha$ is to measure the period between the leading edge and the peak of the waveform so that $$\alpha = \frac{2\pi}{T_\beta \tan \frac{2\pi T_\alpha}{T_\beta}} \tag{8}$$

The parameter $\alpha$ then becomes the definition of residue. When the period $T_\alpha$ described above equals $T_\beta/4$ it corresponds to the duration of a quarter cycle of a pure sine wave, which then, at any frequency $\beta$, provides the reference zero band width IBW or, conversely, the maximum possible rise time. Therefore, the measurable parameter $T_\alpha$ is related to the residue $r(t)$ by Equation (6) above. Note that $T_\alpha$ is derived from the log derivative waveform, which is not variable with signal amplitude, and thereby removes certain practical problems from the system design. By using the function r(t) the system deals with normalized values. Normalized, as used herein, means a function which does not strongly vary with changes in amplitude. One purpose in obtaining function r(t) is to detect the arrival of a "feature" of the signal waveform f(t). The above mentioned "feature" of the signal waveform f(t) is defined herein as a characteristic of the waveform that may occur at an instant or over an interval of time and which is designed so as to deliver information that is related to the instantaneous bandwidth (IBW) of the signal waveform.

The relationships between $T_\alpha$ and $T_\beta$ are shown in FIG. 2 for values of $\alpha$.

In FIG. 2, the value $T_\alpha$ is the equivalent of timbre, whereas the quantity $1/T_\beta$ is periodicity or perceived pitch of the signal for different amounts of residue $\alpha$ in the signal.

The diagram of FIG. 2 forms the basis of the Aural Retina concept of the invention. Thus, elementary signal functions are instantaneously identified by their point positions within the existence diagram bounded by $\alpha=0$ for a sine wave signal condition. Note in FIG. 2 that no signal can exist to the left of $\alpha=0$. Between the values of residue from $\alpha=0$ to $\beta=\pi/4T_\alpha$ (a critically damped line), the signals are oscillatory and will have separable periodicities. A single impulse response would appear in FIG. 2 as a single point. Repetitions of impulse responses would produce unique patterns of dots depending upon the interference pattern of the excitation period with the ringing period.

In the overdamped region to the right of $\alpha=\pi/4T_\alpha$, single impulses will appear on the zero pulse repetition frequency axis at the measured rise time. Note that rise time is essentially the composite of all of the exponentials appearing at a given impulse epoch. However, a train of periodic pulses appears at a point specified by its rise time $T_\alpha$ and its repetition rate $T_\beta$.

Noise pulses will tend to scatter throughout the existence plane of FIG. 2, with their density concentrated near the periodicity of the upper band width cutoff of the system.

The above method has presupposed that $T_\beta$, the period of the ringing frequency, can be measured. In this elementary example, measurement of $T_\beta$ presents no problem, but in general, the measurement of $T_\beta$ requires a special measuring system which will be later described.

The above describes on type of Aural Retina which can be employed in accordance with the invention and relies on measurement at the real zeros of the function r(t). It is also possible to derive the residue function r(t) at the zeros of the function since the zeros will correspond to the peak values of f(t). Thus, it will be noticed, from Equation (6), that:

$$r(t) = \beta \cot \beta t - \alpha = (\cos \beta t / \sin \beta t) - \alpha \qquad (9)$$

From the above, when f(t)=sine $\beta t = 1$ (a peak), then $r(t) = -\alpha$. In general then, r(t), when it is sampled at the peaks of f(t) by the measuring equipment (or when the period between the leading edge (e.g. a positive or negative real zero) and the peak of the waveform is measured as defined by equations 7 and 8), will produce a measure related to the value $\alpha$.

In employing this type of measurement, the residue $\alpha$ will provide an instantaneous estimate of the waveform rate of change or instantaneous bandwidth. This method will then define a rectangular existence region instead of the triangular plane existence region of FIG. 2.

It should be noted that the pattern developed in FIG. 2 for the Aural Retina is similar to an existence diagram which was developed by Schouten on the basis of psyco-acoustic experiments on human subjects as described in the paper by R. Plomp and G. F. Smoorenburg, Editors, "Frequency Analysis and Periodicity Detection in Hearing", Lydon: A. W. Sijthoff, 1970. Thus, there is a correlation between the mathematical analysis above based on availability of waveform information vectors in an exponential waveform and the actual measured response of the ear as shown in FIG. 2A which is a reproduction of Schouten's existence diagram.

The diagram of FIG. 2, which represents the Aural Retina of the present invention, will have the various instantaneous WIV data applied thereto, where the WIV data can be relatively easily measured. It will later be shown how the WIV samples will be processed in order to derive the desired information concerning the source objects of the complex waveform.

The term "Aural Retina" has been selected because of the functional similarity between the spatial object analysis of the visual retina and the analysis of source objects in the space defined by the waveform information vectors. This is illustrated in FIGS. 3a and 3b which schematically illustrates a visual retina and an aural retina, respectively. In FIG. 3a, the visual retina will discern object shapes in a plane formed by a height and a width axis. A third dimension to the visual retina can be represented by the brightness of the object shapes. In the aural retina of the invention, object shapes can be thought of as lying in the plane of the Aural Retina of FIG. 2 and related to pitch and timbre, with the third dimension of the aural retina being loudness if the wave form being analyzed is a sound wave.

Signal detection in the Aural Retina, as in the eye, is related to two functions: (1) the sensing of an object pattern in terms of an energy threshold; and (2) the selection of a specified object pattern from a background of other patterns. In the aural retina of FIG. 3b the primary source object patterns are presented in the existence space bounded by residue and periodicity, as in FIG. 1 where the patterns represent signal identification. Acoustic sounds are similarly described in the ear by pitch and timbre, as shown by the existence diagram in FIG. 2A which was plotted on the basis of psycho-acoustic experiments on human subjects. In prior art arrangements in which Fourier analysis type of processing is employed for complex signals, it will be noted that the same signal can be represented by the Aural Retina with lower dimensionality than in possible using the necessary large number of Fourier coefficients. The lower dimensionality inherently permits the use of faster and cheaper processing for the processing of the signal, as will be described, and requires less memory than does the spectral analysis technique.

A significant feature of the invention is that the procedure described above is reversible. Thus, waveforms of arbitrary content can be synthesized by suitably programming the epochs and other waveform information vectors in the signal generating circuits.

BRIEF DESCRIPTION OF THE DRAWINGS

FIG. 4 illustrates analysis intervals method used for processing a complex waveform in accordance with the invention.

FIG. 6 is a block diagram of a preferred circuit arrangement constructed in accordance with the invention.

FIG. 7 is a block diagram of an analog residue processor which can be used in FIG. 6 and in connection with the present invention.

FIGS. 8a to 8f show a digital residue processor (except for FIGS. 8b and 8e which are associated timing diagrams) which can be used in place of the analog system of FIG. 7.

FIG. 9A illustrates an interleaved pulse train of overdamped wavelets which are to be analyzed.

FIG. 9B illustrates a waveform which is to be analyzed which has periodic excitation with an underdamped response function.

FIG. 10A illustrates an input signal which is to be processed.

FIG. 10B shows the clocked signal which is produced from the signal of FIG. 10A.

FIG. 11A schematically illustrates the reasons for false recognition of a pulse in higher octaves of a plurality of octaves.

FIG. 14 is a block diagram of a quasi-analog processor arrangement made in accordance with the present invention.

FIG. 15 is a segmented existence diagram useful for describing the outer product of the periodicity and residue which is measured in accordance with the invention and displayed in an Aural Retina type display.

FIG. 16 is a block diagram of an aural retina processing and automatic signal recognition circuit which can be produced in accordance with the invention.

FIG. 17 shows an alternative method for recognizing signal patterns which does not require the RAM of FIG. 16.

FIG. 19 is a block diagram of a waveform synthesizer made in accordance with the invention.

FIG. 20 is a diagram of a zero placement matrix used for the waveform synthesizer of FIG. 19.

FIG. 21 is a timing diagram of the zero placement matrix of FIG. 20.

FIG. 22 illustrates a method for residue modulation for a synthesizer arrangement.

FIG. 23 is a typical signal waveform to be analyzed.

FIG. 24 shows the spectrum analysis of the signal of FIG. 23.

FIG. 25 is the waveform of FIG. 23, along with pulses representative of different aspects of the waveform and the Aural Retina display corresponding to the waveform of FIG. 25.

FIG. 26 shows a second waveform, added to the waveform of FIG. 25.

DETAILED DESCRIPTION OF THE INVENTION

Figure 1:
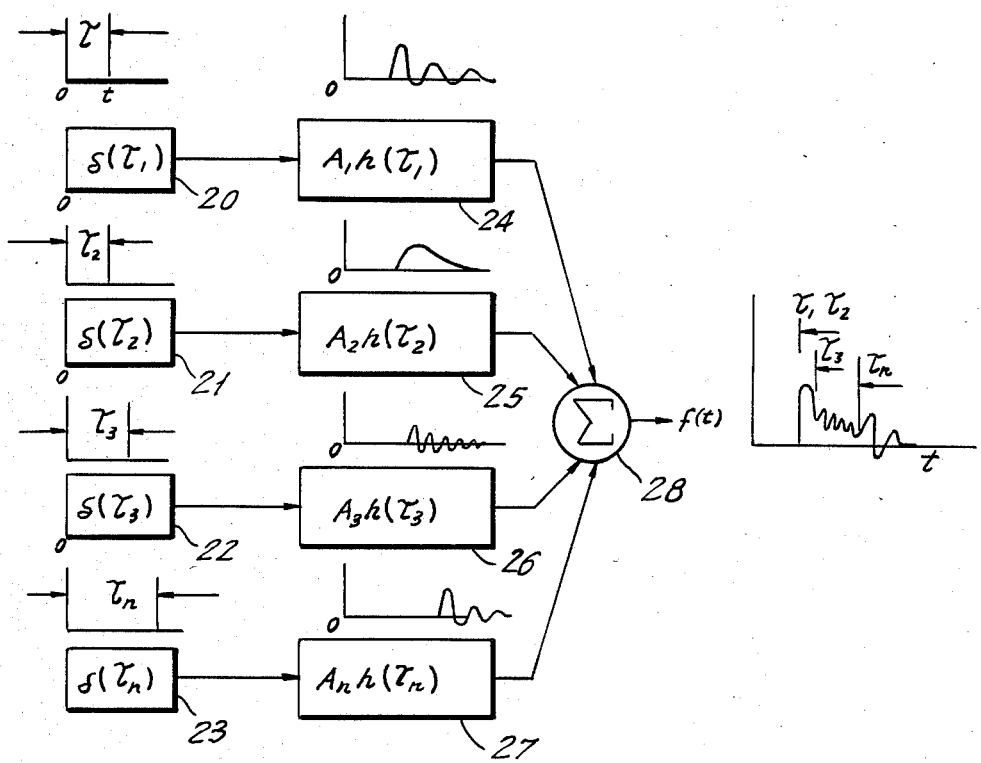
FIG. 1 is a schematic drawing illustrating a plurality of signal sources and their summed response functions.

Referring now to the drawings, FIGS. 1, 2a, 3a and 3b have been previously referred to. A block diagram of a circuit for analyzing WIV data sensed by at least two different sensors is shown in FIG. 4. In general, the analysis process of the invention, as shown in FIG. 4, employs the storage of each WIV as it is received. The WIV is then compared to prior WIVs. Decisions are then made concerning their meaning and taking action where necessary. The analysis can be carried out in at least five analysis intervals. In FIG. 4, there is shown a right sensor 30 and a left sensor 31 each of any desired type, each of which receives waveform energy from one or more energy sources. The sensors 30 and 31 are connected to WIV data measurement circuits 32 and 33, respectively, which will be later described, which are capable of extracting from the received signals, information regarding epoch $\tau$, energy A and residue R. By suitable manipulation of the data, the direction $\theta$ from which the signal came can also be determined. Note that greater numbers of separate sensors can be used to locate a source object within a solid angle by employing the trilateration process described in my prior U.S. Pat. 3,886,553, entitled "Coordinate Locating Method and System", issued May 27, 1975. However, the direction vector is not always necessary for identifying the source object or its message. Note also that in this measurement, the epoch $\tau$ is the time at which the signal is received, the energy A is the instantaneous level of the energy and the residue R corresponds to the residue r(t) of Equation (8).

The five analysis intervals shown in FIG. 4 are defined by the limits of the information available in the collected WIV data. At the instant data is received, the sample at each waveform zero will represent the first interval. The angle of arrival of the information may be immediately determined by comparison of amplitude and/or epoch in the sensors 30 and 31.

The information in the first interval from measurement devices 32 and 33 is processed to develop the spatial WIV information in the processing block 34. The immediately received information can be "flash" information which might develop information regarding the significance of the received signal. Thus, in the first interval, the system can supply rudimentary or flash answers to simple questions regarding the meaning of each WIV event. For example, if the question is: "Is the signal representative of a dangerous condition?", a threshold of amplitude, rate of change or direction can be established to specify some immediate response if danger is detected. Thus, it is not necessary in the first interval to identify the source but only its potential threat.

In the second analysis interval, there is provided circuitry for extracting the periodicity (T$\beta$) and for comparing epoch of the instantaneous signal to a prior signal. This circuitry is shown in block 35 of FIG. 4. If, in the second processing interval, events are observed to have equal time intervals, it can be determined that periodic signal components are present in the ensemble of f(t). Such components may be caused by excitation functions, underdamped system responses, or simply by random occurrences in a stochastic waveform. However, periodic excitation components will be continuously repetitive. The second interval adds periodicity information to the WIV data but only over a range of three instantaneous WIV events, which is the minimum for determining a periodic event. This added information does not usually supply sufficient data to allow identification of a source function so that the response action will be the same as that for the first interval and is identified simply as more "flash" in FIG. 4.

In the third processing interval, the WIV data, with added periodicity, are averaged over a short time interval within the processing circuitry 36. The short time interval is chosen to provide a reasonable estimate of the source object in the waveform received by sensors 30 and 31. This may be regarded as a "snapshot" of the source which allows identification of some aspects of the nature of the source such as who, what, where and when qualities.

The fourth analysis interval has circuitry 37 adapted to examine the successive snapshots from the third interval to determine variations in time and space in the source objects. This is analogous to successive production of still frames which compose a motion picture film. The effect of the additional analysis in the fourth analysis interval will supply answers to questions such as: "What are the objects doing?".

In the fifth analysis interval, circuitry 38 is provided which permits analysis of syntactic patterns which might answer a question such as: "What are the source objects saying?". There can also be succeeding analysis intervals which will be later discussed.

The analysis interval sequence shown in FIG. 4 represents a basic procedure for extracting information from any source in accordance with the invention. This procedure can be used to design any desired system for accomplishing the specified results. Thus, the analysis intervals and their circuitry 34-38 can be arranged as necessary depending upon the particular objective of the system. Thus, the circuit blocks 32 to 38 can be designed for speech processing, environmental sensing, biomedical signal analysis and for processing of other related signals. Note that systems employing some form of a Fourier analysis or, more generally, a least squares estimation of polynomial functions, cannot use the analysis sequence shown in FIG. 4.

Figure 5:
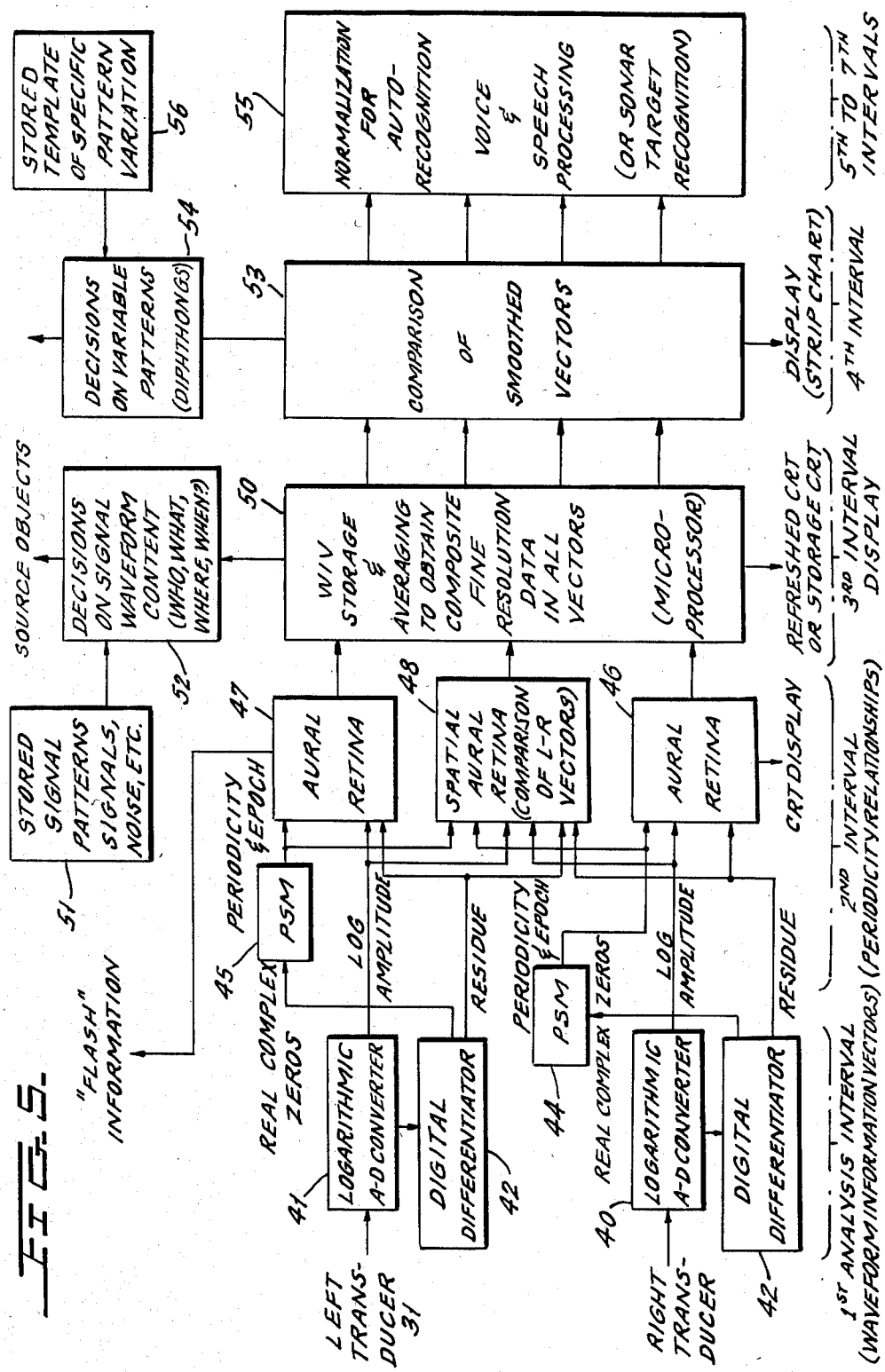
FIG. 5 is a functional block diagram of a system for carrying out the analysis intervals of FIG. 4.

FIG. 5 is a block diagram showing the functional data flow for the system of the invention. The system of FIG. 5 employs the same sequence of analysis intervals referred to in FIG. 4. Means are provided to first identify WIVs at signal wavefore zeros. These zeros can be the real zero crossings, the peaks and nulls, or both the real zeros and peaks and nulls. In the most general case, which is given in FIG. 5, there are two sets of WIVs to show the means of determining the direction of arrival at each sampling zero. Thus, there is an Aural Retina for each side of the system and a combined spatial Aural Retina in which left and right WIVs are compared to determine directional parameters.

The signals from transducers 30 and 31 in FIG. 5 are first sampled and processed by logarithmic analog-to-digital converters 40 and 41, respectively, which convert the received waveforms into logarithmic amplitude-encoded digital data. This is done to allow the sampling of a larger amplitude dynamic range in the instantaneous variations of the waveform than would be possible with standard automatic gain control methods. The log function is also necessary to produce the log derivative from which residue is derived. The peak amplitude, as a digital value, directly forms one element of the WIV space. Digital differentiators 42 and 43, respectively, produce the peaks and nulls of the signal as their outputs, which outputs are processed to give the residue vector of the WIV.

Thus, in the first analysis interval in FIG. 5, there is an amplitude output from the logarithmic analog-to-digital converters 40 and 41 and a residue output from digital differentiators 42 and 43. Information regarding the zeros, carrying the epoch information, is also connected to respective periodicity sorting matrices (PSM) 44 and 45, the details of which will be later described. Periodicity sorting takes place during the second analysis interval of FIGS. 4 and 5 by comparison of time intervals between zeros in such a way that all periodic components are detected and digitized.

Aural Retina circuits 46 and 47 are then provided for the right and left-hand sides of the system, respectively, and constitute circuits for making the first estimates of the waveform content received by transducers 30 and 31, respectively.

Figures 2, 2A:
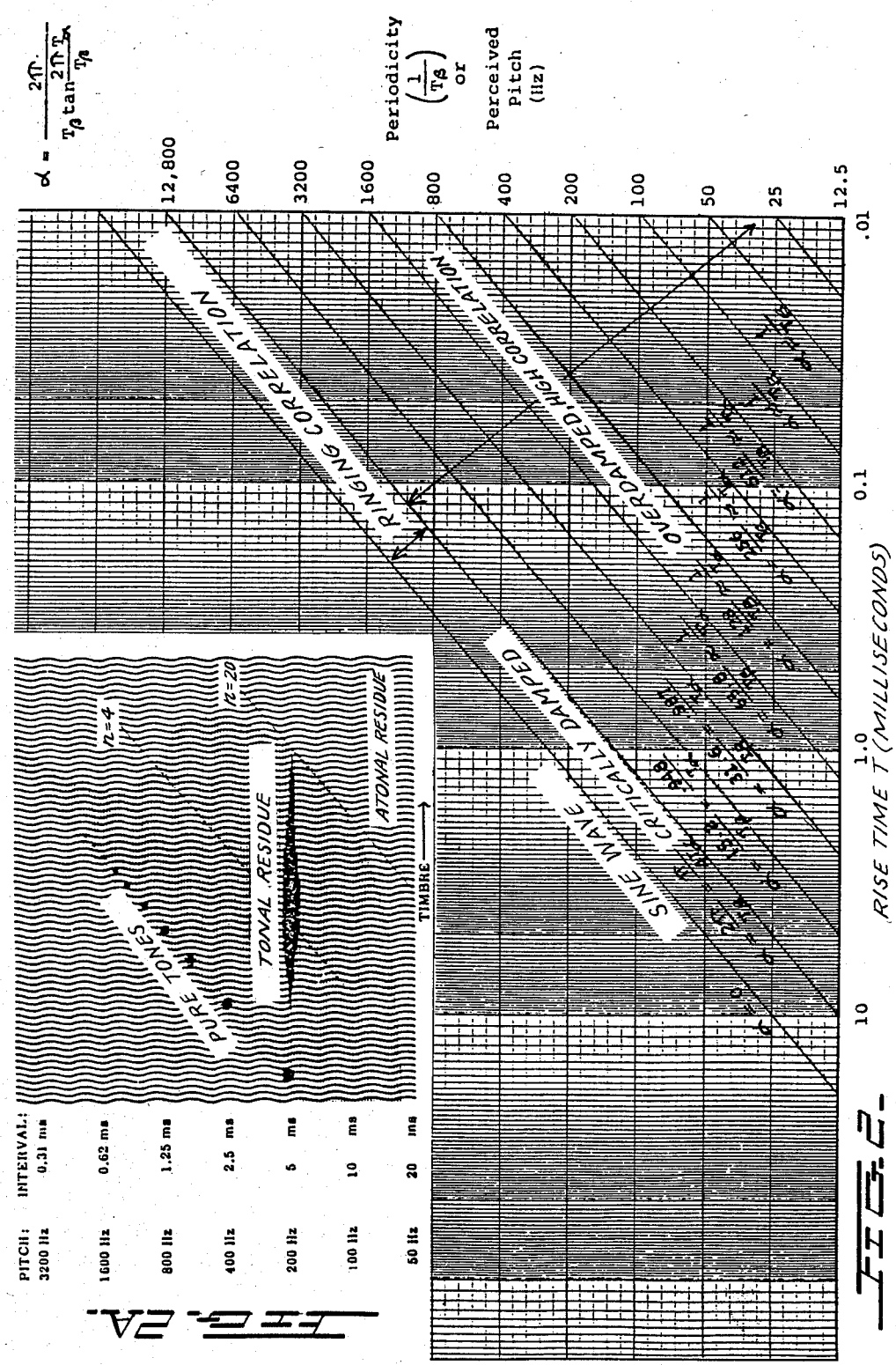
FIG. 2 schematically illustrates a two-dimensional existence plane in which particular signals can be displayed in accordance with the invention.
FIG. 2A is a diagram produced by psycho-acoustical experimentation on the performance of the human ear.

Since the aural retinas 46 and 47 represent multi-dimensional space, if visual display is needed, appropriate displays can be driven by the Aural Retina circuits 46 and 47. The visual interpretation or display of the vectors can be carried out in various ways and the method selected depends on the information which is of interest. It is generally not necessary to observe all vectors simultaneously. In particular, the primary vectors are contained in the existence plane bounded by residue and periodicity which are the two parameters present in the main waveform identification information, as shown in FIG. 2. This allows the observer to perceive "flash" data quickly. That is, he can understand patterns having particularly important instantaneous content.

Also provided in FIG. 5 is a spatial aural retina comparison circuit 48 which receives all of the information input to Aural Retina circuits 46 and 47 but makes comparisons between the left transducer vectors and right transducer vectors. Comparison circuit 48 can employ conventional amplitude comparison and/or time-difference direction finding circuits such as those used in radio direction finding applications. The perception of amplitude and direction is useful in certain operational situations but is most helpful in providing a signal object sorting function analogous to the way binaural hearing allows listeners to ignore reverberations and conflicting sounds.

Figure 3A:
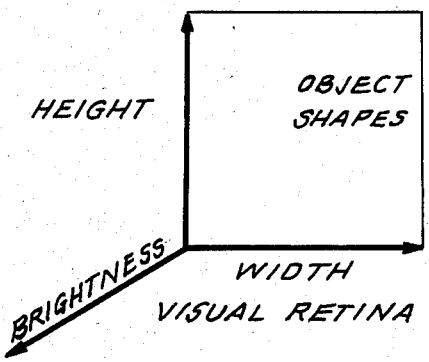
FIGS. 3A and 3B compare the characteristics of the visual retina to the Aural Retina of the invention, as shown in FIG. 2.
Figure 3B:
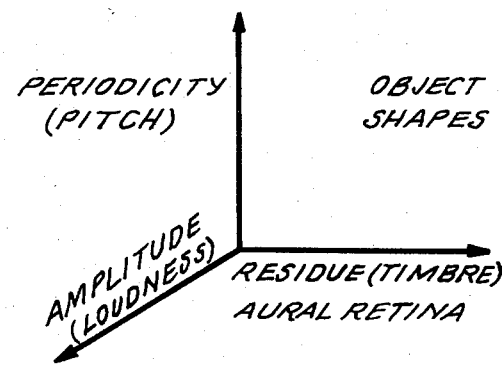

Although the Aural Retina circuits 46 and 47 perform signal analysis, the circuits are not employed for making the main decisions about the content of the ensemble. The analogy between the visual and Aural Retinas of FIGS. 3A and 3B is appropriate at this point. Thus, the Aural Retina should be regarded essentially as the repository of spatial patterns and only subsequent recognition processes can identify the patterns and interpret their meanings.

The third analysis interval of FIG. 5, like that of FIG. 4, concerns the storing and averaging of the rough data of each arriving WIV. This processing is employed to produce a set of smooth WIVs which can be observed visually in selected situations, then stored and retrieved at will. In the third interval display there is provided circuit 50 for WIV storage and averaging to obtain composite fine resolution data. Suitable microprocessors can be employed for the circuitry 50. A storage CRT can also be used for storing and averaging.

Since the patterns are now under the control of the system, "templates" of desired WIVs may be provided to enable automatic recognition of various input signal situations. Thus, there may be provided a source of stored signal patterns 51 which can be applied to a suitable comparator 52 which will determine whether the WIVs received in the storage 50 correspond to predetermined signal patterns of system 51. If a "hit" is determined, the circuit 52 can produce a suitable decision or output related to the signal waveform content which has been processed in the circuitry 50.

In the Aural Retina concept, this function is the equivalent of signal detection. Note that unlike the conventional method of frequency-selective energy detection, no decision is made to reject or to select energy during the process. Thus, when a signal is detected by a recognition decision, it does not necessarily remove the WIV pattern of any other signal. The arbitrary and simultaneous detection by recognition of a wide variety of interleaved signal patterns can thus be carried on and the adaptive selection processes are easily implemented.

In the fourth interval of FIG. 5 there is provided circuitry for comparing smoothed vectors, shown as circuitry 53. In this circuitry 53, assemblies of smoothed WIVs which contain certain common features are compared and variation patterns are identified. For example, this process might recognize diphthongs (pitch or formant variation) in speech. Circuitry 54 can be provided to produce outputs related to decisions on variable ptterns. Circuitry 53 can also be employed to drive a display which could, for example, be a strip chart.

Relatively few signal sources other than human speech will require more than three or four of the processing intervals shown in FIG. 5. Other steps, however, are possible and, for example, a fifth processing interval can be employed which contains circuitry 55 for normalization for automatic recognition of a voice and for speech processing. Circuitry 55 could also be used, for example, for sonar target recognition if desired. A stored template for a specific pattern variation is shown by the circuitry 56 and can be connected to the block 54 for automatic recognition of a predetermined pattern variation.

FIG. 5 demonstrates the broad aspects of the Aural Retina concept and shows that there will be many common features among any number of specific applications of the concept. Any desired circuits can be employed to carry out the various functions disclosed in FIG. 5.

A specific Aural Retina arrangement which can be used in FIG. 5 is shown in FIG. 6 in block diagram form for the channel of FIG. 5 which extends from the signal sensor 30. The circuitry extending from signal sensor 31 of FIG. 5 will be essentially identical to that which will be described in connection with FIG. 6.

The object of the system of FIG. 6 is to carry out the computations indicated by Equations (8) and (9). The general procedure carried out by the block diagram of FIG. 6 will be to convert signal waveform into a unipolar logarithmic form from which amplitude, residue and epoch are obtained. It may be necessary, in certain applications, such as in processing seismic signals used in geophysics, to analyze both positive and negative polarities. This would require a dual LAD. Outputs of the dual LADs would be processed identically and then merged, where appropriate, into the PSM for periodicity analysis. Thereafter, periodicities are measured and associated with the WIV data in a short-term storage device. This interim storage permits the accumulation of recurring data patterns which characterize individual signals. Thereafter, periodically, these patterns are scanned into a microprocessor-controlled storage where smoothing, display and automatic signal recognition are performed. This process accomplishes the functions for the first three processing intervals of FIG. 5. Subsequent processing in four or more intervals would be performed primarily in conventionally designed computer algorithms.

In FIG. 6, components identical to those of FIG 5 have been given identical identifying numerals. It will be seen that the sensor signal 30 is firt applied to a preamplifier 60 and then to the logarithmic analog-to-digital converter 40. A conventional clock 61 is connected to converter 40, residue processor 62, periodicity sorting matrix 45 and epoch frame circuitry 63. After amplification and digital conversion, the residue processor 62, which is a part of the digital differentiator 42 of FIG. 5, extracts and encodes amplitude and residue information, as well as the real and complex zeros which contain the epoch data. The zero information and amplitude information is applied to circuits 64 and 65, respectively, and the residue information is applied to circuit 66. The zero information of circuitry 64 is then applied to the periodicity sorting matrix 45 and the output of circuits 45, 66 and 65 is applied to a WIV format circuit 67. Note that the periodicity sorting matrix 45 has analyzed the zeros and sorted the periodic sequences to identify their arrival times.

An outer product matrix circuit 68 receives the WIV format information from circuit 67 and the epoch frame information from circuit 63 and operates to assemble the WIVs for instantaneous identification. The outer product matrix circuit 68 then transfers each recognition event to a temporary storage circuit 69 where averaging and interpolation of the outer product matrix can be performed. Automatic recognition of selected source objects can also be accomplished at this level in the automatic source object recognition circuit 70. The output of outer product matrix circuit 68 is also applied to the visual Aural Retina display circuit 71 and the information from interpolation and averaging circuit 69 is also output to the Aural Retina display 72 which produces the smoothed information.

In general, the signal processing functions of the blocks shown in FIG. 6 could be performed by analog methods. That is, they could operate directly on signal waveform, as shown in FIG. 7. Referring to FIG. 7 which shows an analog residue processor, it is seen that the signal f(t) is connected to a unidirectional logarithmic amplifier 80, the output of which is connected to a differentiator 81 which has an appropriate RC time constant circuit. The output of differentiator 81 is the log derivative of f(t) which contains the desired residue function r(t). Since this constant occurs only at the peaks of f(t), it is necessary to gate out the log derivatives at only these instants by selecting the peaks of f(t). For embodiments using the alternative described by equations 7 and 8, residue is defined as the time period between the real zero crossing of detector 86 and the generation of the peak signal from gate 84. Each of these is done by differentiating the function f(t) in differentiator 82 and then detecting the zero crossings in the conventional zero crossing detector circuit 83. These zero crossings are then used to operate the gate 84 and the gate 85 in order to gate the residue function and the log of the amplitude, respectively, into the subsequent processing circuit only at the peaks (or nulls). A zero crossing detector 86 is also connected to the output of the log amplifier 80 in order to apply the output log f(t) only at the time there is a real zero. Note that real zeros are detected from the edges of the log f(t) signal. Also note that the peaks in the signal correspond to the first-order complex zeros and are used for further analysis.

While the analog circuity of FIG. 7 is relatively simple in structure, the logarithmic amplifier 80 and differentiator 82 and the peak detector circuitry are costly. Moreover, a digital processing circuit would lead directly to the output form needed for subsequent processing by a digital microcomputer used for pattern recognition.

In FIGS. 8a–8f, various subsystems are illustrated, including: a logarithmic analog-to-digital converter in an overall block diagram which shows the paths of the various digital timing waveforms as they relate to the various system functions; a detailed logic design diagram for the three basic blocks or PC boards of the present operating system; and timing waveforms showing how the various functions are performed in digital processing.

FIG. 8a shows the various timing control lines derived from the base clock 90. There are three basic control areas separated by dotted lines: (1) the LAD sampling switch 91; (2) the digital differentiator and data encoding circuits 92; and (3) the PSM data input and readout 93.

A timing divider 94 produces a set of timing pulse trains which are used to derive the proper durations for the control signals. The LAD switch pulse put out by timing logic circuit 95 is designed so that its period coincides with the basic shift register clock within the PSM 93. The switch pulse width is chosen to be as small as is consistent with the RC charge and discharge requirements of resistor 96 and capacitor 97 of the switching circuit.

The LAD sampling switch circuit 91 has a signal input thereto which is the signal f(t). This signal is applied to preamplifier 800 and to an appropriate LAD switch circut 801 which is connected through the RC circuit 96–97 to the comparator 802. The output of the comparator 802 is then connected to one input of gate 803 and to one input of a real zero select circut 804, as will be described. The other input to real zero select circuit 804 is derived from the LAD switch pulse and the other input to gage 803 is derived directly from the fast clock output of timing divider 94. A control logic circuit 805 receives inputs from the divide by two output of timing divider 94; from the divide by 64 output of timing logic circuit 95 and from the fast clock output of timing divider 94. The control logic outputs of circuit 805 are then connected to data counter 810, which also receives the output of gage 803, to complex zero select logic circuit 811 and to the latch 812. The outputs of data counter 810 are applied to subtract circuit 813 and to latch 812 as shown and the subtract circuit outputs of circuit 813 are applied to residue latch 814 and amplitude latch 815. The output of select logic 811 is applied to the zero mode combination select circuit 816 and the various circuits are interconnected with one another, as shown. The output of residue latch 814 consists of the residue function, while the output of amplitude latch 815 is the log amplitude output function. For embodiments using the alternative described by equations 7 and 8, residue is defined as the period between the time when the output of select circuit 816 indicates a zero crossing to when a peak is reached as indicated by latch 814. The PSM data input and readout section 93 consists of a readout scan select logic circ uit 820 which receives outputs from the fast clock read-out scan clock and shift clock, respectively, and its eight output leads (typically) are connected to the periodicity sorting matrix 45. The periodicity sorting matrix 45 has an output connected to counter 821 which, in turn, operates latch 822 which puts out data related to digital periodicity in the input signal. An interrogate pulse logic control circuit 826 is provided and receives an input from the shift clock and from the zero mode combination select circuit 816 and produces an output to the periodicity sorting matrix 45.

The waveforms of FIG. 8b illustrate the operation of the LAD 91. The waveform f(t) is the output of the preamplifier 800 which feeds the switch 801 controlled by the switch pulse. At each switch pulse the electronic switch circuit (typically a CMOS semiconductor chip such as the CD4066) is closed, causing the capacitor 97 to charge to the level E of the signal f(t) at that instant. When the switch pulse is removed, the capacitor 97 discharges through the resistor 96. The discharge voltage appears at the input of the amplitude comparator 802 (an LM311 chip). Comparator 802, which was turned ON by the charge voltage, remains ON until the discharge falls below the threshold level $E_T$. The threshold $E_T$ is usually selected to be as close to zero as possible so as to achieve a large amplitude dynamic range. The duration of the comparator pulse is given by $T = RC \log E/E_T$, where RC is the time constant. For maximum dynamic range, $E_{max}/E_T$, the value of RC is selected so that T is less than the period of the switch pulse.

Also shown in FIG. 8b is a "cleaned" comparator pulse output where the switch pulse is used to cancel out its own contribution to the width of the comparator signal, and to eliminate spurious transients. From there, the comparator pulse as shown in FIG. 8b is used to gate fast clock pulses into the data counter 801.

The cleaned pulse is also sent to the real zero select logic 804, which detects when the shift clock interval within which the waveform f(t) goes from negative to positive. this clocked zero pulse is illustrated in waveform (f) of FIG. 8(b).

The gated pulses of waveform (e) of FIG. 8b are sent to the data counter 810, which converts the sequence of pulses in each sample into a binary number. Under the sequence of operations determined by the control logic for each sample period, shown in FIG. 8(e), these sample numbers representing the logarithm of the waveform's instantaneous amplitude are subtracted, compared, latched (stored), and cleared. In the subtract operation, the stored two's complement number, B, of the previous sample is added to the "present" number, A, in the binary counter 810. This operation is equivalent to a discrete derivative of the logarithm of the waveform f(t), and thus represents the log derivative. Occurring simultaneously with this subtraction operation is the comparison decision which determines whether the present number, A, is greater than or less than the previous number, B. This decision is detected by sensing the condition of the "sign bit" output of subtract circuit 813 of the two's complement difference. If there is a change in the sequence of decisions, it indicates the occurrence of a null or a peak. This peak/null decision is then converted by circuit 811 to a clocked pulse for analysis in the PSM. Various combinations of peaks, nulls and zeros can be selected for experimental situations in signal analysis.

Following the subtract operation, there is a control pulse from logic circuit 805 which decrements the counter data of counter 810 by two and invert it so as to produce the two's complement number, (as described in further detail hereinafter in FIG. 8f) which is then latched in latch 812 and cleared from the counter in preparation for the next sampling interval. although the subtraction occurs on every sample interval, the result is stored in the latch register on only those samples for which a zero has been detected. This sample represents the instantaneous residue function f($\alpha$). As noted above, the time between zero-crossing end peak can be used instead as a measure of residue. In a similar manner, the log amplitude information (before two's complement) can be stored at peak complex zeros. These time-coincident samples of amplitude and residue now compose two of the waveform information vectors or "WIVs". (As described earlier, the amplitude samples can be compared to derive a direction-related vector.)

Note that each sample interval corresponds to the main shift clock interval which controls the delay shift registers of the Periodicity Sorting Matrix 45. FIG. 8a shows the lines carrying the timing signals and the functional blocks associated with the PSM 93. The PSM requires the shift clock timing signal to control its delay shift registers, a readout scan select signal to control the sequence of reading out the detected periodicities, and a means for digitally encoding the periodicity measurements as they are read out of the PSM. The interrogate pulse logic 826 accepts the zeros from the digitial differentiator circuit and assures timing for correct input to the PSM shift register.

It shoud also be noted that there is a block which allows selection of any desired combination of the waveform zeros as follows (null refers to a local minimum):
  real zero
  peak
  null
  real zero+peak
  real zero+null
  peak+null
  real zero+peak+null
In the above, the term (+) is defined as a logical OR. The ability to make this selection is desirable in obtaining optimum processing for various types of input signals. for example, at present it appears that the best analysis of human speech would use the real+peak mode.

It can be seen from FIG. 8a that the binary data of the periodicity measurements is stored in latch 822 so that it can be processed according to the methods previously described for the Aural Retina.

Figure 8C:
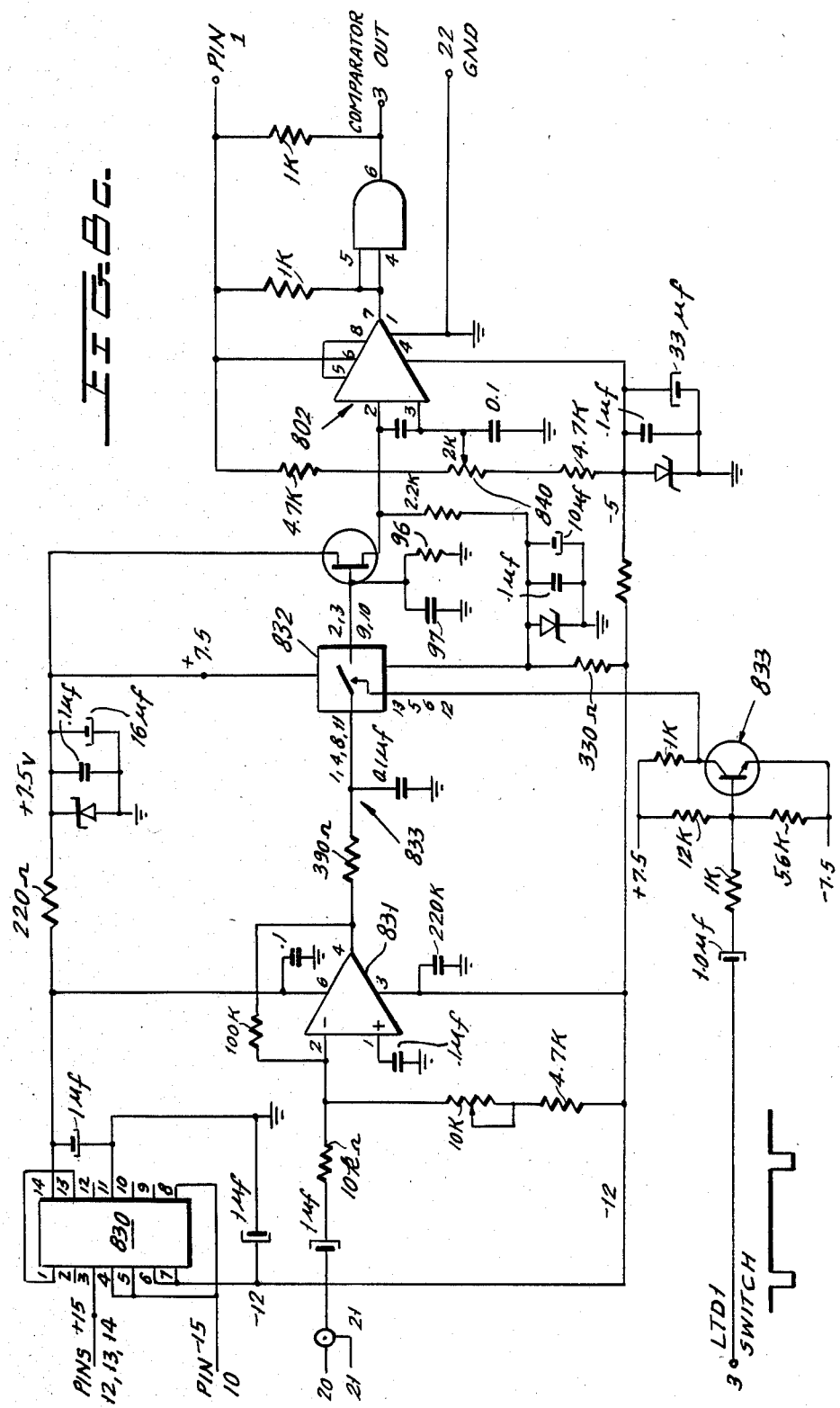

FIG. 8c shows a detailed circuit diagram of an operable LAD circuit 91. This circuit carries the necessary component identification, and carries out the functions of the amplifier 800, switch 801 and comparator 802 described in FIG. 8a. The component pin members are also shown. An LM326 precision voltage regulator 830 to supply +12 volts to the LN387 feedback inverting amplifier 831 is provided. The CD4066 switch 832 is controlled by the positive switch pulse derived from the 2N3904 transistor amplifier 833A. Amplifier 833A is needed to convert the 5 volt TTL logic level to the 15 volt level for proper switching of switch 832. A low pass filter 833B is used to help isolate switching effects from the preamplifier 831.

The discharge time constant RC of resistor 96 and capacitor 97 is chosen at 10K ohms and 220 pf to accommodate the desired dynamic range. The output of the switched waveform is isolated from the comparator 802 by using a 2SK43 field effect transistor source follower 833C with high input resistance and low output resistance. The LM311 comparator 802 triggers positive and recovers when the signal falls below the threshold adjusted by the variable resistor 840. Bypass capacitors are used to reduce triggering on stray noise and to stabilize the triggering action. The SN7408 gate 833D is used to buffer the comparator from the various subsequent load functions.

The feedback input amplifier 831 contains an offset voltage balance adjustment. Also, there are 7.5 volt zener diode regulators in the ±12 volt supply "rails". This is needed to reduce the total voltage supply to the CD4066 to within the manufacturers' 15 volt limit.

Returning to FIG. 8a, there is next described the logic which is used to generate the timing signals needed to drive the PSM 93 and the digital differentiator 92. This circuitry is given in detail in FIG. 8d, and the waveforms seen at various points in the timing sequence are shown in FIG. 8e. The master clock 90 is an oscillator using an SN74LS04 hex inverter with capability for a 2:1 frequency adjustment at 2 MHz. The output is labeled "Fast Clock" and is used directly in subsequent logic. From here, the clock rate is divided by two in successive steps labeled A, B, C, D and E, in FIG. 8e. The waveforms are obtained from the two SN7493 integrated circuits $M_2$ and $M_3$. At point "E" the waveform is again divided by two in two channels so as to obtain a two-phase clock. The E clock is thus inverted before driving divide circuits $M_6(A)$, from which the main PSM shift clock is derived. The uninverted E clock is divided by $M_6(B)$. This set of waveforms now allows formation of some required control signals. The LAD switching pulse is derived by AND gates $M_4$ and $M_{11}$ (pins 8, 9, 10), which perform AND on waveforms B, C, D, E and G of FIG. 8e. The inverted output is shown in curve (i) of FIG. 8e. The scan pulse gate J of FIG. 8e is derived from $M_{11}$ (pins 4, 5, 6), which performs AND on waveform H and the shift clock. The J signal then performs AND on the A clock signal such that 24 pulses occur per each shift clock interval through AND gate $M_5$ (pins 11, 12, 13), as in FIG. 8(a).

The cleaning pulse is generated by the D flip-flip $M_{12}$ and AND gate $M_5$ (pins 8, 9, 10) of FIG. 8d. The purpose of this circuit is to widen the switch pulse slightly so that undesired switching transient effects can be removed from the comparator output. The D flip-flop provides one delayed fast lock pulse that is combined with the switch pulse to give the waveform shown in curve (p) of FIG. 8e. The readout scan clock must next be switched into discrete channels to provide a sequential readout shift clock to be used in the PSM 45. This is accomplished by the counter $M_7$, which generates a 3-bit sequential binary code. This code is demultiplexed by $M_8$ (74138) so as to produce a pulse with a duration of one shift clock interval which cycles over the eight octave channels. This switch gate thus selects the proper PSM channel to receive the readout scan clock pulses using the inverters $M_9$ and $M_{13}$, and AND gate $M_{15}$ and $M_{14}$. This sequence is illustrated in curves (g) and (r) of FIG. 8e. The selected readout scan clocks for octaves 8 and 7 are chosen to illustrate the beginning of the eight-octave scan cycle which proceeds from 8, 7, 6 ... 2, 1; then recycles to 8, etc. This allows the periodicity data to be scanned in order, from the lowest to highest frequencies. Digital encoding of the recognized periodicity sample is provided by the binary counter $M_{10A}$ and $M_{10B}$. This counter accumulates the number of readout scan pulses for each eight-octave scan cycle. When a periodicity recognition pulse occurs, as illustrated in curve (s) of FIG. 8e, the serial data pulse corresponding to the recognition channel gates out the binary number into an eight-bit parallel bus. The example of FIG. 8e shows a periodicity recognition at channel 36 with the corresponding binary number in curve (t) of FIG. 8e.

It should be noted that this method of data read-out was chosen for certain practical system considerations. Several alternative methods can be devised, as will be apparent to skilled binary logic designers.

As shown in FIG. 8a, the control signals for the digital differentiator section 92 are also derived from the timing logic circuit 95. This control logic is detailed in the circuit diagram of FIG. 8f. The control signals in FIG. 8f are formed through the logical sequences produced by AND gates contained in $M_2$, $M_5$, $M_7$ and by the inverters of $M_1$. They are three successive pulse signals, shown in curves (j), (k) and (l) of FIG. 8e and designated Subtract, Complement and Latch/Clear.

The gated clock pulses (see curve (e) in FIG. 8b), which are produced by the AND gates $M_2$ (11, 12, 13) and $M_2$ (8, 9, 10), are fed to the eight-bit up-down counter $M_{11}$ and $M_4$. The total count is always reached prior to the end of the control pulse timing cycle. During the counting cycle the counter outputs are passed through the exclusive OR gates $M_{14}$ and $M_{15}$ to the eight-bit binary adders $M_{16}$ and $M_9$. These adders are also connected to the eight-bit latches $M_{10}$ and $M_3$, which contain the two's complement result of the previous count cycle. Thus, the eight-bit output of the adders presents the continuous difference of the counting cycle with the previous frame count. At the end of the count cycle the difference remains static.

The control pulse sequence proceeds from this point. The first control pulse is the "Subtract" pulse, which transfers the frame difference into the storage latches $M_6$ and $M_{12}$. The subtract pulse also clocks the J-K flip-flop and causes its state to change, depending on the presence or absence of a sign bit in the latch $M_{12}$. This decision determines whether the present count A is greater than or less than the previous count B. Using this data, the two dual D-type flip-flops and AND gates produce pulses corresponding to the peaks and nulls of the signal waveform, as will be described later.

The second control pulse, the "Complement", has two effects: it decrements the up-down counter by one bit, and it then causes the exclusive OR gates to invert, or complement, the binary number from the counter. This is the two's complement number which the Latch pulse (the third in the sequence) causes to be stored in the latches $M_{10}$ and $M_3$ of FIG. 8f. The latch pulse also activates a one-shot multivibrator $M_8$ which produces a very short pulse of about 125 nanoseconds in width. This pulse, being slightly delayed, then clears the counters in readiness for the next counting cycle. The purpose of the delay is to assure that the number is stored before it is cleared.

The real zero instant is selected by using the cleaning pulse 5(p) to clock the D-flip-flop pair $M_{13}$ with the LAD comparator output feeding the D input. This circuit selects only the positive transitions of the signal envelope as it crosses the real zero axis. Its duration is only one shift clock interval.

An illustration of the zero selection process derived from the waveform sample is shown in FIG. 8b. In this timing diagram are seen the comparator pulse (c), the cleaned comparator pulse (d) and the gated fast clock pulses used to encode the data (e). As the waveform f(t) crosses the zero axis, the LAD comparator is triggered and remains H (High) until the waveform falls below zero. This zero crossing thus produces a pulse having a width of one shift clock period (f). As the waveform increases in amplitude, the decision A>B continues H until sample pulse #4. Since the comparator width (digital amplitude) of #4 is less than #3, the sign bit decision A<B goes H, causing a transition in the J-K flip-flop. The illustration in FIG. 8b shows the resulting pulse in waveform (g), which identifies the peak of waveform f(t). Note that the decision is necessarily delayed by two shift clock intervals, but this is a constant which is accounted for in subsequent processing.

Note that the null mode, which detects the transition to A>B will occur at both the real positive zero and at any null in the waveform. Thus, if only the null zero is desired in subsequent processing, it will be necessary to combine the separate real zero detection with the real zero portion of the null mode detection such that the real zero is cancelled.

The periodicity sorting matrix 45 of the preceding description is the circuit which recognizes and sorts all periodic elements of the signal ensemble simultaneously. The signal ensemble which is applied to the periodicity sorting matrix can in general consist of various mixtures of random or periodic excitation of overdamped and underdamped wavelets. When considering the category of periodic signals, there are two basic situations:

(1) Two or more interleaved unsynchronized pulse trains of which at least one is periodic (wavelets are overdamped); or (2) A periodic excitation with oscillatory response functions (wavelets are underdamped).

These two signal conditions are shown in FIGS. 9A and 9B, respectively. FIG. 9A shows two interleaved pulse trains having the period $T_1$ and $T_2$, respectively. FIG. 9B shows a waveform which is typical, for example, of voiced speech where the repetition rate defines the voice pitch.

The ringing wavelet responses are known as formants. The essential problem of measuring the individual repetition periods of the waveforms of FIGS. 9A and 9B can be seen from the Figures. It is apparent that no method which is based solely on measuring successive time intervals of zero crossings or peaks could succeed at sorting interleaved signal sources. However, in accordance with the present invention, a novel periodicity sorting matrix, schematically illustrated in FIG. 11, is provided which accomplishes this function.

Figure 11:
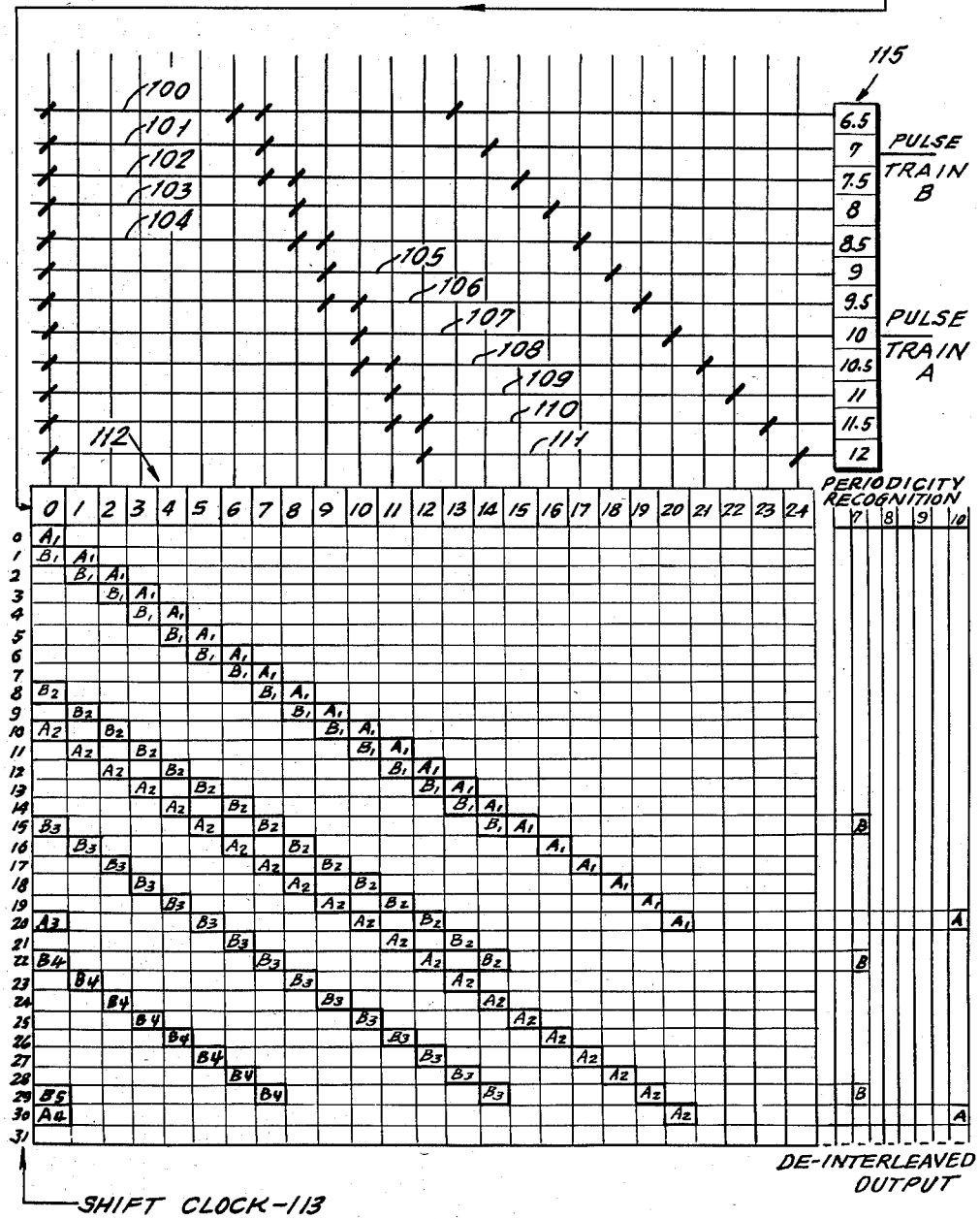
FIG. 11 schematically illustrates a logic map of a novel periodicity deinterleaving system for deinterleaving the signal train of FIG. 10B.

The arrangement shown in FIG. 11 is based on the continuous analysis of a signal for its periodic components as it propagates through a tapped delay line. An array of logic gates is connected in such a way that whenever a signal pulse arrives at the input, there is simultaneous comparison with all previous pulses in the delay line. This occurs in such a way that the event of two equal time spacings can be recognized. This event is defined here as a periodicity. Periodicities do not have to occur in a contiguous sequence as do pulses in a pulse train. For example, a series of randomly spaced pulses will occasionally produce three pulses having equal intervals. In the purely random series, these false periodicity detections would be distributed over the range of recognition gates with equal probability. The statistical frequency of the false recognition would depend on the pulse density of the ensemble. When the distribution is not completely random, but is centered near a particular repetition rate, as in a "jittered" pulse train, the number of responses is largest at the gate corresponding to the average pulse repetition frequency surrounded by a Gaussian-type distribution of responses. The spread of this distribution will depend on the signal-to-noise ratio.

FIG. 11 shows schematically the topological relationship of an array of AND gates and a delay shift register. FIG. 11 is a "logic map" of the circuit arrangement. The illustrative circuit of FIG. 11 contains twelve AND gates each schematically illustrated by a respective one of horizontal lines 100–111. Each of the AND gates 100–111 is connected to the schematically illustrated tapped shift register delay line 112 which has 25 positions. The gates 100–111 are connected to the various positions of the shift register at the points represented by diagonal slashes along the length of the horizontal lines representing the gates 100–111. The signal coming into the shift register 112 is the signal derived, for example, from an output of the zero select logic 811 of the digital residue processor of FIG. 8a. This signal is connected to a log A-D converter 40, digital differentiator 114 and zero select logic 811. Thus, the input signal which might have the form shown in FIG. 10A will be converted to the signal shown in FIG. 10B. Note in FIG. 10B the interleaved pulses of pulse train A and of pulse train B are labeled separately as $A_n$ and $B_n$, respectively.

A shift clock 113 timing diagram is schematically illustrated at the lower portion of FIG. 11 with a matrix which schematically illustrates the manner in which pulses A and B enter the shift register and then propagate down the shift register delay line 112. The AND gate connections shown in FIG. 11 are arranged sequentially and respond to any periodic event which occurs within a 2:1 range. Alternating pairs of connections of the center tap of each periodicity gate 100–111 are needed to assure recognition of all possible combinations of intervals between the sequential pulse pairs. These combinations are a result of the 24 discrete clock time intervals of the shift register delay line 112. For convenience in describing the system, the time scale of the signal is shown quantized into the same 24 units as those of the tapped shift register delay line.

The two pulse trains A and B shown in FIG. 10B are also shown timed to the same scale as that of the shift clock 113 and have periods of 6 and 10 time units, respectively. When the first pulse of wave train A, labeled pulse $A_1$, enters the delay line 112, there are no other pulses, so there is no recognition. Similarly, when pulses $B_1$, $B_2$ and $A_2$ enter sequentially, there is no recognition of any periodicity and they continue through the system. When pulses $B_3$ arrives at time unit 15, however, pulses $B_2$ at time unit 8 and $B_1$ at time unit 1 are in the system and three simultaneous pulses are produced, thereby producing a recognition response for pulse train B having a period of seven time units. In a similar manner, when pulse $A_3$ arrives, there will be another recognition from the ten unit gate. With subsequent operation, each pulse train is continuously deinterleaved in the discrete channels of periodicity recognition register 115.

In the circuit of FIG. 11, it is extremely important to use the 2:1 relationship of submultiples in order to provide a logical inhibit function to prevent false response of the system. Thus, it is necessary to eliminate false responses at submultiples of the true periodicity under the assumption that it is desirable to recognize periodicities over a range greater than one octave. The key to removing these false responses is the 2:1 relationship referred to above.

The problem of submultiple recognition is illustrated in FIG. 11A which schematically illustrates 17 time units divided into submultiples (octaves) of period T, 2T, 4T and 8T. As seen by inspection of FIG. 11A, a continuous signal of period T will produce responses in the lower gates of FIG. 11A. However, since the periodicity recognition occurs first in the upper octave, it is possible to generate an inhibit function which can remove the responses from the lower octaves. This can be done in one of two ways:

(1) There can be a direct inhibit of each false submultiple recognition simultaneously with its occurrence in the lower octaves; and (2) The possible occurrence of lower octave recognition can be prevented by preventing the propagation of those pulses in the delay line 112 of FIG. 11 which are directly associated with pulses already recognized in the upper octave.

Method (1) above has the advantage of simplicity since it requires only a simple logical inhibit function in the output of each recognition gate. However, in a practical situation which must deal with complex de-interleaving, the number of pulses per octave increases geometrically in successive lower octaves. Thus, the number of false periodicity recognitions would exceed the true recognitions and the system would not be effective.

Figure 12:
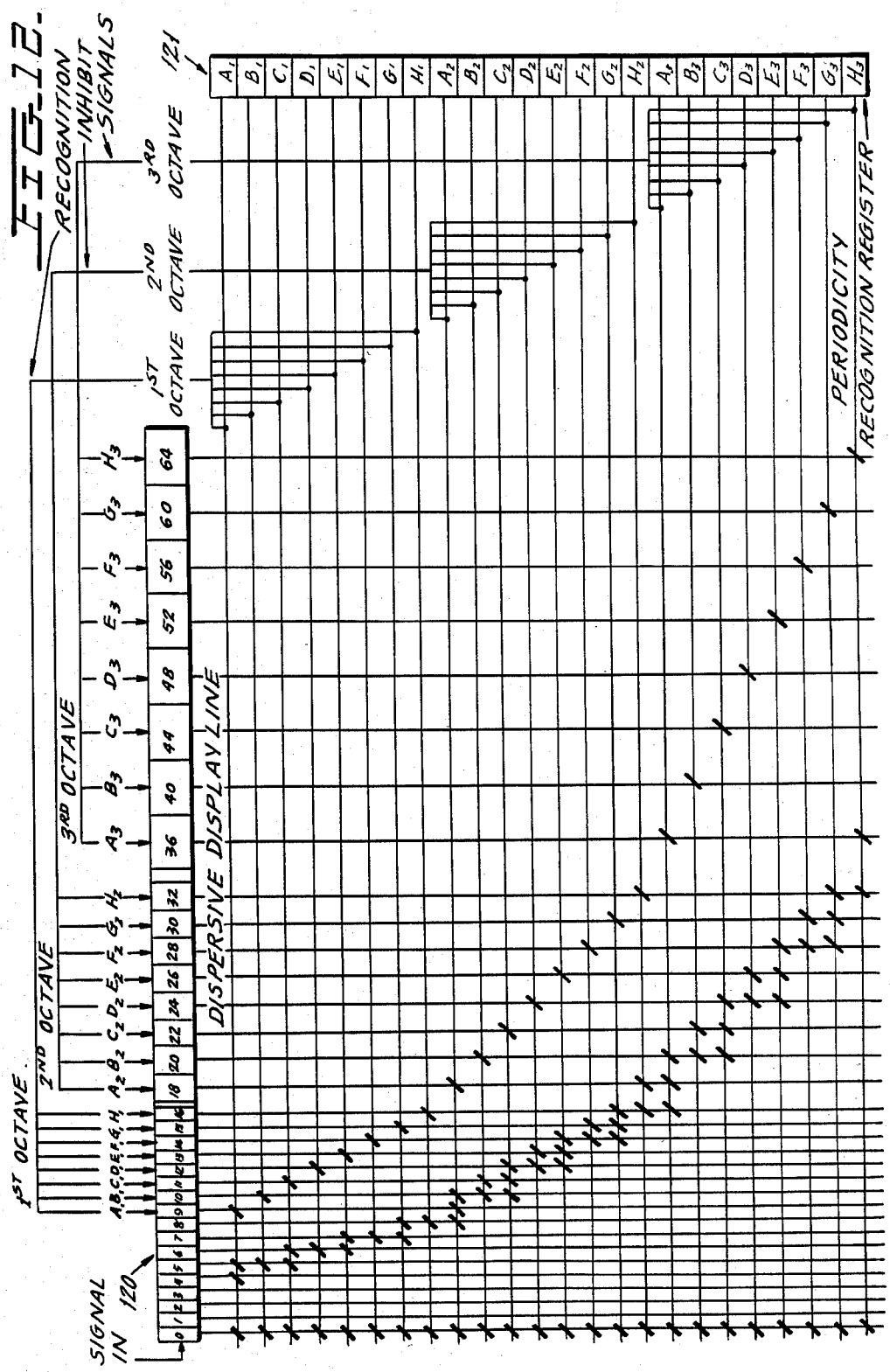
FIG. 12 is a logic map of a periodicity sorting matrix for sorting a plurality of octaves.

With the second method described above, the pulse density in the lower octaves is reduced and is therefore a better approach for dealing with complex de-interleaving. This system is employed in FIG. 12 which shows a logic map for a periodicity sorting matrix which deals with three octaves of de-interleaving. In FIG. 12 there is schematically illustrated a dispersive delay line 120 which receives the interleaved signal to be analyzed. Twenty-four AND gates are provided, each represented by a horizontal line. The AND gates are connected to the delay line 120 at the intersections marked by diagonal hatch lines. The first AND gate lines represent and are labeled the "1st octave" of signal pulses; the 2nd octave of AND gate lines are connected and labeled as shown; and the 3rd octave which are the lower eight AND gates are also labeled. A periodicity recognition register 121 corresponding to the periodicity recognition register 115 of FIG. 11 is connected to the outputs of the twenty-four AND gates.

The dispersive delay line 120 of FIG. 12 has a non-uniform delay characteristic wherein the relative delays at each step are indicated by the spacing of the taps. The time between units 0 to 16, which have the highest time resolution, corresponds to the time quantization of the highest expected periodicity of the signal. In units 18-32 the relative delay is two time units; in the delay units 36-64 it is four time units. The octave relationship of the gates is contiguous so that there is a continuous periodicity recognition capability over a three octave periodicity range.

The submultiple inhibit function referred to previously is accomplished by feeding back the output of each gate to the delay line increment in which the recognition occurs. This feedback is labeled "Recognition Inhibit Signals" in FIG. 12. Thus, the propagation of a submultiple signal pulse is terminated before it enters the lower periodicity recognition octaves.

It was previously noted that in the arrangement of FIG. 12, the distance between delay line taps is proportional to the delay time. Thus, designing a suitable system for the necessary seven or eight octaves of an acoustic signal environment, in a practical situation, requires means for reducing the physical distance along the delay line per delay unit as the delay increases. An arrangement for reducing this spacing is shown in the digital circuit diagram of FIG. 13 which carries out the functions previously described in the logic maps of FIGS. 11 and 12.

Figure 13:
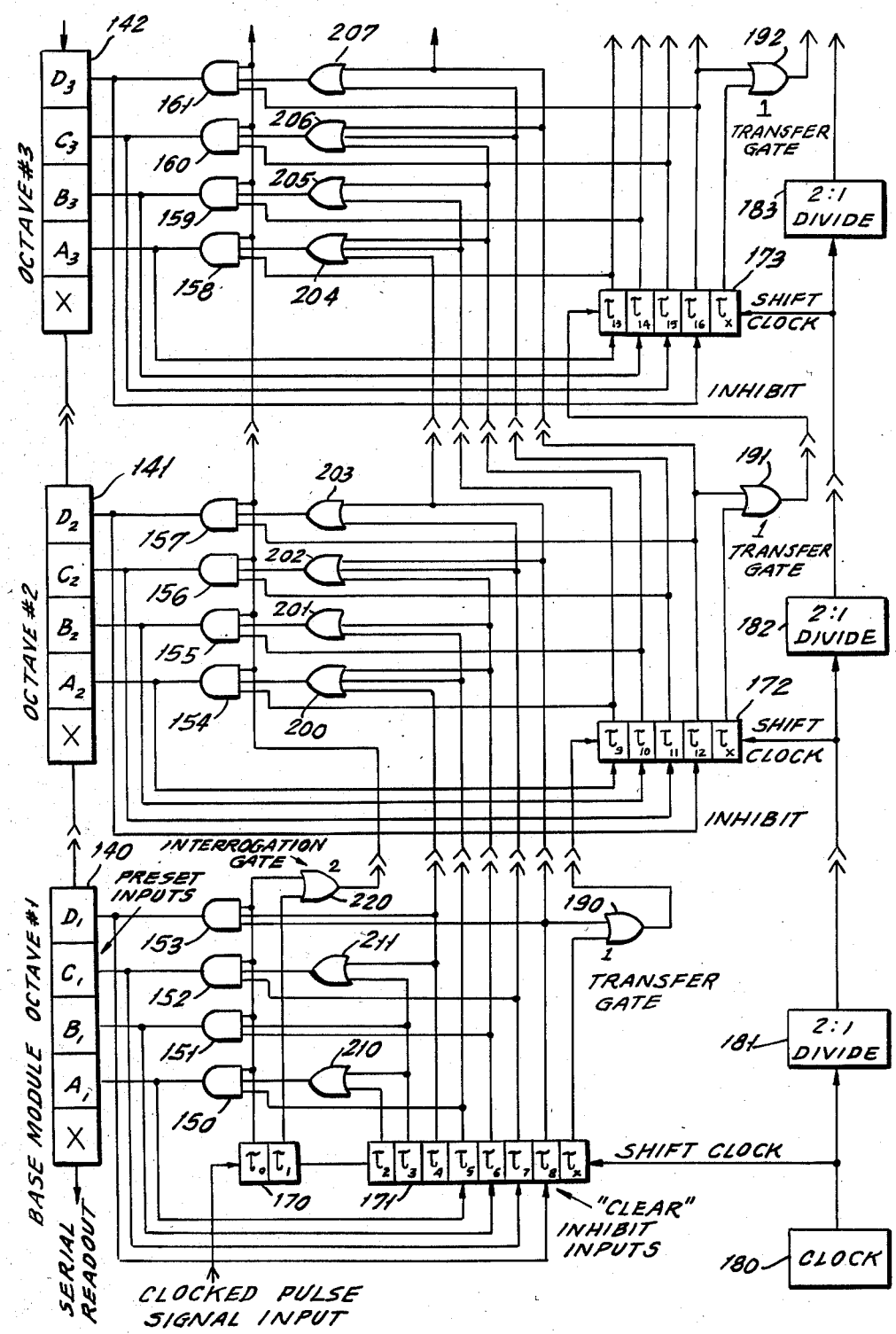
FIG. 13 is a logic diagram for a simplified periodicity sorting matrix to be used with the circuitry of the present invention.

FIG. 13 shows how the logic map of FIG. 12 can be translated into conventional circuit design. This diagram presents all the essential features of an operable system and, except for the base module octave, are identical in construction. Each octave is provided with respective storage shift registers 140, 141 and 142 for octaves 1, 2 and 3, respectively. Only four elements of the shift registers, rather than eight elements, as shown in FIG. 12, are shown in FIG. 13 for purposes of simplicity. Of course, any number of elements can be used, depending on the desired resolution.

The storage shift registers 140, 141 and 142 function as the register 121 of FIG. 12 and produce an output in response to the detection of a periodicity "hit". This output could take any desired form, such as an electronic output control signal produced during the serial readout of all contents of the register. The output can also take the form of an LED output for each location with the storage shift registers.

Each element of each storage shift register is provided with a three-input AND gate shown as the AND gates 150-160 which have their outputs connected to the A, B, C and D inputs of the storage shift registers 140, 141 and 142 in the manner shown. The clocked pulse signal input such as the input signal of FIG. 10B is then applied to a clocked shift register having sections 170 and 171 in the first octave and sections 172 and 173 in octaves 2 and 3, respectively. Similar clocked shift register sections will be provided for each of the other octaves. Thus, as many octaves as desired can be employed in order to cover as large a frequency range as is desired for the signal analysis function.

The shift register elements are clocked by a clock 180 which runs at the same rate as is used to clock the signal pulse train. (This circuit is referred to as the Data Shift Clock in FIG. 8a). The delay time for each successive octave is increased by a factor of 2 by dividing the clock rate of clock 180 by 2 for each successive octave. Thus, 2:1 divide circuits 181, 182 and so on are provided to reduce the clock rate input by 2 to each successive shift register 172, 173 and so on.

In order to ensure transfer of data between octave delay lines, an extra shift register element, denoted $T_x$ is inserted in each octave delay line 171, 172 and 173 to take care of the quantized time position of the period of the pulse pairs, which occurs when the analog periodic signal is sampled by the shift clock.

The signal from $T_x$ element of each clock shift register is connected to transfer OR gates 190, 191 and 192, respectively, in octaves 1, 2 and 3, respectively. The other input to the OR gates 190, 191 and 192 is the signal from the previous delay element $T_8$, $T_{12}$ and $T_{16}$ for OR gates 190, 191 and 192, respectively, so that the signal pulse can always be transferred to the input element of the next shift register of the next octave.

The first input for each of the AND gates 150-153 is an input from a $T_0$ position of the clock shift register 170. A second input to AND gates 150-153 is taken from clock shift register positions $T_5$, $T_6$, $T_7$ and $T_8$, respectively. Similarly, the second input of AND gate 154-157 is taken from shift register positions $T_9$, $T_{10}$, $T_{11}$ and $T_{12}$ of clock shift register 172.

The second input to AND gates 158-161 is taken from positions $T_{13}$, $T_{14}$, $T_{15}$ and $T_{16}$ of register 173. The third input for gates 154-161 consists of the output of OR gates 200-207, respectively. The third input of AND gates 150-153 is shown as the output of OR gate 210, the $T_2$ or $T_3$ output of shift register 171, the output of OR gate 211 and the output of position $T_3$ or $T_4$ of shift register 171, respectively.

The arrangement described above will produce a periodicity output in one of the storage shift register positions for storage shift registers 140, 141 and 142 in the manner shown by the diagonal slashes previously discussed in FIGS. 11 and 12.

Because of the discrete nature of the periodicity sampling, an interrogation gate 220 is provided to double the width of the interrogation pulse in all octaves below the base module. Thus, the first input to each of AND gates 154-161 consists of the output of OR gate 220, the inputs of which are connected to clock shift register positions $T_0$ and $T_1$, respectively.

FIG. 13 shows the digital circuit means by which detected periodicities can be stored and transferred to a subsequent display and/or automatic processing stage. Thus, the outputs of the recognition gates 150-161 are sent to the preset inputs of the storage shift registers 140, 141 and 142. The storage shift register records the event of a periodicity in its storage element, after which the inhibit function described in connection with FIG. 12 operates to remove the pulse from its associated delay shift register element. Thus, in FIG. 13, each of clock shift registers $T_5$, $T_6$, $T_7$, $T_8$ of 171, and each of the registers of 172 and 173 receives a clear inhibit connection from the output of AND gate 150-161, respectively.

For an example of the operation of the circuit of FIG. 13, assume that a periodicity triplet exists in register locations $T_0$, $T_6$ and $T_8$. The event is recorded in register $D_1$. The pulse in $T_8$ is then cleared by the inhibit pulse which appears at the $T_8$ clear input of the shift register 171.

Each storage shift register 140, 141 and 142 is provided with an extra delay element labeled X. This additional element is used to store data which is to be shifted into the next register if a serial readout of the data is desired. As stated previously, the data stored at each storage register can also be observed directly by connecting each storage element to a light emitting diode. Alternately or simultaneously, data can be transferred out in serial form by standard shift register methods. If desired, the data in the storage shift registers can be decoded in binary numeric form to identify directly the recorded element. Any other form of data readout can be selected as desired by the designer of a system.

Periodicity sorting matrices per se are known but are substantially more complex than the novel arrangement shown in FIG. 13. A known configuration is described in my publication entitled "PRF Signal Analyzer", IBM Technical Disclosure Bulletin, Volume 10 No. 11, April, 1968, p. 1781. That system employs a different form of octave submultiple inhibit and is inferior in performance and is more complex than the system of FIG. 13 and requires many more delay elements and logic components. This is especially true when the periodicity sorting system requires more than three or four octaves.

A significant feature of the circuit of FIG. 13 is that is can use as many octaves as are desired, with the number limited only by the time response speed of the logic element. Thus, circuits employing eight octaves have been successfully operated and with resolution of 24 increments.

The periodicity sorting matrix of FIG. 13 could be carried out in a variety of circuit techniques. Thus, the delay function can be performed by devices such as analog tapped delay lines, cascaded one-shot multivibrators, chargecoupled delay integrated circuits, digital shift registers and surface acoustic wave devices. However, for signal processing in lower frequency ranges, as employed in seismic systems and normal audio/acoustic frequency ranges, the digital shift register arrangement of FIG. 13 is the preferred circuit arrangement. The general features of a system using analog or quasi-analog methods which can employ charge coupled delay devices or surface acoustic wave devices is schematically illustrated in FIG. 14 which shows a circuit for carrying out the first and second analysis intervals of FIGS. 5 and 6. While the function of the circuit of FIG. 14 can be carried out by an all digital processing system, the system is simplified by employing an analog or quasi-analog system to provide the information needed for the Aural Retina circuit. More specifically, as shown in FIG. 14, the signal f(t) to be analyzed is applied to a suitable delay line such as the dispersive delay line 200 which has n taps $T_1-T_{n-1}$. This produces a discrete sampled waveform of f(t) along the length of the delay line which has an increasing delay per unit length. Each tap of delay line 200 is connected to a respective circuit such as one of circuits 201–204 which converts the stored function f(t) to log f(t) in a known manner. The output signal log f(t) for the function in each of the taps is then connected to a suitable subtraction circuit 205 which is arranged to subtract the output of each log converted delay tap value from the value of the preceding delay tap. This produces a discrete derivative of log f(t) which is the function $r(t) = d[\log f(t)]/dt$ which is the "residue" previously described.

The residue function r(t) is then applied to respective threshold detectors 206 provided for each delay cell which operate to determine the epoch of selected waveform features such as peaks or zeros. At the instants corresponding to those features, the values of r(t) or residue are gated into the Aural Retina circuit 207 via the residue gates 208.

Simultaneously, the outputs of threshold detectors 206 are applied to the periodicity sorting matrix 209 which may be identical to the circuit of FIG. 13. The output of PSM 209 is also applied to the input of the Aural Retina circuit 207. The Aural Retina circuit 207 then has inputs dealing with periodicity of the waveforms, residue and amplitude so that it now has the information needed to produce the necessary waveform recognition patterns. Note that the general arrangement shown in FIG. 14 can be carried out with charge-coupled delay or surface acoustic wave device technology.

There are significant advantages in the arrangement of FIG. 14 because the arrangement eliminates the need for intermediate storage, addressing, averaging and parameter association logic which are needed in an all digital configuration.

There is next considered the manner in which the outer product matrix 68 of FIG. 6 can be implemented in order to carry out the third processing interval described in FIG. 5 in which the WIVs are assembled in a vector space in which the signal patterns can be recognized. One method by which this can be accomplished is disclosed in my U.S. Pat. No. 3,886,553, entitled "Coordinate Locating Method and System", issued May 27, 1975. The method disclosed in that patent is intended primarily for locating emitters in geographic coordinates by recognizing the time difference patterns of received radiation. However, the circuits can be used for any arbitrary coordinate system.

The following describes a novel method and circuit for identifying waveform patterns using the two-dimensional space of residue $\alpha$ versus periodicity $\tau$. In general, the waveform information vectors which comprise a four-dimensional space made up of residue, periodicity, direction and amplitude can also be used.

In the novel arrangement of the invention, the residue data which is derived from the peak-sample log derivative output of register 98 of FIG. 8 is first converted to a time difference analog. The periodicity readout of the periodicity sorting matrix of FIG. 13 is also converted to a time difference analog by means of the serial readout mode described in connection with FIG. 13. Periodicity and residue then form the coordinates of a rectangular Aural Retina existence space, as was described in FIG. 2. This plane can be segmented into an array of rectangles bounded by reference points, as illustrated in FIG. 15.

The reference points in FIG. 15 are designated by the numerals 00–03; 10–13; 20–23; and 30–33. Each of these reference points can be represented as points in time as a function of the continuous time variables $\alpha$ and T. Each point, therefore, defines a unique relative time delay pattern. By arranging a means to recognize the time delay pattern between the two input variables $\alpha$ and T, it is possible to locate corresponding points in the existence diagram. Since each point or set of points represents a wave form shape, the ability to locate these points is equivalent to identifying the signal.

FIG. 16 shows a circuit in block diagram form which is designed to accomplish the above function and constitutes the outer product matrix circuit 68 of FIG. 6. The circuit of FIG. 16 attends to the outer product manipulation of the WIVs which have been measured in the wave form. In FIG. 16, the two time-difference encoded parameters for a periodicity P and residue $\alpha$ are fed to respective shift register tapped delay lines 300 and 301. A third identical register 302 is also provided. Each of registers 300-302 consists of conventional flip-flops. Registers 300 and 301 have four taps each labeled 3, 2, 1 and 0, respectively. Each of these taps is connected to a respective AND gate each of which is schematically illustrated by one of the horizontal lines which are numbered 01 to 33 (base 4 numbering). Each of these AND gates corresponds to a position in the existence diagram of FIG. 15. Each of the gates has three inputs, with the third input coming from the last tap of delay line 302 shown as the line 304 in FIG. 16.

A reference delay circuit is also provided in FIG. 16 to allow for recognition of all points in a plane. For each delay line, there is provided clocked countdown systems 305, 306 and 307 which allow the input time delay pulse to be shifted through each delay line with higher resolution than is given by the relatively coarse division of the discrete delay line taps for delay lines 300-302. This countdown method allows a fine-grain interpolation of the pattern location by comparing the relative values of responses of adjacent reference points as is disclosed in my previously referred to U.S. Pat. No. 3,886,553.

The operation of the circuit of FIG. 16 is as follows: At any instant, a signal's location in the plane of FIG. 15 corresponds to a particular AND gate 01 to 33 (base 4 numbering) which is activated by the outputs of three coincident delay line taps. Only one gate can be activated at a time and then produces an output pulse. The array of gates is then connected to a conventional logical priority encoder 310a which converts the position of the activated gate into a binary code number at lines $A_0$, $A_1$, $A_2$ and $A_3$. This number exists for the duration of the gate pulse.

The encoded recognition pulse then addresses a random access memory 310. For each recognition event a count will be added to the memory at the location specified by the gate address. After each readout scan, the random access memory 310 is cleared and the cycle begins again. The scan recognition cycle thus retains epoch information for all events within the resolution of the period of the highest-frequency signal.

Two functions that can be accomplished in processing the contents of the random access memory 310 are:

(1) scanning out the composite Aural Retina existence plane for examination of its contents which constitutes a "learning" process, and (2) performing automatic recognition of preselected patterns as a result of the examination of the memory contents.

The readout of memory 310 is controlled through a suitable microprocessor 311 which sequentially addresses all elements of the memory 310. The accumulated count at each address can then be compared with adjacent reference points and, by means of a suitable interpolation algorithm such as that described in my aforementioned U.S. Pat. No. 3,886,553, the pattern point can be computed to the resolution allowed by the original time measurement. These high resolution points then compose the pattern of the existence diagram as represented in a single periodicity sorting matrix octave readout scan cycle. By accumulating in an adder these interpolated patterns in the microprocessor memory over a suitable intergration period, a complete snapshot or picture of the Aural Retina signal pattern is obtained. That is, the adder adds each new recognition event from the OPM to the number of hits already stored in the RAM. This microcomputer-controlled adder thereby creates in RAM 310 a "histogram" of pattern responses in the storage interval. After each such interval, the accumulated patterns may be read out into a display or into temporary storage for subsequent analysis in the fourth processing interval which tests for variable patterns, as was described in connection with FIG. 5.

The readout scan conversion process can be used for identifying patterns which correspond to specific signal waveforms and their individual source objects. It is, in effect, a learning process. By testing and recognizing the pattern coordinates produced by various signal source objects, a set of "templates" can be created to test for the presence of desired incoming signal patterns. A template of this kind is shown in FIG. 16 as the block 320. The template will in fact consist, for example, of a read only memory encoded in a sequence of addresses corresponding to preselected waveforms. In order to test for a specific pattern, the addresses of the templates or read only memory 320 are applied to the random access memory address bus in the readout mode after each periodicity sorting matrix read-out octave scan cycle. If the tested pattern is present in the random access memory 310, the test will produce an event which may be recorded in a suitable recognition response counter 321. After a predetermined number of recorded events in a particular template test pattern, a threshold comparator 322 can be activated to indicate the presence of the source object in the signal ensemble. This information may then be used to activate further analysis systems or control devices.

FIG. 17 shows an alternate circuit to that of FIG. 16 for the Aural Retina processing and automatic signal recognition which does not require the random access memory 310. Referring to FIG. 17, there is schematically illustrated the shift register delay lines 305, 306 and 307 of FIG. 16 and there is also shown the AND gates 00 to 33. Each of the time reference inputs from register 307 is provided with pattern select switches 350 which can be alternately opened or closed, as desired, either manually or remotely, in order to preselect one or more patterns which can be recognized. The output of gates 00 to 33 are then connected to a suitable response summing circuit 351 which, in turn, operates a counter 352 to accumulate the number of responses, and the threshold circuit 353. Circuit 353 will then produce an appropriate recognition signal when the desired signal is present, as selected by switches 350 in an ensemble of mixed input signals. That is, a valid signal recognition signal will be produced only when a predetermined number of responses has occurred.

There have been described methods of scan conversion and pattern recognition in two dimensions, as shown in FIG. 15. The same methods can be applied to the recognition of signal source objects in the four-dimensional WIV space, as described by the generalized system of FIG. 5. This is accomplished by expanding the outer product matrix of FIG. 16 into four dimensions through the use of two additional tapped delay shift registers containing the amplitude and direction input data in time encoded form. Additional recognition AND gates will be required for the process, as specified by the product of the number of discrete elements in each vector. The number of gates can thus become impractically large for satisfactory pattern discrimination. However, an interpolation process such as that described in my prior U.S. Pat. No. 3,886,553, can be employed to improve resolution by about 100:1 while using relatively few gates. In this way, the four-dimensional periodicity sorting matrix can be implemented economically.

The outer product function described previously can be performed using microprocessor methods. However, due to the large number of multiplications and comparisons on the array of reference points that must be performed at each clock data interval, the computer processing approach becomes difficult and requires substantial computing speed and power.

The scan conversion processor and the waveform recognizing system allow identification and location of the set of source objects in the signal environment as has been described in connection with FIG. 16. They, therefore, comprise the means for achieving the objectives of the third analysis interval of FIG. 5. In terms of information content, the data rate has been compressed. With this lower data rate, the use of conventional microprocessing methods becomes appropriate, so that the requirements of the remaining processing intervals for determining pattern changes and their meanings can best be accomplished by computer algorithms.

It will be noted that the concepts of the present invention are generally valid to any signal processing arrangement regardless of frequency range. The only limitations on the circuitry are derived from response speeds of the individual devices used. While acoustic processes have been emphasized for application of the invention, it will be apparent that the invention is applicable to higher frequency applications than those in the acoustic range.

Figure 18:
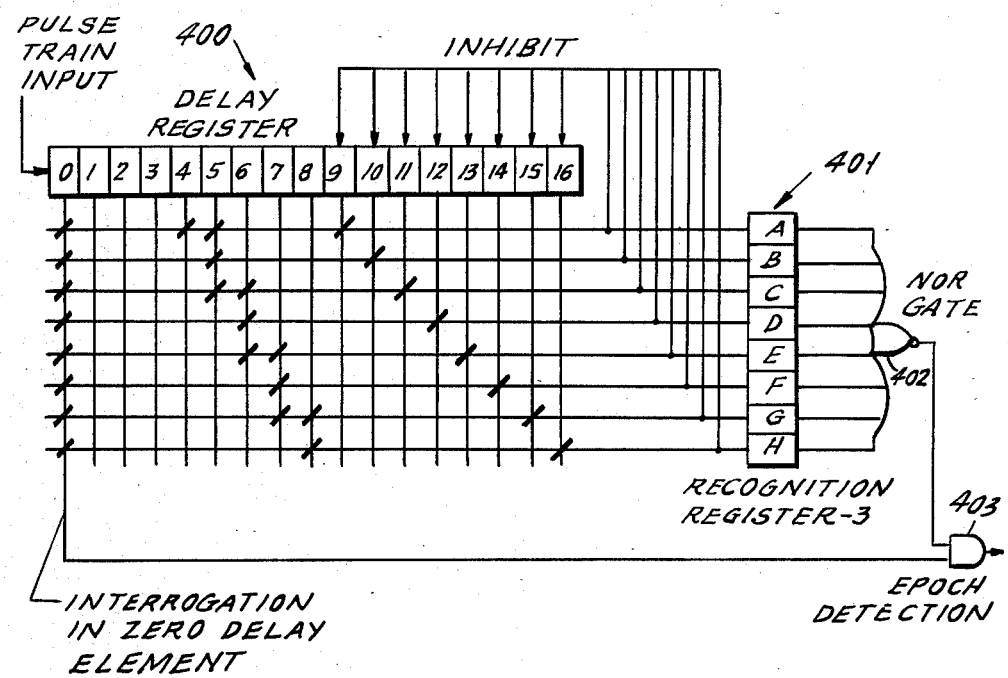
FIG. 18 schematically illustrates a logic map for a single octave epoch detector circuit.

There is next described in FIG. 18 a novel process and circuit for detecting epoch or onset of a timed series of events. Thus, in FIG. 18, the signal pulse train input is applied to a suitable tapped delay register 400. The taps of register 400 are connected to three input AND gates which are each represented by a horizontal line leading to taps A through H of recognition register 401. The outputs of the recognition register 401 are then connected to a NOR gate 402 and the output of NOR gate 402 is connected to one input of AND gate 403. The outer input of gate 403 is taken from the O delay element of delay register 400.

The operation of the system of FIG. 18 is as follows: The criterion for epoch is the event of the presence of an interrogate pulse in the 0 elements of delay register 400 without a corresponding periodicity recognition. The NOR gate 402 produces a low output whenever a periodicity recognition is recorded in the recognition register 401. At the same time, the event of a periodicity recognition requires that a pulse logic level H must exist in the 0 delay tap of register 400. However, an epoch is defined as the event of no recognition when an interrogation pulse or the output pulse of tap 0 occurs. This event can occur either when an aperiodic pulse is received or during the first two pulses of a periodic sequence.

The logic events from the AND gate 403 are tabulated as follows:

| Delay 1 | NOR Gate 402 | Epoch Gate 4 | |
|---|---|---|---|
| L | L | L | Not Possible |
| L | H | L | No Signal |
| H | L | L | Periodicity Recognition |
| H | H | H | Epoch Detection |

The above table shows that epoch is identified by the logic H when an unrecognized interrogation exists. Note that an epoch detection event is coincident with the arrival time of each pulse, regardless of the length of delay required for detection of its associated periodicity.

Figure 18A:
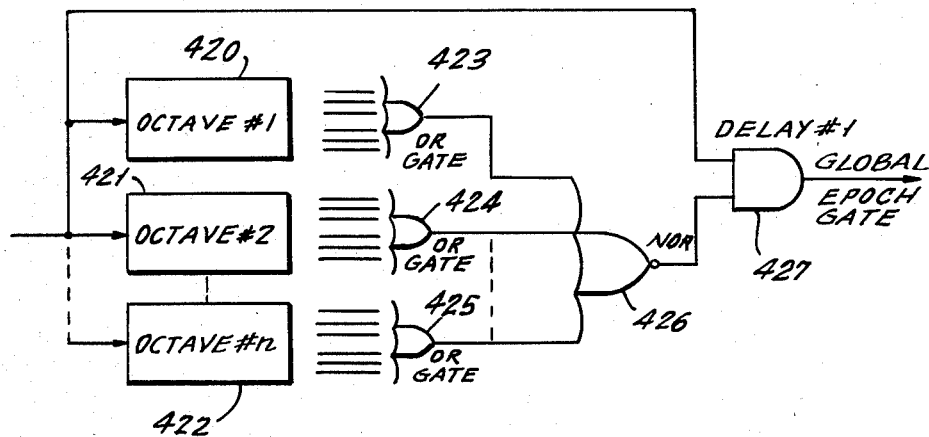
FIG. 18a schematically illustrates the manner in which FIG. 18 can be extended to a multi-octave system.

The epoch detection method described in relation to FIG. 18 is extended to include a multi-octave system in FIG. 18a. Referring to FIG. 18a, the clocked pulse train input is applied to each of n octave circuits schematically shown as three circuits 420, 421 and 422.

Each octave 420, 421 and 422 has an OR gate 423, 424 and 425, respectively, instead of the NOR gate 402 of FIG. 18. OR gates 422, 423 and 424 each operate to detect periodicity within its range. A multiple input NOR gate 426 is attached to all of the octave OR gates 423 to 425. When a signal appears in delay circuit 427, but when no periodicity recognition is detected in any of the octaves, then the Global Epoch Gate assumes a logic H. This indicates an epoch event as previously described for the single octave of FIG. 18.

From this point, the use of the epoch information obtained in FIG. 18 determines how it must be processed. The epoch data can be separated into two groups:

(1) onsets of periodic sequences specified by pulse pairs;

(2) arrivals of random events specified by single pulses.

Although the above might seem to a offer a fairly obvious distinction, the mere presence of two epoch pulses does not necessarily indicate which type of event has occurred (one periodic onset or two random events). This can be resolved by arranging the means for associating the epoch pulses with the periodic recognization data. Thus, if any pulse pair is associated with a subsequent periodicity measurement, the epoch event must be an onset; if not, then it is random. For example, the onset epoch will always be followed by a sequence of periodic pulses (at least one pulse following the first two pulses) having periodicity equal to the spacing of the pulse pair. The specific logic needed to implement this arrangement will be apparent to those skilled in the art.

As previously described, the novel process of the invention can be employed for waveform synthesization, as well as for waveform processing and detection. It is possible to synthesize the function f(t) of Equation (1) once the $A_k$, $s_k$ and $\tau_k$ parameters are given. In terms of the Aural Retina, $s_k$ is defined loosely by $\alpha_k$ as a function of residue, and by $\tau_k$ as a function of the periodicity of the ringing frequency if $\alpha$ is less than critical damping. Thus, by supplying residue and amplitude at each zero, defined by epoch $\tau_k$, it is possible to synthesize an approximation of any proposed waveform. Basically then, sythesis is equivalent to defining the responses of the set of hypothetical source objects which creates the complex waveform. Spatial information is carried in the differences of $A_k$ and $\tau_k$ which are inherent in physical locations of sources relative to the position of the receiver or source. This would then allow synthesis, for example, of stereophonic sound. As in the Aural Retina signal analyzer, however, the synthesizer method is applicable to synthesis of random excitation signals, as well as periodic signals.

In synthesizing a signal, the structure of the signal must first be known and this can be provided by a suitable composer program or the like. The program will specify the desired placement of zeros in time (epoch, periodicity and duration), along with residue, amplitude and direction (the WIV) at each zero. In the case of voice response systems, for example, where a computer produces speech information, the synthesizer program would contain the WIV and zero pattern data representing a specified speech vocabulary. In the band width-compressed speech system known as the "vocoder", the composer program would be specified by the encoded speech data which has been transmitted through a communications channel. Another application for the synthesizer might be to reproduce music, voice or facsimile data which has been stored in a computer data storage device which could be transportable.

To carry out the synthesis operation, there is provided a synthesis matrix which contains the means to place waveform zeros, both real and complex, periodic or aperiodic, in a desired sequence according to the defined epochs and durations of the postulated source objects. Further, as each zero is placed in sequence, it is modulated by the WIV information (residue, amplitude and direction) which is associated with the source object, as is determined by the composer program. It should also be noted that the degree of waveform fidelity can be controlled by regulating the resolution of the residue, amplitude and time periodicity components. For example, by eliminating the residue and amplitude vectors, a representation of clipped speech can be generated for those communication applications where only intelligibility is important. Following the synthesis matrix function, an appropriate spectrum shaping filter can be used to reduce the effects of sampling and non-linear processing.

A block diagram of a novel waveform synthesizer made in accordance with the above features of the present invention is shown in FIG. 19. The object of the system of FIG. 19 is to reverse the Aural Retina operation previously described. Thus, the periodicities are locations in time produced by the zero placement matrix 500 of FIG. 19 which physically is the reverse of the periodicity sorting matrix previously described.

As shown in FIG. 19, zeros are produced in the block 502 under the influence of the composer program 501, and are applied to the zero placement matrix 500 in terms of epoch, periodicity and duration. The zero placement matrix 500 converts information on epoch, periodicity and duration into a suitable set of pulses representing the zeros which define the zero crossings, peaks and nulls of the waveform. The residue vector of composer program 501 is applied to the residue processing block 503 and the residue vector information generated in block 503 is applied to the residue modulator 504. Residue modulator 504 and its subsequent functions 505 to 510 perform the necessary operations for synthesis at each zero, including:

(a) integration to obtain log f(t);

(b) taking its anti-log to produce f(t); and (c) multiplying f(t) by A to obtain appropriate amplitude at each complex zero and to define the real zeros, where A=0.

As each pulse exits from the zero pulse placement matrix 500, the pulse output of modulator 504 is "modulated" in width by the residue function in modulator 504. The wave form output of modulator 504 then is a square wave approximation of the waveform f(t) which is desired to be produced.

The square wave approximation output of modulator 504 is then appropriately divided into two or more channels which allow the insertion of amplitude and time delay information containing, for example, stereophonic information about the square objects. Thus, the signals, after division, are applied to integrators 505 and 506. They are, thereafter, passed through anti-log circuits 507 and 508, respectively, to perform the inverse log derivative operation previously described.

The output of each of circuits 507 and 508 is then modulated in amplitude by modulators 509 and 510, respectively, so that:

(1) relative amplitudes $A_k$ of source object exponentials are according to the waveform requirements, and (2) relative differences in amplitude between channels are according to the required acoustic propagation laws.

Amplitude modulation circuits 509 and 510 are controlled by relative amplitude outputs of direction monitoring circuit 511 which is controlled by the composer program 501. Direction circuit 511 also has time delay outputs for both signal channels, labeled right and left channels, which are applied to time delay circuits 512 and 513, respectively. This provides the necessary time delays required by acoustic propagation of the signal. The outputs of time delay circuits 512 and 513 are then applied to appropriate filters 514 and 515, respectively, which are essentially band pass filters which remove d.c. components and high frequency sampling components. The outputs of these two filters then define the left waveform and right waveform of the synthesized signals. The absolute amplitude of the signals can be appropriately controlled in the absolute amplitude control block 517 which is connected, as shown, to direction circuit 511.

It will be apparent that many variations are available of the system shown in FIG. 19. For example, if only positive or negative zeros are used, the waveform becomes a rectified signal. In many cases, the distortion produced might be tolerable. Also, the stereophonic effect disclosed in FIG. 19 is often unnecessary.

FIGS. 20 and 21 schematically illustrate a zero placement matrix circuit which could be used as circuit 500 in FIG. 19. An examination of FIGS. 20 and 21 shows the similarity between the zero placement matrix and the pulse sorting matrix previously described in connection with FIG. 13. However, in the zero placement matrix of FIG. 20, each periodicity combination for each quantized pitch frequency is represented by a separate line instead of using OR gates as in the periodicity storing matrix of FIG. 13. This allows the programmer or composer to select pitches which are intermediate between the quantized increments.

Referring to FIG. 20, there is shown an example of a zero placement matrix which can produce six discrete periodicities or pitches per octave. In FIG. 20, each of the horizontal lines, represents an inverse of the AND gates used in the PSM. Each of the inverse AND gates has three outputs which are connected to the "preset" input of selected shift registers 530, 531 and 532. The connection is schematically represented by a slash-line, which represents a suitable means of connection such as a resistor, diode or direct wire connection.

A shift clock 533 times the operation of each shift register with the timing divided by two for each subsequent register as by the countdown circuits 534 and 535. Note that the shift registers operate in the reverse direction from those previously described for the periodicity sorting matrix. Clock transition gates 536 and 537 interconnect the delay lines 530, 531 and 532.

Each of the inverse AND gate inputs is connected to respective line address decoders 540, 541 and 542 for the three octaves shown in FIG. 20. Decoders 540, 541 and 542 are used to select the desired periodicity pulse group by connecting to the various delay line taps as shown. Suitable line addresses are produced by the composer program, depending upon the input information to the system.

The function of the line address decoders 540, 541 and 542 can be carried out in several ways. As a first possibility, the conventional line decoder using binary address numbers to select a line may be employed. In another embodiment, a shift register containing a bit at the selected line can be employed. One desirable feature of using a shift register for the function is that it can address several lines in parallel, simultaneously, while the demultiplexer can do only one at a time.

In the system described above in FIG. 20, it will be seen that there are six discrete periodicities or pitches A, B, C, D, E and F per octave. The base octave has two possible combinations for A, C and E, while other octaves, due to clock countdown, have three for A, C and E, with two each for B, D and F. In general, this is $5n/2$ lines per octave for all but the base octave and $3n/2$ for the base octave.

The delay line taps 0–6 supply the "center pulse" of the three-pulse group which defines a periodicity. The base octave is the only octave in which the center pulse requires its own set of shift register delay taps. For example, notice that taps 7–12 not only provide the 3rd pulses of the base octave, but also the center pulses of the second octave. Likewise, taps 13–18 provide the 3rd pulses of the 2nd octave, and the center pulses of the 3rd octave.

Two important requirements for the synthesizer are shown in FIG. 20. The first is that AND gates 536 and 537 are used to inhibit the upper octave clock from shifting the data pulse from the lower octave until the full lower clock period has been completed. Without this feature, the periodicity would lose a clock increment for each octave over the correct pulse period.

The second is that the entry of the zero pulse into the selected periodicity line must be clocked on the leading edge of the clock pulse of the octave in which it is being inserted. This is shown in the labeled "line enable" control in the line address decoder in FIG. 20.

The operation of the zero placement matrix of FIG. 20 can be further understood from the timing diagram of FIG. 21. FIG. 21 shows the correct clock timing pulse trains for addressing the lines, as well as the transition inhibit for clock pulses when the signal pulse is transferred from a lower to an upper octave. In FIG. 21, a selected pulse is shown in line B of the third octave of FIG. 20. The pulses are injected at the spacings in the shaft register at $B_0$, $B_{14}$ and $B_{20}$. The shift clock transitions are shown between octaves. These pulses represent the desired periodic zeros and then propagate step-by-step through the shift register chain to create the specified output.

As a further illustration, another line in FIG. 21 is shown as addressed at $A_7$, $A_3$ and $A_0$ simultaneously with the $B_0$, $B_{14}$, $B_{20}$ pulse. This shows that the system can produce a set of interleaved zeros which would specify a complex waveform.

Although FIG. 21 shows the shift register element select by means of "Preset" inputs, it will be apparent that it can also be done by direct connection to the "D" input. Also, the form of the line itself can consist of direct wiring or any desired kind of logic address method.

Although the block diagram of FIG. 19 shows separate functional blocks 504 for residue modulation and 509 and 510 for amplitude modulation, it is possible to combine the operations for a simpler circuit construction. Thus, there is described hereafter a method for inserting residue information based on the idea that the period between the real zero and the first peak is $T/4$. In terms of the damped exponential concept of the Aural Retina existence diagram of FIG. 2, this $T/4$ period for rise time represents a residue of zero. As residue increases toward infinity, the rise time approaches zero.

Thus, by means of a one shot multivibrator, it is possible to create a period of $T/4$ for each periodicity which represents the sine wave or zero residue condition. Then by decreasing the multivibrator period as a function of residue amplitude, it is possible to generate a signal containing the required residue at each zero.

A schematic arrangement employing a one shot multivibrator 600 in this way is shown in FIG. 22. The multivibrator 600 of FIG. 22 has a residue input connected to the line including resistor 601 and has a variable input pulse repetition frequency weighting time constant determined by the RC circuit including resistor 602 and capacitor 603. An input from this circuit is applied to the multivibrator pulse trigger input while the residue signal is connected to the reset input. The output of the one shot multivibrator 600 then consists of the residue modulated pulse as indicated schematically below device 600.

In operation, the basic $T/4$ width of the one shot for a sine wave at a given periodicity is defined by the existence diagram and is controlled by the PRF weighting time constant. The composer program can control this weighting by varying the resistor and/or the capacitor in any suitable manner. The residue signal resets the one shot according to the magnitude of the specified residue. For example, for a sine wave condition, period T can be set to $T/4$. The period T can be made $T/8$ for critically damped exponentials and approximately equal to zero for wide band overdamped exponentials.

The output signal of the multivibrator 600 is then integrated so that the spectrum has, for example, a 6 db per octave roll-off. The anti-logarithmic function can then be performed by various well known techniques using, for example, operational amplifiers or digitally controlled attenuators.

The next step in the processing sequence is to assign amplitude levels to each pulse according to the composer program of FIG. 19. This can be done by conventional amplitude modulation methods such as diode bridges, digitally controlled attenuators or gain controlled amplifiers.

The zero pulse matrix part of the synthesis system can be carried out with digital techniques, whereas the later portions of the circuit can employ analog signal processing. It is, however, possible, if desired, to employ all digital methods. These could be especially useful in the modulation and anti-log functions which require non-linear operations on the signal.

To demonstrate the advantages of the invention, there is next described a comparison of waveform analysis by the novel invention as compared to spectrum analysis techniques, and to explain and illustrate the ways by which the Aural Retina and Fourier analysis each obtain similar information for identifying a signal.

It will also be shown how the Aural Retina can obtain this information (a) faster than is practical with spectrum analysis, (b) with fewer dimensions (less data processing) and (c) in the presence of overlapping signals by using epoch information which is lost in spectral processing. Moreover, there will be shown how processing functions which are equivalent to correlation and deconvolution can be accomplished.

FIG. 23 shows a simple periodic series of damped sinusoids, which represent an elementary form of signal. In this example, the ringing frequency is 1,000 Hz, and the repetition frequency of each ringing impulse is 200 Hz. In terms of voice processing, this would represent a pitch of 200 Hz and a formant of 1,000 Hz. The Fourier transform is the conventional method of processing this kind of signal for the purpose of identifying these parameters. The Fourier method is successful if the signal exists unchanged during a specific time interval for the required measurements to be made within a specified precision. This is due to the previously described, well-known, time-frequency inequality $\Delta t \Delta f \geq 1$. This restriction is unrealistic in practical applications where the signal waveform is time-limited, variable and composed of multiple sources.

We can develop an illustration of the problem of this time-frequency limitation by showing how the Fourier spectrum evolves as a function of the time of onset (epoch) of the signal waveform in FIG. 23. Thus,, the spectral envelope taken at intervals relative to the onset, $T_0$ are shown in FIG. 24. For convenience in later comparison with Aural Retina, these spectral sampling intervals will correspond to the waveform peaks, although, in general, spectral sampling windows are entirely arbitrary with respect to the waveform.

At $t_1$ in FIG. 24, the spectral envelope corresponds to the rise time of the exponential from onset to the first peak. In effect, this can be defined as the bandwidth of the signal. Note that the "bandwidth" has only an empirical definition with respect to rise time. Thus, the spectrum is that of a pulse whose peak is defined by the 1,000 Hz ringing frequency (or pole) of the exponential. it is "flat" from 0 Hz to the point where it begins to "roll off" at 1,000 Hz.

At the second positive peak at time $t_2$ in FIG. 23, a complete cycle of one millisecond has occurred, and the spectral energy begins to center around the ringing frequency. Using the $\Delta t \Delta f$ inequality, the bandwidth around the peak is $\Delta f = 1/\Delta t = 1/1 \times 10^{-3} = 1,000$ Hz.

Similarly, at the third and fourth samples in FIG. 24, the envelope grows sharper around the ringing peak, with bandwidths of 500 and 330 Hz, respectively. Then, at the beginning of the second impulse response, the spectrum begins a new function. The repetition of the impulse occurs at $1/200$ Hz = 5 milliseconds from $t_0$ and causes "ripples" in the formerly smooth spectral envelope. Peaks of these ripples occur at 200 Hz intervals. As the number of spectral sample intervals increases, the widths of the impulse repetition rate ripples become sharper in accordance with the $\Delta t \Delta f$ inequality. Thus, at the end of the second response repetition the spectral resolution $\Delta f$ is 1/10 msec = 100 Hz. Finally, after four repetitions the resolution is 25 Hz.

It is apparent that to be able to measure either the ringing frequency or repetition rate to a certain precision, one must "wait" a specified interval. But more importantly, the spectrum envelope must be obtained before the parameters can be estimated. This requires computation of the Fourier transform within the specified interval if "real time" operation is desired. This transformation is a well-known consumer of computing power in spite of the many improvements in the FFT algorithm.

A similar analysis of the Aural Retina can be described for the signal illustrated in FIG. 23. In this case, the procedure is to extract a set of measurements at each zero (real or complex), which are independent. This independence is an essential feature which distinguishes the Aural Retina from all forms of "least square" polynomial approximation methods, of which the Fourier transform is only one. FIG. 25 shows the time sequence of the samples taken at each peak. At each peak, the residue (or instantaneous bandwidth) and amplitude are measured simultaneously. These are the basic measurements on the waveform. From them, by comparing amplitude and time between two spatially separate transducer channels, there is derived a third instantaneous vector: direction ($\theta$). Also, using the Periodicity Sorting Matrix, the zero samples can be established to identify periodicities, randomness and epochs of time series.

In the example of FIG. 25, the "residue" vector is a measure of the instantaneous bandwidth. In effect, it is the centroid of the spectral distribution corresponding to the time interval between real and complex zeros or normalized rise time. It is also an estimate of the ringing frequency of the system, and is thus a "predictor" function. The amplitude vector, as extracted in the Aural Retina system, is a logarithmic function of amplitude at each peak. Direction would be a function of the spatial position of the signal source.

The sequence of measurements on periodicity is a function of the means by which this parameter is measured. It takes three equally-spaced zeros to detect one periodic event. Thus, as shown in FIG. 25, the first two zeros related to the ringing response periodicity are not recognized as periodic. They are an indication of the onset of a time series and are defined as the epoch event having zero periodicity.

When the third ringing zero arrives, it is identified as periodic at the 1,000 Hz rate. Then, when the second impulse function is received, the process begins again because the periodicity of the impulse repetition rate has not yet been identified. Finally, when the third impulse arrives, we have identified the repetition rate of the impulses. The pattern then becomes a pair of pairs forming the epoch, followed by a pair of repetition periodicities and a series containing the ringing periodicities.

When comparing the set of measurements derived from the waveform of FIG. 23 by the spectrum patterns of FIG. 24 with those derived by the Aural Retina (FIG. 25), it is seen that with the Aural Retina:

(1) the ringing frequency is estimated directly from a simple waveform measurement, the residue, rather than from a complex analysis of the pattern of a spectral envelope;

(2) the repetition frequency is measured explicitly at the exact instant that such information is available, rather than from an estimate of the ripple spacing on the spectral envelope, or by another complex conversion of the spectrum into a "cepstrum" or an "autocorrelation" pattern;

(3) since the vector measurements taken at each waveform zero are independent, they can be treated by statistical procedures to accomplish optimum detection processes that are usually associated with frequency domain techniques.

Although certain basic advantages of Aural Retina over Fourier processing can be seen in the processing of this simple waveform, the most significant advantage is found when the signal source contains two or more overlapping time series. To illustrate this situation, FIG. 26 shows another single damped sinusoid added to the series of FIG. 23. The problem now is to estimate the description of both signals, including their exact instants of onset (epoch).

Figure 27:
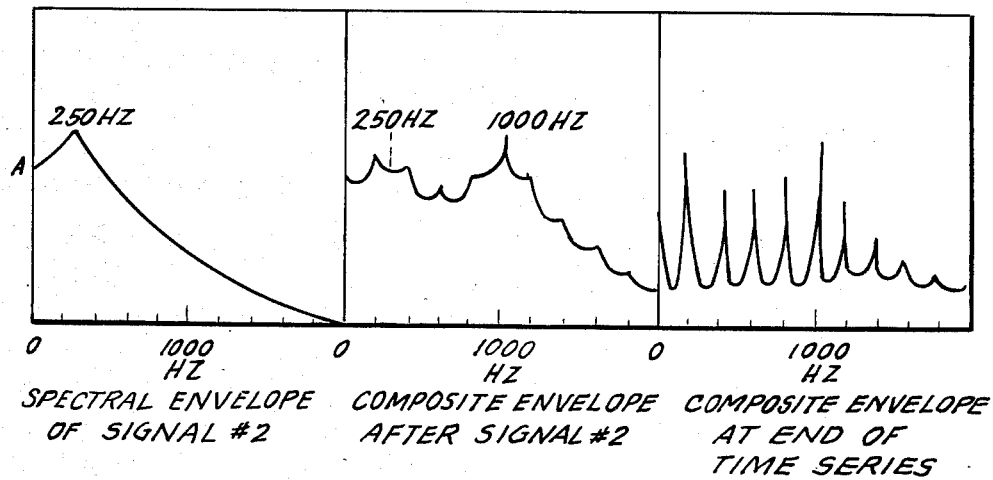
FIG. 27 shows the spectrum analysis of the combined waveforms of FIG. 26.

Using Fourier analysis, we now have two spectral patterns which are superimposed during the existence of the two signals. The left-handmost curve of FIG. 27 illustrates the spectral pattern of the second damped sinusoid wavelet, which has a ringing period of 4 msec, producing a spectral peak at 250 Hz. The resultant spectrum, at any time after the onset of signal 2, $t_{02}$, is the sum of both spectra.

The middle curve of FIG. 27 shows the effect of superimposed spectral envelopes. The envelope of the spectral pattern at the end of the ringing of Signal #2 shows two peaks: one at 250 Hz, and the other at 2,000 Hz. However, the effects of the repetition harmonic ripples on the 250 Hz signal pattern cause interference in selecting the true peak of the 1,000 Hz signal.

At the end of the series of five impulses, the repetition harmonic ripple pattern completely displaces the true maximum of the 1,000 Hz signal; this is shown at the right of FIG. 27. Also notice that there is no indication of the epoch of the 250 Hz signal. In effect, the spectral patterns have either obscured or eliminated the ability to sort the two signals.

Since the example of FIG. 27 is based on the simplest kind of signal, it is apparent that the complexity of processing becomes much worse when typical real-world signals are used.

To illustrate how the Aural Retina solves the problem of sorting the two signals, refer to FIG. 26. The figure shows the use of the Periodicity Sorting Matrix's de-interleaving process to sort individual samples by analyzing their time domain relationships. After the waveform analyzer extracts the real and complex zeros with their associated measurements of amplitude and residue, the PSM identifies the epochs and periodicities of both signals. As shown in FIG. 26, the combined real and complex zeros are sorted one-by-one, so that the two signals, $S_1$ and $S_2$ form two identifiable sets of measurements. Although residue (related to the rate-of-change) can be measured at both real and complex zeros, the amplitude is measured only at peaks. The time sequence plot in FIG. 26 shows the instants at which the periodicities of the two signals are identified. Thus, the onset of the wavelet $S_2$ is identified in the midst of the zeros of the ringing and repetition of sequence $S_1$.

Figure 28:
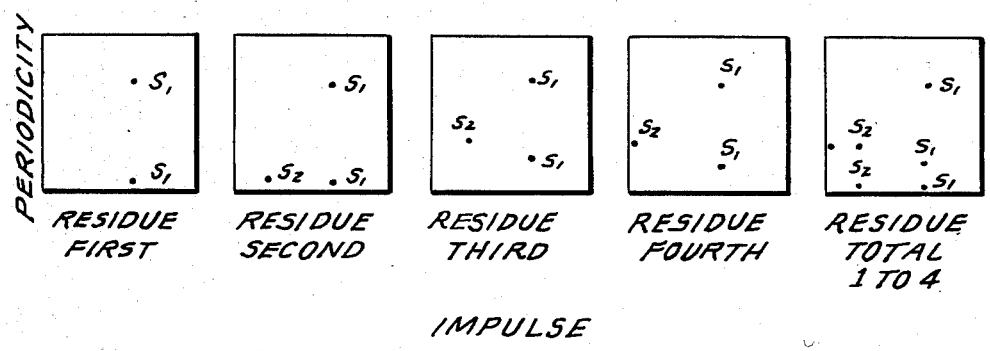
FIG. 28 shows the Aural Retina display corresponding to the combined waveforms of FIG. 26.

Although the two signals $S_1$ and $S_2$ of FIG. 26 can be identified by using only the periodicity and temporal relationships, a more complete description of the signals can be obtained by using the residue and amplitude parameters in the form of either a two or a three dimensional space. This is shown in FIG. 28. The primary recognition space uses the periodicity vs. residue parameters. Since patterns in this plane are independent of absolute amplitude, automatic identification is greatly facilitated. In general, the amplitude parameter is needed for describing a signal only as a secondary sorting parameter (and for possible later synthesis).

FIG. 28 illustrates the description of Signals 1 and 2 in the Aural Retina recognition space, in which the parameter vectors of FIG. 26 are combined so as to show the cluster patterns which identify each signal. For convenience, each of these patterns is shown as an accumulation over the set corresponding to the duration of each impulse response of Signal #1. The patterns are analogous in function to the sequences of spectrograms in FIG. 27. Each point in the space represents an accumulation of events. If the parameters are invariant, the point position is unchanged and represents all events over the time of observation. Thus, we can derive an additional descriptive dimension by summing the events at each point location, as in a multivariate histogram.

The above illustration demonstrates the statistical attributes of the novel signal processing method. With this approach, one can achieve the objectives of signal identification and detection on a basis of classical statistical theory. Furthermore, it now becomes possible to electronically duplicate many psychoacoustic phenomena of the ear; for example, the ear's ability to sort overlapped signal sources, as in the "cocktail party effect" and apply the results to apparatus used in automatic voice recognition equipment. Also, the invention allows high intelligibility of "clipped speech" in terms of the fact that periodicity analysis of the real and complex zeros contains the major components of speech information, and excludes the residue vector, which contains only the "timbre" quality of the speech sound.

From a comparison of the two processing methods, it is seen that, aside from the inherent difficulties Fourier methods have handling overlapping time-limited signals, there are definite differences in the complexity of processing the signals. The spectral pattern is a two-dimensional construction, but the same information is contained in the Aural Retina in the form of a small set of point measurements. For example, a damped sinusoid is represented by a pair of points in the periodicity/residue plane, while the Fourier domain requires a line of points whose shape characterizes the ringing peak and the "Q". The reduction in dimensionality is equivalent to a reduction in information needed to describe the signal. Thus, the invention permits lower data rates, lower costs, lower power comsumption and lower system complexity.

Since the identifying features of the Aural Retina method are independent of signal amplitude, the effects of large signal amplitudes do not inherently mask the lower amplitudes. Nor is there a need to maintain a constant amplitude to be able to "recognize" a spectral patternn, as is required by Fourier analysis. Moreover, in the Aural Retina, signal recognition is made relatively easy by simply setting up a "template" which accepts only the specified set of points characterizing the desired signal.

Although the present invention has been described in connection with preferred embodiments thereof, many variations and modifications will now become apparent to those skilled in the art. It is preferred, therefore, that the present invention be limited not by specific disclosure herein, but only by the appended claims.

What is claimed is:

1. The process of analyzing a complex waveform $$f(t) = \sum_{k=1}^{m} A \, e^{sk(t-\tau k)}$$

wherein
- $A_k = k^{th}$ amplitude coefficient
- $s_k = k^{th}$ complex frequency $(\alpha_k + j\beta_k)$
- $\tau_k =$ epoch (start) of $k^{th}$ excitation function;

said process comprising the steps of determining at least two waveform information vectors (WIVs), said waveform information vectors each comprising at least two components from the vector space having as components epoch, residue R and direction $\theta$ of arrival of said waveform, wherein said waveform information vectors are measured at the instant at least one of f(t) or d/dt is at a predetermined condition, and determining the existence of a given immediate flash information characteristic in said waveform by comparison of said at least two WIVs to predetermined values, said residue being an amplitude independent function of the waveform as determined upon the occurrence of a predetermined feature of the signal waveform.

2. The process of claim 1, which includes the further step of determining in addition to said at least two of said WIVs a third one of said WIVs to detect a regularity indicating a periodicity.

3. The process of claim 2 which includes the further step of determining in addition to said third one of said WIVs a fourth one of said WIVs and comparing the change between said third one and said fourth one of said WIVs, said third and fourth one of said WIVs being separated by a predetermined period of time.

4. The process of claim 2 which includes the further step of comparing said WIVs to a predetermined pattern.

5. Apparatus for analyzing a signal waveform from a source of said signal waveform, comprising:
- periodicity means coupled to said source for detecting the time of occurrence of individual repetitions of a predetermined type within a periodic event in said signal waveform and providing in response to detection of periodicity in said event a periodicity signal corresponding to the period of said periodic event;
- residue means coupled to said source of said signal waveform for providing upon the occurrence of a predetermined feature of said signal waveform a normalized signal bearing a predetermined relation to said signal waveform; and
- utilization means coupled to said periodicity means and said residue means for providing an output signal based on the contemporaneous values of said normalized signal and said periodicity signal.

6. Apparatus according to claim 5 wherein said periodicity means comprises:
- threshold means for providing a threshold signal in response to the signal waveform crossing a predetermined threshold standard; and
- repetition means coupled to said threshold means for providing said periodicity signal in response to three regular repetitions of said threshold signal.

7. Apparatus according to claim 6 wherein said predetermined threshold standard of said threshold means is, at least, a zero crossing of said signal waveform.

8. Apparatus according to claim 6 wherein said predetermined threshold standard of said threshold means, includes either the peaking or the nulling of said signal waveform.

9. Apparatus according to claim 5 wherein said feature of said residue means includes the changing of said signal waveform in a predetermined manner, said normalized signal being the length of time required for the change in said predetermined manner.

10. Apparatus according to claim 9 wherein the change occurring in said predetermined manner is the increase in said signal waveform from a predetermined value to the next peak.

11. Apparatus according to claim 5 wherein said residue means includes:
- normalizing means for producing a preconditioned signal representing the time rate of change of the logarithm of said signal waveform; and
- feature means coupled to said normalizing means for providing said normalized signal in response to the occurrence of said predetermined feature in said preconditioned signal.

12. Apparatus according to claim 5 wherein said utilization means comprises:
- display means coupled to said residue means and said periodicity means for providing a two dimensional plot of the magnitude of contemporaneously occurring pairs of said periodicity signal and said normalized signal.

13. Apparatus according to claim 5 wherein said utilization means comprises:
- template means coupled to said residue means and said periodicity means for resolving said periodicity signal and said normalized signal into contemporaneously occurring coordinate pairs on a two dimensional plot, said template means being operable to provide a recognition signal in response to said plot forming a predetermined pattern.

14. Apparatus according to claim 5 wherein said periodicity means comprises:
- timing means for providing a trio signal in response to three repetitions within said periodic event; and
- termination means coupled to said timing means for terminating therein the subsequent effect of the first of the three repetitions within said periodic event in response to said trio signal, whereby spurious submultiple responses are eliminated.

15. Apparatus according to claim 14 wherein said timing means includes:
- delaying means having a plurality of ordered cells through which a pulsed signal can propagate, each repetition of said periodic event being applied to the first one of said cells to initiate the pulsed signal.

16. Apparatus according to claim 15 wherein said delaying means comprises:
- at least a first and second group of clock-controllable shift registers for propagating through themselves the pulsed signal; and
- a clock having at least two harmonically related outputs, each separately connected to one of said two groups of shift registers to cause said pulsed signal to propagate through said second group of shift registers more slowly than the first group of shift registers.

17. Apparatus according to claim 14 further comprising:
- epoch means coupled to said timing means and operable to produce an epoch pulse in response to the arrival of the first of three repetitions within said periodic event, provided that said arrival is not simultaneous with the production of a trio signal, whereby the first three repetitions of the periodic event defines an onset, with subsequent repetitions of the same event being suppressed.

18. Apparatus according to claim 5 wherein said feature of said residue means includes said signal waveform reaching a local peak, said normalized signal being related to the second derivative of the natural logarithm of the signal waveform when the waveform reaches said local peak.

19. Apparatus according to claim 5 wherein said signal waveform includes a pair of related signals, said periodicity means including:
a pair of periodicity channels each for processing a different corresponding one of said pair of related signals, each of said periodicity channels being operable to detect the occurrence of a periodic event in its corresponding one of said related signals and to provide in response thereto a periodicity signal corresponding to the period of said periodic event, said residue means including:
a pair of residue channels each for providing upon the occurrence of a predetermined feature of its corresponding one of said related signals a normalized signal bearing a predetermined relation to said signal waveform, said utilization means comprising:
comparison means coupled to said periodicity means and said residue means for providing a directionality signal based on the relative values of either said normalized signal or said periodicity signal of said pair of related signals.

20. Apparatus according to claim 5 wherein said utilization means comprises:
matrix means coupled to said periodicity means and said residue means for providing in response to the contemporaneous magnitudes of said periodicity signal and said normalized signal, a coordinate signal corresponding to a location on a two-dimensional existence plane.

21. Apparatus according to claim 20 wherein said matrix means is operable to provide said coordinate signal by quantizing pairs of values of said periodicity signal and said normalized signal into one of a predetermined plurality of discrete positional values.

22. Apparatus according to claim 21 wherein said utilization means includes:
template means coupled to said matrix means for providing a recognition signal is response to the contemporaneous occurrence of a predetermined subset from said predetermined plurality of discrete positional values.

23. Apparatus according to claim 22 wherein said utilization means comprises:
frequency means for producing a presence signal in response to the repetitious occurence of said predetermined subset from said predetermined plurality of said discrete positional values.

24. Apparatus for detecting individual repetitions within a periodic event in a signal waveform comprising:
periodicity means for providing in response to three individual repetitions within said periodic event, a group signal corresponding to the period of said periodic event; and
termination means coupled to said periodicity means for suppressing the effect of non-successive, regular repetitions within said periodic event occurring at submultiple repetition rates, said termination means being operable to terminate within said periodicity means the subsequent effect of the first of the three repetitions within said periodic event in response to said group signal, whereby spurious submultiple responses are eliminated.

25. Apparatus according to claim 24 wherein said timing means includes:
delaying means having a plurality of ordered cells through which a pulsed signal can propagate, each repetition of said periodic event being applied to the first one of said cells to initiate the pulsed signal.

26. Apparatus according to claim 25 wherein said delaying means comprises:
at least a first and second group of clock-controllable shift registers for propagating through themselves the pulsed signal; and
a clock having at least two harmonically related outputs, each separately connected to one of said two groups of shift registers to cause said pulsed signal to propagate through said second group of shift registers more slowly than the first.

27. Apparatus according to claim 24 further comprising:
epoch means coupled to said timing means and operable to produce an epoch pulse in response to the arrival of the first of three repetitions within said periodic event, provided that said arrival is not simultaneous with the production of a group signal, whereby the first three repetitions of the periodic event defines an onset, with subsequent repetitions of the same event being suppressed.

28. A method for analyzing a signal waveform comprising the steps of:
detecting each occurrence of a periodic event of a predetermined type in said signal waveform and determining said event is periodic by determining that the signal waveform crosses a predetermined threshold standard in three regular repetitions;
sensing each occurrence of a predetermined feature of said signal waveform;
generating a normalized value from said signal waveform upon the occurrence of its predetermined feature; and
recording the occurrence of each periodic event together with the predetermined feature of said signal waveform occurring contemporaneously therewith.

29. A method according to claim 28 wherein said predetermined threshold standard includes a zero crossing.

30. A method according to claim 28 wherein said feature of said signal waveform includes the changing of said signal waveform in a predetermined manner, said normalized value being the length of time required for the change in said predetermined manner.

31. A method according to claim 30 wherein the change occurring in said predetermined manner is the increase in said signal waveform from a predetermined value to the next peak.

32. A method according to claim 28 wherein said generating said normalized value includes the steps of:
producing a preconditioned value representing the time rate of change of the logarithm of said signal waveform; and
providing said normalized value in response to the occurrence of said predetermined feature in said preconditioned signal.

33. A method according to claim 28 wherein said associating step comprises:

providing a two dimensional plot of the magnitude of contemporaneously occurring pairs of two values: the period of the periodic event and the normalized value.

34. A method according to claim 28 wherein said associating step comprises:
resolving the period of said periodic event and said normalized value into contemporaneously occurring coordinate pairs on a two-dimensional plot; and
recognizing said two dimensional plot being formed into a predetermined pattern.

35. A method according to claim 28 wherein said associating step comprises:
providing in response to said normalized value and the contemporaneous magnitude of the period of the periodic event, a coordinate signal corresponding to a location on a two-dimensional existence plane.

36. A method according to claim 35 wherein the step of providing a coordinate signal comprises:
quantizing pairs of values of a, the period of said periodic event and b, said normalized value, into one of a predetermined plurality of discrete positional values.

37. A method according to claim 36 wherein said associating step further comprise:
recognizing the contemporaneous occurrence of each member of a predetermined subset from said predetermined plurality of discrete positional values.

38. A method according to claim 37 wherein said associating step further comprise:
identifying the repetition, a predetermined number of times, of the occurrence of said predetermined subset from said predetermined plurality of said discrete positional values.

39. A method according to claim 28 wherein said detecting the occurrence of said event comprises:
sensing three repetitions within said periodic event; and
ignoring the first of the three repetition within said periodic event after the sensing of said three repetitions, whereby spurious submultiple responses are eliminated.

40. A method according to claim 39 further comprising the step of:
sensing an epoch as the arrival of the first of three repetitions within said periodic event, provided that said arrival is not equivalent to the third of three other repetitions in the same periodic event, whereby the first three repetitions of the periodic event defines an onset with subsequent repetitions of the same event being suppressed.

41. A method according to claim 40 wherein said predetermined threshold standard includes either the peaking or the nulling of said signal waveform.

42. A method according to claim 28 wherein said predetermined feature includes said signal waveform reachig a local peak, said normalized value being related to the second derivative of the natural logarithm of the signal waveform when the waveform reaches said local peak.

* * * * *